US010003436B2

(12) United States Patent
Tosato et al.

(10) Patent No.: US 10,003,436 B2
(45) Date of Patent: Jun. 19, 2018

(54) LOW-COMPLEXITY LLR COMPUTATION FOR NONUNIFORM QAM CONSTELLATIONS

(71) Applicant: KABUSHIKI KAISHA TOSHIBA, Tokyo (JP)

(72) Inventors: Filippo Tosato, Bristol (GB); Amr Ismail, Bristol (GB); Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/472,959

(22) Filed: Mar. 29, 2017

(65) Prior Publication Data
US 2017/0288811 A1 Oct. 5, 2017

(30) Foreign Application Priority Data
Mar. 31, 2016 (GB) .................................. 1605454.6

(51) Int. Cl.
H04L 27/38 (2006.01)
H04L 1/00 (2006.01)

(52) U.S. Cl.
CPC ............ H04L 1/0054 (2013.01); H04L 27/38 (2013.01); *H04L 1/0016* (2013.01)

(58) Field of Classification Search
CPC ...... H04L 1/0054; H04L 27/38; H04L 1/0016
See application file for complete search history.

(56) References Cited

U.S. PATENT DOCUMENTS

| 8,644,433 B1 * | 2/2014 | Lee .................. H04L 25/03891 375/259 |
| 2002/0131515 A1 | 9/2002 | Rodriguez |

(Continued)

FOREIGN PATENT DOCUMENTS

| CN | 101662341 A | 11/1997 |
| GB | 2496918 A | 5/2013 |
| WO | WO 2014/114246 A1 | 7/2014 |

OTHER PUBLICATIONS

Forney, Jr., G.D., et al., "Efficient Modulation for Band-Limited Channels", IEEE Journal on Selected Areas in Communications, vol. SAC-2, No. 5, pp. 632-647 (1984).

(Continued)

*Primary Examiner* — Syed Haider
(74) *Attorney, Agent, or Firm* — Finnegan, Henderson, Farabow, Garrett & Dunner, L.L.P.

(57) ABSTRACT

A device for use in demodulating modulated signals by determining a value for a log likelihood ratio. The device has a storage device to store executable instructions and a processor to execute the instructions stored on the memory device. The processor is configured to, when executing the instructions: receive a modulated signal which is to be demodulated using a constellation diagram comprising a plurality of constellation points which are identified by binary reflected Gray-labelled codes; identify, for a bit of the Gray-labelled codes, a closest complementary constellation point to the signal when considering the signal as a point on a representation of one-dimension of the constellation diagram; identify a hard decision point, wherein the hard decision point is the closest constellation point to the signal when considering the signal as a point on a representation of one-dimension of a constellation diagram; and a complementary constellation point is a constellation point which has a different value for the bit compared to the hard decision point; and determine a value for a log likelihood ratio using the hard decision point and the closest complementary constellation point. Some devices identify a closest complementary constellation point to the signal, a second closest complementary constellation point to the signal, a hard decision point and an auxiliary hard decision point and determine a value for a log likelihood ratio using the hard decision point, an auxiliary hard decision point, the closest complementary constellation point and the second closest complementary constellation point.

19 Claims, 18 Drawing Sheets

(56) References Cited

U.S. PATENT DOCUMENTS

2004/0091058 A1* 5/2004 Tosato .................. H04L 25/022
                                                                375/261
2009/0231028 A1* 9/2009 Wang ................ H04L 25/03171
                                                                329/304

OTHER PUBLICATIONS

Poltyrev, G., "On Coding Without Restrictions for the AWGN Channel", IEEE Transactions on Information Theory, vol. 40, No. 2, pp. 409-417 (1994).

Liu, X., et al., "Max-Log-MAP Soft Demapper with Logarithmic Complexity for M-PAM Signals", IEEE Signal Processing Letters, vol. 22, No. 1, pp. 50-53 (2015).

Forney, Jr., G.D., et al., "Multidimensional Constellations—Part I: Introduction, Figures of Merit, and Generalized Cross Constellations", IEEE Journal on Selected Areas in Communications, vol. 7, No. 6, pp. 877-892 (1989).

Sommer, D., et al., "Signal Shaping by Non-Uniform QAM for AWGN Channels and Applications Using Turbo Coding", RD ITG Conference Source and Channel Coding (2000).

Search Report issued by the Intellectual Property Office of Great Britain in GB Application No. 1605454.6, dated Nov. 17, 2016 (4 pages).

* cited by examiner (a) $z'_1(1)$ (circle) and $z'_2(1)$ (square)

(b) $z'_1(2)$ (circle) and $z'_2(2)$ (square)

(c) Candidates for $z'_1(3)$ (circles)

(d) Candidates for $z'_2(3)$ (squares)

(e) Next closest point to $y$ candidates (triangles)

(f) Candidates for $z_2(2)$ (triangles)

LOW-COMPLEXITY LLR COMPUTATION FOR NONUNIFORM QAM CONSTELLATIONS

FIELD

Embodiments relate generally to devices and methods for use in reduced complexity signal demodulation, more specifically for nonuniform QAM constellations.

BACKGROUND

When digital signals are sent across a communication system, it is common to transmit the signals in the form of a modulated carrier signal. After transmission, the received signal must be demodulated to reconstruct the original signal (the content).

Digital modulation schemes use finite numbers of discrete signals. A predefined number of symbols (unique combinations of binary digits) may be assigned for each digital modulation symbol.

Pulse amplitude modulation (PAM) is a modulation scheme which encodes message information in the amplitude of a series of signal pulses. Each digital symbol is encoded as a specific amplitude of the carrier signal. The received signal can then be demodulated by determining which of these set amplitudes the received signal is closest to, and then assigning the symbol corresponding to this set amplitude. Amplitude shift keying (ASK) is a type of PAM which modulates the amplitude of a sinusoidal carrier wave.

Quadrature amplitude modulation (QAM) is a modulation scheme which encodes a digital message by modulating the amplitudes of two carrier waves using ASK. The two carrier waves are sinusoids which are out of phase with each other by 90° (a sine wave and a cosine wave). The two carrier waves are summed and can then be demodulated at the receiving end by separating out the two combined carrier waves and determining the corresponding symbol for the amplitude of each carrier wave.

The set of symbols for a given modulation scheme can be represented by a constellation diagram. For QAM, each symbol (each unique combination of binary digits) can be represented by a complex number representing a position on the complex plane. The sine and cosine carrier waves are modulated by the real and imaginary parts of the complex number for a given symbol to provide the modulated signal for a given symbol. A coherent demodulator can then independently demodulate the two carrier waves to determine the symbol.

Regular QAM constellations (i.e., with equally-spaced points) are widely used in practice due to their relative easiness of implementation (in terms of modulation/demodulation). However, these constellations fall short of achieving the Shannon capacity over Additive White Gaussian Noise (AWGN) channels. A modest performance improvement may be obtained through relaxation of the lattice structure of conventional quadrature amplitude modulation (QAM) constellations by allowing non-equal spacing between neighbouring points. One instance of such constellations is obtained by fitting the distances profile to the cumulative distribution function (CDF) of the normal distribution (e.g., Gaussian-shaped PAM). In order to maintain the In-phase/Quadrature independence, this distances profile fitting may be applied independently over pulse amplitude modulation (PAM) constellations with the resulting QAM constellation being simply the Cartesian product of the underlying PAMs. In a typical scenario, these non-uniform constellations are used in conjunction with an error correcting code (e.g., LDPC or Turbo code).

DETAILED DESCRIPTION

Figure 1:
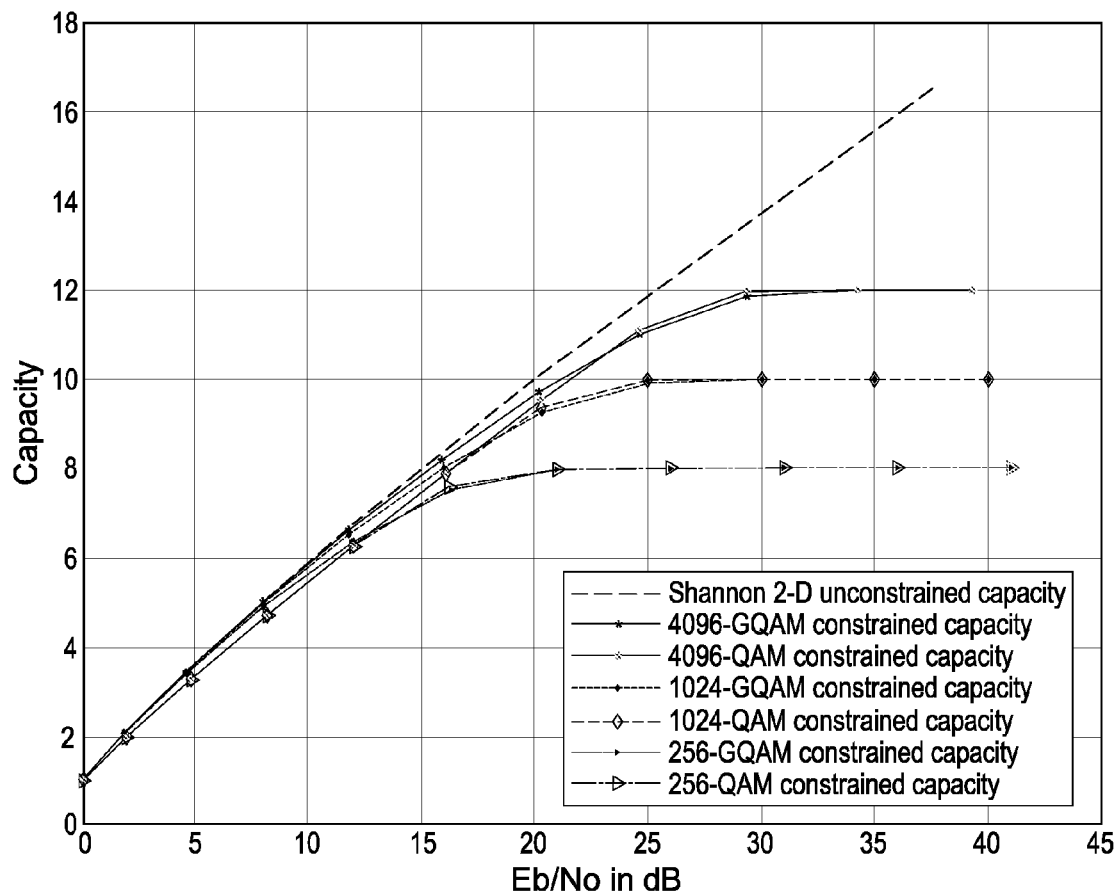
FIG. 1 illustrates the capacity of certain QAM constellations compared to the theoretical Shannon capacity.

According to an embodiment is a device for use in demodulating modulated signals by determining a value for a log likelihood ratio. The device may comprise:
  a storage device configured to store executable instructions; and
  a processor configured to execute the instructions stored on the memory device. The processor may be configured to, when executing the instructions:
    receive a modulated signal which is to be demodulated using a constellation diagram comprising a plurality of constellation points which are identified by binary reflected Gray-labelled codes;
    identify, for a bit of the Gray-labelled codes, a closest complementary constellation point to the signal when considering the signal as a point on a representation of one-dimension of the constellation diagram;
    identify a hard decision point, wherein the hard decision point is the closest constellation point to the signal when considering the signal as a point on a representation of one-dimension of a constellation diagram; and a complementary constellation point is a constellation point which has a different value for the bit compared to the hard decision point; and determine a value for a log likelihood ratio using the hard decision point and the closest complementary constellation point.

The term "processor configured to . . ." as used herein is to be construed broadly to cover any processor which may be configured to undertake the described methods.

The device may comprise a signal input for receiving, or configured to receive, a modulated signal. The modulated signal may be a noise contaminated signal. The modulated signal may have undergone an equalization step. An embodiment may comprise an equalization device for equalizing a modulated signal. The processor may further be configured to equalize the modulated signal.

The device may comprise an output for outputting the value of the log likelihood ratio. An embodiment may output a soft output. The output may be connected to a second device. The processor, or instructions may be configured to send the value of the log likelihood ratio to a second device. The second device may be a decoder, e.g. a LDPC (low-density parity check) or Turbo code iterative decoder.

An embodiment may obtain a log likelihood ratio for the bit, or for every bit. A log likelihood ratio may be obtained for every bit. An embodiment may demodulate the signal. The signal may be demodulated using the value of the log likelihood ratio.

An embodiment may comprise a decoder (e.g. a LDPC (low-density parity check) or Turbo code iterative decoder) for receiving the, or each, value for a log likelihood ratio from the device and iteratively updating the value for a log likelihood ratio. An embodiment, e.g. the decoder, may comprise an output for outputting a decoded signal or an estimate of the transmitted signal or message.

The processor of the device may be configured to undertake the tasks of a decoder. Alternatively, a separate decoder may comprise a further processor, configured to undertake the tasks of the decoder.

Embodiments may provide a more efficient demodulator wherein the complexity grows logarithmically with the size of the constellation M.

The processor may be further configured to demodulate the signal using the value for the log likelihood ratio (LLR). A method according to an embodiment may demodulate the signal using the value for the LLR.

An embodiment may comprise an output for outputting the demodulated signal. The device may be a demodulation unit or a demodulator.

As such, according to an embodiment is a communication device comprising a device as described herein. Wherein the communication device is configured to receive modulated signals and determine a value for a log likelihood ratio. The communication device may demodulate the modulated signals. The communication device may be a receiver.

Embodiments describe herein may comprise methods, devices and apparatuses. The devices may comprise a processor, or instructions to be executed by a processor, configured to undertake any method described herein. Likewise, a method according to an embodiment may comprise a step which a processor executing instructions according to an embodiment is configured to undertake.

The modulated signal may be represented on a two-dimensional constellation. A two-dimensional constellation may be viewed as the Cartesian product of two PAM constellations. The modulated signal may be any modulated signal without any inherent dependency between the real and imaginary parts. As such, the signal may be a rectangular QAM modulated signal. The modulated signal may therefore be modulated by PAM or other equivalent modulating methods.

QAM signals comprise two carrier waves. These carrier waves may be considered to represent a real and imaginary component. These components are independent so the real and imaginary components can be considered independently. As such, demodulating the received signal may be done considering two points represented in 1 dimension. Embodiments described herein are applicable to any QAM constellation arrangement, provided there is no inherent dependency between the real/imaginary parts. Embodiments described herein may be for PAM and rectangular QAM constellations.

The binary reflected Gray labelling of rectangular QAM constellations is directly obtained through the Cartesian product of two binary reflected Gray labelled PAMs. As such, the consideration of the x and y axis bits can be done independently.

Where the received signal is a QAM signal using PAM, real and imaginary components may be determined from the QAM signal, and each may be treated as an independent PAM signal. As mentioned above, some of the bits will vary along the imaginary axis of the constellation diagram, whilst some of the bits will vary along the real axis. Accordingly, for each PAM signal, the LLR values may be calculated only for the bits which vary along the relevant axis for that component. The LLR values calculated for each PAM signal can then be combined to determine the whole of the demodulated signal.

The received signal may comprise a symbol, identified using a binary code, and noise. The binary codes used to identify symbols in embodiments are Gray codes, i.e. reflected binary code.

The received signal may comprise noise and so will normally not coincide with a constellation point. The received signal, or signal point may be represented as a point on an axis. Since the real and imaginary (in-phase and quadrature) components of the received signal are independent, the channel model can considered as being split into two channels, wherein the noise contaminated signal is represented and may be considered as being separated into its real and imaginary components. Therefore, the signal may be represented on two, one-dimensional plots, each of which represents a dimension or variable of the constellation plot, thus allowing the two dimensions of the signal to be calculated separately and subsequently combined.

The processor may be configured to represent the signal as a point on a plot representing one-dimension of a constellation diagram comprising a plurality of constellation points which are identified by binary reflected Gray-labelled codes;

Present embodiments are for use with constellations wherein the constellation points are identified using Gray labels, or Gray code. Embodiments described herein use binary reflected Gray code, in which each consecutive constellation point differs from the previous point by only one bit and there is reflective symmetry between the two halves of the PAM constellation with the only difference in the most significant bit which is '0' in one half and '1' in another.

Constellation points may be designated herein as $x_n$, where n is the number of the constellation point.

Embodiments may be used to locate the closest (one, two or more) points to the received signal from the subsets of constellation points whose i-th bits is "1" and "0" for every i.

Embodiments may be used to find a (or multiple) closest complementary constellation point and a hard decision point for a, or each, bit. Additionally, "auxiliary hard decision points" may be identified for a, or each, bit. It is to be understood that for a received signal there can be only one, unique, hard decision point. The term "auxiliary hard decision point" for the i-th bit as used herein describes a constellation point which has the same value for the i-th bit as the received signal and is used to determine a value for the log-likelihood ratio.

When considering a specific bit, e.g. the first bit of the code, a complementary constellation point is a constellation point that has a bit value (i.e. binary value) which is different to the bit value of the hard decision point (that is the constellation point closest to the received signal). As such, if the closest constellation point to a received signal is [0 1 0], complementary constellation points for the first bit have a 1 as the first bit, complementary constellation points for the second bit have a 0 as the second bit and complementary constellation points for the third bit have a 1 as the third bit.

A boundary is a value lying on the plotted axis or scale. In embodiments, a boundary is located at the arithmetic mean of two constellation points (i.e. at the midpoint). In an embodiment, if the boundary is located between the second and third constellation points, it will be said to be located at the second position, or simply at 2, by definition.

A complementary constellation point may be a constellation point that is separated from the signal by a boundary (i.e. on the other side of the boundary to the signal).

Examples of boundaries used in the present embodiments are key boundaries, image boundaries, second image boundaries or further image boundaries.

A boundary may be located between two constellation points that have different values for the bit of interest. As such, a boundary may separate complementary constellation points for the respective bit, from non-complementary constellation points. A boundary may be located between, and may separate, complementary constellation points and the received signal.

Where a boundary is located between two constellation points, the boundary may be located at (i.e. defines a value on a representation of one-dimension of the constellation) the midpoint or mean value of the two constellation points.

The hard decision point and closest complementary constellation point for a bit may be used to determine a value for the log likelihood ratio.

The log likelihood ratio may be used to demodulate the received signal. As such, embodiments may be configured to demodulate the received signal.

A value for the log likelihood ratio may be an approximation of the log likelihood ratio. As such, an embodiment may determine an approximation for, or approximate, the log likelihood ratio.

Identifying a closest complementary constellation point may comprise:
  defining a key boundary;
    wherein a key boundary defines a value on a representation of one-dimension of the constellation diagram;
  comparing the received signal to the key boundary; and
  setting the complementary constellation point closest to and on the other side of the key boundary to the signal, referred to as a key point, as the closest complementary constellation point.

Identifying a closest complementary constellation point may comprise:
  defining a key boundary;
    wherein a key boundary defines a value on a representation of one-dimension of the constellation diagram;
  comparing the received signal to the key boundary;
  defining an image boundary;
    wherein an image boundary defines a value on a representation of one-dimension of the constellation diagram and wherein the image boundary is located on the same side of the key boundary as the signal, between two constellation points that have different values for the bit;
  checking if a constellation point exists on the other side of the image boundary to the signal; and
  when a constellation point does not exist on the other side of the image boundary to the signal:
    setting the complementary constellation point closest to and on the other side of the key boundary to the signal, referred to as a key point, as the closest complementary constellation point.

A key boundary for the i-th bit may be denoted $k_i$, where $k_i=3$ means the boundary $k_i$ is located between the third and the fourth constellation point—i.e. at the arithmetic mean of $x_3$ and $x_4$. The same notation and numbering system applies for all boundaries according to embodiments.

The complementary constellation point ($\bar{x}_i$) closest to and on the other side of the key boundary to the signal (referred to as a key point) may be set as the closest complementary constellation point using:

$$\bar{x}_i = x_{k_i + \sigma_i^c}$$

Where $\sigma$ is a signature vector (see below), wherein $\sigma_i$ is the i-th entry in the vector; and the superscript c stands for the Boolean complement.

The closest complementary constellation point in some embodiments may be found by considering a key boundary, which separates complementary points from non-complementary points, and setting the constellation point on the other side of the boundary to the signal, as the closest complementary point. The key boundary may be the closest boundary (i.e. division between complementary and non-complementary constellation points) to the signal. This may, however, only be done after a check is conducted as to whether an image point exists.

When comparing the received signal to a boundary, it may be determined whether the signal has a greater value or smaller value than the location of the boundary, using analogue values. This comparison may be done in using an actual value, rather than the Gray-coded constellation points. Such a comparison is more efficient than calculating a Euclidean distance.

When the signal is greater than the boundary, the constellation point closest to and on the other side of the boundary to the signal will be the constellation point with a location which is smaller than the location of the boundary (i.e. to the left on a conventional horizontal scale). When the signal is less than the boundary, the constellation point closest to and on the other side of the boundary to the signal will be the constellation point with a location which is greater than the location of the boundary (i.e. to the right on a conventional horizontal scale).

In some specific embodiments described herein (e.g. those of FIGS. 6 and 9a), where unequal (e.g. Gaussian) spacing is used for the constellation, the closest complementary constellation point initially identified and defined as such, may not be the actual closest complementary constellation point (i.e. another constellation point may in fact be closer to the signal than this constellation point). In such cases, a further check may be employed to identify the actual closest complementary constellation point identified and update the definition, or identity, of the closest complementary constellation point accordingly. This further check may utilise an image boundary.

As such, it should be noted that in the present disclosure, closest complementary constellation point is not always used to refer to the complementary constellation point that is the actual closest. Rather, the term is used as a label which can be updated as algorithms according to the embodiment progress.

A closest complementary constellation point may be identified for a plurality of, or every, bit of the Gray-labelled codes. The processor may therefore be configured to identify a closest complementary constellation point (or a second or subsequent closest complementary constellation point) for a plurality of, or every, bit of the Gray-labelled codes.

Identifying a closest complementary constellation point for every bit of the Gray-labelled codes may comprise:
  defining a first key boundary for a first bit;
    wherein a key boundary defines a value on a representation of one-dimension of the constellation diagram;
  comparing the received signal to the first key boundary;
  setting the complementary constellation point closest to and on the other side of the first key boundary to the signal, referred to as the key point, as the closest complementary constellation point for the first bit;
  sequentially defining a respective key boundary for each further bit;
    wherein each respective key boundary is located on the same side of the key boundary for the previous bit as the signal, between two constellation points that have different values for the respective bit;
  comparing the received signal to each respective key boundary; and setting the complementary constellation point closest to and on the other side of the respective key boundary to the signal, referred to as the respective key point, as the closest complementary constellation point for the respective bit.

Identifying a closest complementary constellation point for every bit of the Gray-labelled codes may comprise:
  defining a first key boundary for a first bit;
    wherein a key boundary defines a value on a representation of one-dimension of the constellation diagram;
  comparing the received signal to the first key boundary;
  defining a first image boundary;
    wherein an image boundary defines a value on a representation of one-dimension of the constellation diagram and wherein the image boundary is located on the same side of the key boundary as the signal, between two constellation points that have different values for the bit;
  checking if a constellation point exists on the other side of the first image boundary to the signal; and
  when a constellation point does not exist on the other side of the first image boundary to the signal:
    setting the complementary constellation point closest to and on the other side of the key boundary to the signal, referred to as the first key point, as the closest complementary constellation point for the first bit;
  sequentially defining a respective key boundary for each further bit;
    wherein each respective key boundary is located on the same side of the key boundary for the previous bit as the signal, between two constellation points that have different values for the respective bit;
  comparing the received signal to each respective key boundary;
  defining a respective image boundary for each further bit;
    wherein an image boundary defines a value on a representation of one-dimension of the constellation diagram and wherein the image boundary is located on the same side of the respective key boundary as the signal, between two constellation points that have different values for the bit;
  checking if a constellation point exists on the other side of the respective image boundary to the signal; and
  when a constellation point does not exist on the other side of the respective image boundary to the signal:
    setting the complementary constellation point closest to and on the other side of the key boundary to the signal, referred to as the respective key point, as the closest complementary constellation point for the respective bit.

Identifying a closest complementary constellation point for every bit of the Gray-labelled codes may comprise:
  sequentially defining a respective key boundary for each further bit;
    wherein each respective key boundary is defined, or located, according to a binary search algorithm.

The previous bit may refer to the bit that immediately preceded the respective bit (i.e. neighbouring bit).

The search may start with the most significant bit (the leftmost bit). The previous bit may be the left neighbour of the current bit.

The following equation may be used to update a key boundary for the (i+1)-th bit, $k_{i+1}$.

$$k_{i+1} = k_i + (-1)^{\sigma_i^c} \frac{M}{2^{i+1}}$$

Where M is the size of the constellation; $\sigma$ is a signature vector (see below), wherein $\sigma_i$ is the i-th entry in the vector; and the superscript c stands for the Boolean complement.

The above equation may be implemented iteratively after the closest complementary point (or points) have been identified.

The above equation may be implemented iteratively until $$i < \log_2 M$$

Is no longer true, i.e. until a key boundary has been defined, determined or located for every bit of the Gray codes.

The first key boundary may be defined as $$k_1 = \frac{M}{2}.$$

A first key boundary may be located at the midpoint of the axis, e.g. at 0 in analogue. Due to the nature of binary reflected Gray code constellations, this should separate all of the constellation points with a 0 as their first bit from those with a 1 as their first bit.

A closest complementary constellation point (or points) may be identified for each bit of the Gray-code. As such, an embodiment may comprise an iterative procedure whereby a complementary constellation point may be identified for a first bit, before an equivalent method is undertaken to identify a complementary constellation point for a further bit.

A key boundary may be defined for each bit of the Gray-codes. The location of where a key boundary for an i-th bit of the Gray-code is defined may be dependent on, or determined by, the previous key boundary i.e. the (i−1)-th key boundary. Each successive key boundary may be located on the same side of the previous key boundary as the received signal. As such, the key boundary may, over a plurality of iterations, approach the received signal.

This process of defining key boundaries may be governed by a binary search method, wherein the definition of each key boundary is dependent on the previous key boundary. A, or each, key boundary may therefore be a binary search boundary, defined using a binary search method.

Each key boundary may be defined to be located between a complementary and non-complementary constellation point. As such, the constellation point next to the key boundary and on the other side of the key boundary to the signal, may be a complementary constellation point.

By using binary-reflected Gray labelling, each key boundary coincides with a boundary separating a complementary constellation point with its non-complementary counterpart.

A key boundary may be located such that it halves the undivided, or "remaining" axis, between two previous key boundaries, between a key boundary and the extreme end of the constellation, or between the two extreme ends of the constellation, in the manner of a binary search.

A first key boundary may be located at a point which separates the constellation points with a "0" as the first bit and the constellation points with a "1" as the first bit. An i-th key boundary may be located at a point which separates the constellation points with a "0" as the i-th bit and the constellation points with a "1" as the i-th bit. A key boundary for the i-th bit may be located at the midpoint of constellation points that differ for the i-th bit.

A key boundary or a first key boundary may be defined as being at the median location, or mid-point of the representation of one-dimension of the constellation diagram. Subsequent key boundaries may be defined as being at the mid-point of part of the representation of one-dimension of the constellation diagram. The part of the representation of one-dimension of the constellation diagram may be a portion bounded by the key boundary for the previous bit and either a previous key boundary or an end point of the representation of one-dimension of the constellation diagram. The part of the representation of one-dimension of the constellation diagram may be on the same side of the key boundary for the previous bit as the signal.

A signature vector may be defined, whereby the signature vector stores the results of a, or each of, the comparisons between the key boundaries and the received signal. A signature vector may be used to determine the location of a subsequent key boundary. As such, the location of a key boundary may be dependent on the location of the previous key boundary and the relevant input in the signature vector for the comparison between the received signal and the previous key boundary.

A signature vector may store binary inputs, whereby a 1 in the i-th entry of the signature vector means the signal was greater than the key boundary for the i-th bit and a 0 means the signal was less than the key boundary for the i-th bit.

The signature vector may be defined as $\sigma$, wherein $\sigma_i$ is set to one if the received signal is greater than the i-th key boundary, otherwise $\sigma_i$ is set to zero.

Although it is noted that during a comparison, the signal may be found to be equal to the boundary to which it is being compared, the odds of this happening are so negligibly small that such an outcome is not considered herein. If necessary, an 'equals' result to a comparison can be classified as either a 'larger than', or 'smaller than' result, depending on the specific embodiment described herein.

The signature vector may be populated by using the following equation:

$$\sigma_i = \max\left(\text{sign}\left(y - \frac{x_{k_i} + x_{k_{i+1}}}{2}\right), 0\right)$$

Identifying the hard decision point may comprise:
comparing the received signal to the key boundary for the last bit of the Gray-labelled codes; and
setting the constellation point closest to the key boundary for the last bit of the Gray-labelled codes and on the same side of the key boundary as the signal point, as the hard decision point.

The hard decision point $x^{ML}$ may be defined as:

$$x^{ML} = x_{k_i + \sigma_i}$$

When i refers to the last bit of the Gray codes. Alternatively, this may be expressed as:

$$x^{ML} = x_{k_m + \sigma_m}$$

Where m denotes the number of bits of the underlying PAM constellation.

Due to the nature of Gray-coded constellations, assuming that the key boundaries are defined such that the first key boundary is at the midpoint; all subsequent key boundaries are located between complementary constellation points and non-complementary constellation points for the respective bit; and each subsequent key boundary is located such that it is on the same side of the previous key boundary as the signal, the key boundary for the last bit will be located between a complementary constellation point and the hard decision point. As such, simply selecting the constellation point on the same side of this key boundary as the signal will result in selecting the hard decision point, i.e. the closest constellation point to the received signal.

The instructions may be further configured to:
determine a signature vector;
wherein the entries of the signature vector comprise the results of the comparisons between the received signal with each respective key boundary, respectively.

Identifying the hard decision point may comprise:
setting the Gray-label equivalent to the binary signature vector as the hard decision point.

The signature vector may be a binary signature vector
The signature vector may be defined as described above. In which case, changing the binary vector into the equivalent Gray code may provide the gray code of the hard decision point.

Identifying a closest complementary constellation point may comprise:
defining an image boundary;
wherein an image boundary defines a value on a representation of one-dimension of the constellation diagram and wherein the image boundary is located on the same side of the key boundary as the signal, between two constellation points that have different values for the bit; and checking if a constellation point exists on the other side of the image boundary to the signal Identifying a closest complementary constellation point may comprise:

when a constellation point exists on the other side of the image boundary to the signal:
determining whether the complementary constellation point closest to and on the other side of the image boundary to the signal, referred to as an image point, is closer to the signal than the key point; and
when the image point is closer to the signal than the key point, setting the image point as the closest complementary constellation point.

Identifying a closest complementary constellation point may comprise:

when a constellation point exists on the other side of the image boundary to the signal:
setting whichever is closest to the received signal out of the complementary constellation point closest to and on the other side of the image boundary to the signal, referred to as an image point, and the key point, as the closest complementary constellation point.

Setting whichever is closest to the received signal out of the image point and the key point, as the closest complementary constellation point, may comprise determining whether the image point or key point is closer to the received signal.

In determining whether the image point is closer to the signal than the key point, it may be checked whether the key point is further away from the signal than the image point. This may apply to any check on whether a certain point is closer than an alternative point. Since it is assumed that the chance of the points being equidistance from a signal is negligible, it can equivalently be determined whether a first point is closer, or whether a second point is further away.

Determining whether the complementary constellation point closest to and on the other side of the image boundary to the signal, referred to as an image point, is closer to the signal than the key; may comprise:
setting the complementary constellation point closest to and on the other side of the image boundary to the signal as an image point for the bit.

Determining whether the complementary constellation point closest to and on the other side of the image boundary to the signal, referred to as an image point, is closer to the signal than the key point; and when the image point is closer to the signal than the key point, setting the image point as the closest complementary constellation point may comprise:
calculating the Euclidean distance in a representation of one-dimension of the constellation diagram between the signal and the image point and the Euclidean distance between the signal and key point; and
comparing the distance between the signal and the image point and the distance between the signal and key point; and when the distance between the signal and key point is greater than the signal and the image point, setting the image point as the closest complementary constellation point.

Determining whether the complementary constellation point closest to and on the other side of the image boundary to the signal, referred to as an image point, is closer to the signal than the key point; and when the image point is closer to the signal than the key point, setting the image point as the closest complementary constellation point may comprise:
comparing the received signal to a midpoint between the key point and the image point; and
when the midpoint between the key point and the image point is on the same side of the received signal as the key point, setting the image point as the closest complementary constellation point.

Determining which of two points is closest to the received signal may comprise comparing the value (magnitude) of the received signal to a midpoint of the two points.

Determining which is closest to the received signal out of a first point (e.g. the key point) and a second point (e.g. the complementary constellation point closest to and on the other side of the image boundary to the signal, referred to as an image point), may comprise:
setting a first comparison point as the minimum, or smaller, of the first point and the second point;
setting a second comparison point as the maximum, or greater, of the first point and the second point; and
determining if the received signal is less than the arithmetic mean of the first and second comparison point.

A midpoint between two points may be the arithmetic mean of the two points.

Setting whichever is closest to the received signal out of the image point and the key point, as the closest complementary constellation point, may comprise:
setting a first comparison point as the minimum of the key point and the image point;
setting a second comparison point as the maximum of the key point and the image point;
determining if the received signal is less than the arithmetic mean of the first and second comparison point; and
setting the first comparison point as the closest complementary constellation point when the received signal is less than the arithmetic mean.

Generally speaking, setting whichever is closest to the received signal out of a first point (e.g. the key point) and a second point (e.g. the complementary constellation point closest to and on the other side of the image boundary to the signal, referred to as an image point) as the closest complementary constellation point; may comprise:
setting a first comparison point as the minimum, or smaller, of the first point and the second point;
setting a second comparison point as the maximum, or greater, of the first point and the second point; and
determining if the received signal is less than the arithmetic mean of the first and second comparison point.

Setting whichever is closest to the received signal out of the key point and the complementary constellation point closest to and on the other side of the image boundary to the signal, referred to as an image point, as the closest complementary constellation point; may further comprise:
setting the first comparison point as the closest complementary constellation point when the received signal is less than the arithmetic mean.

The second comparison point may be set as the closest complementary constellation point when the received signal is not less than the arithmetic mean.

In any of the embodiments described herein, where it must be determined which of a first and second point is closest to the received signal, this may be achieved by identifying the midpoint of the first and second points. It may then be determined on which side of the received signal the midpoint is located. The constellation point on the other side of the received signal to the midpoint is closest. For example, if a first constellation point is less than the received signal and a second constellation point is greater than the received signal and the midpoint of a first and second constellation point is located on the same side of the received signal as the first constellation point (i.e. it is determined to be less than the received signal), the second constellation point is closer to the received signal.

An image boundary may be defined in order to check that a complementary constellation point on the other side of the signal point from the key point isn't in fact closer than the key point.

An image boundary l may be defined as $$l = k_i + (-1)^{\sigma_i^c} \frac{M}{2^{i-1}}$$

An image boundary may be defined at the location that the next step of the binary search would be located.

Checking if a constellation point exists on the other side of the image boundary to the signal may be done by checking if the following is true (naturally an equivalent check can made by rearranging the below inequality, for example by multiplying it by M):

$$\frac{1}{2^i} \leq \frac{l}{M} \leq 1 - \frac{1}{2^i}$$

Setting an image point, $x_{l+\sigma_i}$, as the closest complementary constellation point, may be implemented using:

$$\bar{x}_i = x_{l+\sigma_i}$$

Image boundaries may be defined and checked for each respective bit. As such, the respective key boundaries may be used to define the respective image boundaries for the respective bit of the Gray code. The above algorithm regarding defining an image boundary; checking if a constellation point exists on the other side of the image boundary to the signal; and the steps following when a constellation point exists on the other side of the image boundary to the signal may all be undertaken for each bit of the Gray code. It may be that for the majority of bits in a Gray code, no image point exists and so no further steps are required.

The processor may be configured to:
identify, for the bit of the Gray-labelled codes, a closest complementary constellation point to the signal and a second closest complementary constellation point to the signal;
identify a hard decision point and an auxiliary hard decision point, wherein an auxiliary hard decision point is the second closest constellation point to the signal that has the same value for the bit as the hard decision point; and
determine a value for a log likelihood ratio using the hard decision point, an auxiliary hard decision point, the closest complementary constellation point and the second closest complementary constellation point.

Embodiments may identify one, two, three, four, five or more than five closest complementary constellation points and equivalent non-complementary constellation points (i.e. the hard decision point and auxiliary hard decision point(s)). Using more points in demodulating the received signal may result in more accurate demodulation and embodiments described herein may use any number of closest complementary constellation points and auxiliary hard decision points. Increasing the number of points considered will, however, increase complexity. Inherently, the embodiments described herein with regard to max-log MAP and $max_2$-log MAP will be included within any embodiment using more than two terms for the complementary and non-complementary constellation points.

All the methods described as being for identifying a closest complementary constellation point when only a closest complementary constellation point is identified are equally applicable for identifying a closest complementary constellation point when a second closest complementary constellation point is being identified. The same applies to methods relating to the identification of the hard decision point.

As such, discussion relating to identifying a closest complementary constellation point or the hard decision point is applicable to any embodiment, mutatis mutandis, regardless of how many closest complementary constellation points or auxiliary hard decision points are identified.

The processor may be configured to:
identify, for every bit of the Gray-labelled codes, a closest complementary constellation point to the signal and a second closest complementary constellation point to the signal;
identify a hard decision point and an auxiliary hard decision point, wherein an auxiliary hard decision point is the second closest constellation point to the signal that has the same value for the bit as the hard decision point; and
determine a value for a log likelihood ratio using the hard decision point, an auxiliary hard decision point, the closest complementary constellation point and the second closest complementary constellation point.

The methods described in relation to identifying multiple closest complementary constellation points and auxiliary hard decision points are applicable to be applied to each, or every, bit, not just a bit. All methods of identifying closest and second closest complementary constellation points described as being undertaken for a bit may also be interpreted as being undertaken for every bit, with references to a boundary being regarded as to the respective boundary for that bit and the key boundary being updated as discussed above for each successive bit. As such, all references to a key boundary, image boundary etc can be replaced with references to a respective boundary etc, as required.

Identifying the closest complementary constellation point to the signal and the second closest complementary constellation point to the signal, may comprise:
when no constellation point exists on the other side of the image boundary to the signal:
setting the complementary constellation point next to and on the same side of the key boundary as the key point, as the second closest complementary constellation point.

The complementary constellation point next to and on the same side of the key boundary as the closest complementary constellation point (which may be the key point) may be set as the second closest complementary constellation point by using the following:

$$\bar{x}_i = x_{k_i + \sigma_i^c + (-1)^{\sigma_i}}$$

Where $\bar{x}_i$ is the second closest complementary constellation point.

Identifying the closest complementary constellation point to the signal and the second closest complementary constellation point to the signal, may comprise:

when a constellation point exists on the other side of the image boundary to the signal and the image point is closer to the signal than the key point:
setting the image point as the closest complementary constellation point; and
setting the key point as the second closest complementary constellation point; and
when a constellation point exists on the other side of the image boundary to the signal and the image point is not closer to the signal than the key point:
setting the image point as the second closest complementary constellation point.

Identifying the closest complementary constellation point to the signal and the second closest complementary constellation point to the signal, may comprise:
when a constellation point exists on the other side of the image boundary to the signal and the image point is closer to the signal than the key point:
setting the image point as the closest complementary constellation point; and
when the image point is at an extreme of the constellation:
setting the key point as the second closest complementary constellation point.

Alternatively or additionally, identifying the closest complementary constellation point to the signal and the second closest complementary constellation point to the signal, may comprise:
when a constellation point exists on the other side of the image boundary to the signal and the image point is not closer to the signal than the key point:
setting the key point as the closest complementary constellation point; and
when the key point is at an extreme of the constellation:
setting the image point as the second closest complementary constellation point.

When the key point is set as the closest complementary constellation point and the key point is not at an extreme of the constellation, it may be checked if the received signal is closer to the image point or the point which is the neighbour to the key point on the other side of the key point to the image point.

Whichever of the image point or the neighbour to the key point on the other side to the image point is closest to the received signal may then be set as the second closest complementary constellation point.

When the image point is set as the closest complementary constellation point and the image point is not at an extreme of the constellation, it may be checked if the received signal is closer to the key point or the point which is the neighbour to the image point on the other side to the image point to the key point.

Whichever of the key point or the neighbour to the image point is closest to the received signal may then be set as the second closest complementary constellation point.

Setting the image point as the second closest complementary constellation point may be done using $$\bar{x}_i = x_{l+\alpha_i}$$

Identifying the closest complementary constellation point to the signal and the second closest complementary constellation point to the signal, may comprise:
when a constellation point exists on the other side of the image boundary to the signal and the image point is closer to the signal than the key point:
defining a second image boundary, wherein the second image boundary defines a value on a representation of one-dimension of the constellation diagram and wherein the second image boundary is located between two constellation points which have Gray-labelled codes which are:
shifted by two constellation points in a positive direction with respect to the two constellation points between which the image boundary is located, when the value of the signal is greater than that of the key boundary; or
shifted by one constellation point in a negative direction with respect to the two constellation points between which the image boundary is located, when the value of the signal is less than that of the key boundary;
when a constellation point exists on the other side of the image boundary to the signal and the image point is not closer to the signal than the key point:
defining a second image boundary, wherein the second image boundary defines a value on a representation of one-dimension of the constellation diagram and wherein the second image boundary is located between two constellation points which have Gray-labelled codes which are:
shifted by one constellation point in a negative direction with respect to the two constellation points between which the key boundary is located, when the value of the signal is greater than that of the key boundary; or
shifted by two constellation points in a positive direction with respect to the two constellation points between which the key boundary is located, when the value of the signal is less than that of the key boundary; and
checking that both of the two constellation points between which the second image boundary is located exist; and
when both of the two constellation points between which the second image boundary is located exist:
determining whether the constellation point with the lowest Gray-labelled code out of the two constellation points between which the second image boundary is located, referred to as a second image point, is closer to the signal than the second closest complementary constellation point; and
when the second image point is closer to the signal than the second closest complementary constellation point, setting the second image point as the second closest complementary constellation point.

In the present disclosure, determining whether a first point is closer to the signal than a second point may be done by checking whether the second point is further away from the signal than the first point.

Identifying the closest complementary constellation point to the signal and the second closest complementary constellation point to the signal, may comprise:
when a constellation point exists on the other side of the image boundary to the signal and the image point is closer to the signal than the key point:
defining a second image boundary, wherein the second image boundary defines a value on a representation of one-dimension of the constellation diagram and wherein the second image boundary is located between two constellation points which have Gray-labelled codes which are:
shifted by two constellation points in a positive direction with respect to the two constellation points between which the image boundary is located, when the value of the signal is greater than that of the key boundary; or shifted by one constellation point in a negative direction with respect to the two constellation points between which the image boundary is located, when the value of the signal is less than that of the key boundary;

when a constellation point exists on the other side of the image boundary to the signal and the image point is not closer to the signal than the key point:

defining a second image boundary, wherein the second image boundary defines a value on a representation of one-dimension of the constellation diagram and wherein the second image boundary is located between two constellation points which have Gray-labelled codes which are:

shifted by one constellation point in a negative direction with respect to the two constellation points between which the key boundary is located, when the value of the signal is greater than that of the key boundary; or shifted by two constellation points in a positive direction with respect to the two constellation points between which the key boundary is located, when the value of the signal is less than that of the key boundary; and checking that both of the two constellation points between which the second image boundary is located exist; and when both of the two constellation points between which the second image boundary is located exist:

determining whether the constellation point with the lowest Gray-labelled code out of the two constellation points between which the second image boundary is located, referred to as a second image point, is closer to the signal than the second closest complementary constellation point; and when the second image point is closer to the signal than the second closest complementary constellation point, setting the second image point as the second closest complementary constellation point.

Where it says that a first boundary is shifted by a certain number of constellation points with respect to a second boundary, it is to be construed as defining a first boundary a certain distance in either a positive or negative direction with respect to the second boundary. The positive direction is to the right in FIGS. 10 to 12 and the negative direction is to the left. For example, where a second image boundary is located between two constellation points which are shifted by two constellation points in a positive direction with respect to the two constellation points between which the image boundary is located—this means that the second image boundary is located to the right of the image boundary and is in the second gap to the right of the image boundary, a gap being the space between two constellation points.

Defining a second image boundary (l') when a constellation point exists on the other side of the image boundary to the signal and the Euclidean distance between the signal and the key point is greater than the distance between the signal and the image point may be done according to:

$$l' = l + \sigma_i + (-1)^{\sigma_i^f}$$

Defining a second image boundary when a constellation point exists on the other side of the image boundary to the signal and the Euclidean distance between the signal and the key point is not greater than the distance between the signal and the image point may be done according to:

$$l' = k_l + \sigma_i^c + (-1)^{\sigma_i}$$

The second image point, $x_{l'}$, may be the constellation point immediately to the left of (i.e. lower than) the second image boundary.

Checking that both of the two constellation points between which the second image boundary is located exist makes sure that the second image boundary would be within the bounds of the constellation. If one of the points does not exist, the boundary cannot exist within the confines of the constellation and, correspondingly, no second image point can exist. In this is the scenario no further changes are made to the closest and second closest complementary constellation points. The similar principle applies with the (first) image boundary—where a check is undertaken to ensure the image point exists.

Checking that both of the two constellation points between which the second image boundary is located exist, i.e. checking that the second image boundary exists, may be done by checking if that the following is true:

$$1 \leq l' \leq M$$

Setting the second image point as the second closest complementary constellation point may be implemented using the following:

$$\bar{\bar{x}}_i = x_{l'}$$

Identifying a hard decision point and an auxiliary hard decision point may comprise:

identifying the hard decision point;

determining whether the hard decision point is at an extreme of an axis of the constellation diagram; and when the hard decision point is at an extreme of an axis of the constellation diagram:

setting the constellation point next to the hard decision point as a first auxiliary hard decision point; and setting the constellation point three away from the hard decision point as a second auxiliary hard decision point.

The above is true due to the characteristics of binary reflected Gray labelling.

In an embodiment, the hard decision point can only be identified once all of the closest (and where applicable, second closest) complementary constellation points have been found. As such, in some embodiments, the closest (and second closest) complementary constellation points are identified for each bit using methods described herein, before the hard decision point is identified as described herein.

This is because, in some embodiments, the hard decision point may be identified using the key boundary for the last bit in the Gray code, or using a signature vector, which is only completed after comparing the received signal to the key boundary for the last bit in the Gray code.

An extreme of an axis of the constellation diagram is the last constellation point in one of the dimensions, that is, the end points of the dimension of the constellation diagram i.e. the constellation point constituting the outer boundary of the constellation diagram.

Determining whether the hard decision point is at an extreme of an axis may comprise checking if the following is not true:

$$1 < k_m + \sigma_m < M$$

If the above is satisfied, the hard decision point is not at an extreme of an axis. If the above is not satisfied, the hard decision point is at an extreme of an axis.

Setting the constellation point next to the hard decision point as a first auxiliary hard decision point may be implemented according to $$\bar{x}^{ML} = x_{k_l + \sigma_l + (-1)^{\sigma_1}}$$

Setting the constellation point three away from the hard decision point as a second auxiliary hard decision point may be implemented according to $$\bar{x}^{ML} = x_{k_i + \sigma_i + 3(-1)^{\sigma_1}}$$

Identifying a hard decision point and an auxiliary hard decision point may comprise:
identifying the hard decision point;
determining, in a representation of one-dimension of the constellation diagram,
whether a first test point or a second test point is closer to the signal;
wherein the first and second test points are constellation points on either side of the hard decision point; and
when the first test point is not closer to the signal than the second test point:
setting the second test point as the first auxiliary hard decision point.

The first and second test points may be arranged such that the first test point is closer to the origin than the second test point. The first and second test points may be arranged such that the first test point is smaller than the second test point.

When the first test point is not closer to the signal than the second test point, the first test point may be set as the second auxiliary hard decision point.

When the first test point is closer to the signal than the second test point, the first test point may be set as the first auxiliary hard decision point. The second test point may be set as the second auxiliary hard decision point.

Identifying a hard decision point and an auxiliary hard decision point may comprise:
identifying the hard decision point;
calculating the Euclidean distance in a representation of one-dimension of the constellation diagram between the signal and a first test point and the Euclidean distance between the signal a second test point;
wherein the first and second test points are constellation points on either side of the hard decision point and the first test point is closer to the origin of the constellation diagram than the second test point;
comparing the distance between the signal and the first test point and the distance between the signal and second test point; and
when the distance between the signal and the first test point is not less than the distance between the signal and the second test point:
setting the second test point as the first auxiliary hard decision point and the first test point as the second auxiliary hard decision point.

Identifying a hard decision point and an auxiliary hard decision point may comprise:
identifying the hard decision point;
determining which of a first test point and a second test point is closest to the received signal, wherein the first and second test points are constellation points on either side of the hard decision point and the first test point is less, or smaller than, than the second test point;
comparing the received signal to the arithmetic mean of the first and second test point; and
when the arithmetic mean is greater than the received signal, setting the first test point as the first auxiliary hard decision point.

Identifying a hard decision point and an auxiliary hard decision point may comprise:
identifying the hard decision point;
comparing, in a representation of one-dimension of the constellation diagram, the received signal to a midpoint between a first test point and a second test point;
wherein the first and second test points are constellation points on either side of the hard decision point and the first test point is closer to the origin of the constellation diagram than the second test point; and
when the midpoint between the first and second test points is not on the same side of the received signal as the second test point:
setting the second test point as the first auxiliary hard decision point and the first test point as the second auxiliary hard decision point.

Identifying a hard decision point and an auxiliary hard decision point may comprise:
setting the constellation points on either side of the hard decision point as a first and second test point;
wherein the first test point is closer to the origin of the constellation diagram than the second test point.

The above may be implemented if the hard decision point is not at an extreme of an axis.

Setting the constellation points on either side of the hard decision point as a first and second test point may be implemented according to $$u = k_m + \sigma_m + (-1)^{\sigma_1}$$

And $$v = k_m + \sigma_m + (-1)^{\sigma_1 c}$$

wherein $x_u$ may be the first test point and $x_v$ may be the second test point.

Setting the second test point as the first auxiliary hard decision point may be implemented using $$\bar{x}^{ML} = x_v$$

Setting the first test point as the second auxiliary hard decision point may be implemented using $$\bar{x}^{ML} = x_u$$

When the first test point is closer to the signal than the second test point, identifying a hard decision point and an auxiliary hard decision point may comprise identifying a third test point and determining whether the second test point is further from the signal than the third test point. It may be determined which, of the second and third test points, is closer to the signal.

When the second test point is further from the signal than the third test point, the first test point may be set as the first auxiliary hard decision point and the third test point may be set as the second auxiliary hard decision point.

When the second test point is not further from the signal than the third test point, the first test point may be set as the first auxiliary hard decision point and the second test point may be set as the second auxiliary hard decision point.

The third test point may be obtained from a stored lookup table. The storage device may be configured to store a lookup table for storing a third test point. The storage device may be configured to receive a lookup table for a third test point. The processor may be configured such that a lookup table can be input and stored on the storage device. The below steps may be undertaken by a user, or by the processor, in order to populate a lookup table. The lookup table may be dependent on the constellation size, e.g. the number of constellation points. Assuming that binary reflected Gray labelling is adopted, a lookup table may be required for each constellation. Where a system is configured to transmit at different rates, a lookup table may be stored for each constellation. The table entries may not depend on the received signal. A lookup table can therefore be developed and/or evaluated offline.

An entry in the look-up table is required for all points of the constellation except four. For instance, if the underlying constellation is 8-PAM, you need a lookup table with four entries (cf. FIGS. 17 and 18). This is because the extreme points do not need any comparisons and the first and second auxiliary points are determined straightforwardly. Moreover, for the inner points, no third point exists.

Identifying a hard decision point and an auxiliary hard decision point may comprise:
looking up a value from a look-up table;
wherein the values in the look-up table are dependent on the size of the constellation; and
using the value from the look-up table to identify an auxiliary hard decision point.

The value from the look-up table may define a point, for example a test point or a comparison point. The value from the look-up table may define a point, the point may be an auxiliary hard decision point.

When identifying and checking the third test point, any of the below steps may be undertaken.

The first test point, $x_u$, may be set as a first auxiliary hard devision point, $\bar{x}^{ML}$.

A decision step may determine if $$\left(\frac{k_i + \sigma_i}{\frac{M}{2}+1}\right)^{(-1)^{\sigma_1}} < 1.$$

If not, the second test point, $x_v$, may be set as $\bar{x}^{ML}$.
If $$\left(\frac{k_i + \sigma_i}{\frac{M}{2}+1}\right)^{(-1)^{\sigma_1}} < 1$$

is true, the remainder, r, of $(k_i+\sigma_i-\sigma_1) \div 4$ may be calculated.

If the remainder, r, is greater than 0, a parameter, $\Delta$, may be defined as $\Delta=2^{2-rem(r,2)}$.

If the remainder, r, is not greater than 0, a parameter, r', may be defied such that $$r' = \left\lfloor \frac{\sigma_1(M+1) + (-1)^{\sigma_1}(k_i + \sigma_i)}{4} \right\rfloor.$$

A further parameter, $\Delta$, may then be defined as $\Delta=2^{4-rem(r',2)}$.

A third test point boundary, w, may then be defined as $w=k_i+\sigma_i+(-1)^{\sigma_1}(\Delta+1)$.

A third test point may be defined as $x_w$.

It may then be determined if the second test point is further away from the signal than the third test point. I.e. $|y-x_v|>|y-x_w|$.

If so, the third test point is set as the second auxiliary hard decision point, i.e. $x_w=\bar{x}^{ML}$.

If not, the second test point is set as the second auxiliary hard decision point, i.e. $x_v=\bar{x}^{ML}$.

This method allows the third point to be calculated upon determining the hard decision point. According to an alternative method described herein, however, the look-up table may be populated offline and the third point can be directly retrieved once the hard decision point is found by a simple lookup table query.

The auxiliary hard decision points may alternatively be determined as follows.

Two test points may be defined as $x_\alpha$ and $x_b$ where $\alpha=k_m+\sigma_m-1$ and $\beta=k_m+\sigma_m+1$.

It may be determined if the received signal is closer to $x_\alpha$ than $x_b$. If the answer to this is yes, The first auxiliary hard decision point may be set as $x_\alpha$, $\bar{x}^{ML}=x_\alpha$.

It may then be determined if $$k_m + \sigma_m > \frac{M}{2} + 1.$$

If the answer is no, $x_b$ may be set as the second auxiliary hard decision point, $\bar{x}^{ML}=x_\beta$.

If the answer to $$k_m + \sigma_m > \frac{M}{2} + 1$$

is yes, it may be determined $$\text{whether } < \frac{x_{w(k_m+\sigma_m)} + x_\beta}{2}.$$

Note that w may be determined offline in accordance with an algorithm described herein. If the answer to $$y < \frac{x_{w(k_m+\sigma_m)} + x_\beta}{2}$$

is no, $x_b$ may be set as the second auxiliary hard decision point, $\bar{x}^{ML}=x_\beta$. If the answer to $$y < \frac{x_{w(k_m+\sigma_m)} + x_\beta}{2}$$

is yes, the second auxiliary hard decision point may be set as follows: $\bar{x}^{ML}=x_{w(k_m+\sigma_m)}$ If the received signal is not closer to $x_\alpha$ than $x_b$, $x_b$ may be set as the first auxiliary hard decision point, $\bar{x}^{ML}=x_\beta$. A decision step may then determine if $$k_m + \sigma_m < \frac{M}{2}.$$

If the answer to this is no, $x_\alpha$ may be set as the second auxiliary hard decision point, $\bar{x}^{ML}=x_\alpha$. If the answer to $$k_m + \sigma_m < \frac{M}{2}$$

is yes, it may be checked if $$y < \frac{x_\alpha + x_w(k_m + \sigma_m)}{2}.$$

If the answer to this is yes, $x_\alpha$ may be set as the second auxiliary hard decision point, $\overline{x}^{ML} = x_\alpha$. If the answer to this is no, the second auxiliary hard decision point may be set as follows: $\overline{x}^{ML} = x_{w(k_m + \sigma_m)}$.

A method for calculating w according to an embodiment will now be described. This algorithm may be used with any embodiment where the auxiliary hard decision points may be determined offline. Two slightly different algorithms are required in order to calculate w (i.e. the lookup table entries) for the left half (cf. FIG. 17) and right half (cf. FIG. 18) of the constellation points. These two algorithms will now be described.

For the left half of constellation points, first i=2. A remainder may then be calculated in accordance with r=rem (i, 4).

A decision may be made as to whether r>0. If this is not the case, a variable may be defined as follows:

$$\delta = 2^{4 - rem(\lfloor \frac{i}{4} \rfloor, 2)}.$$

If r>0, the variable may be set instead as follows: $\delta = 2^{2 - rem(r, 2)}$.

Once the variable $\delta$ has been determined, the value of w may be set as $w(i) = i + \delta + 1$.

Subsequently, the following operations may be undertaken: i=i+1. Then a decision step may determine whether $$i > \frac{M}{2}.$$

If the answer is yes, the algorithm is complete. If the answer is no, a loop may take the algorithm back to calculate the remainder as follows: r=rem(i,4).

The method for calculating w for the right half of constellation points may be as follows. This algorithm may be used with any embodiment where the auxiliary hard decision points may be determined offline.

First $$i = \frac{M}{2} + 2.$$

Then a remainder may be calculated as follows: r=rem(i−1,4). Next, a decision may be made as to whether r>0. If the answer to the decision step is no, a variable may be defined as follows:

$$\delta = 2^{4 - rem(\lfloor \frac{M - i + 1}{4} \rfloor, 2)}.$$

If the answer to the decision is instead yes, the variable may instead be defined as $\delta = 2^{2 - rem(r, 2)}$.

Next w may be defined as $w(i) = i - \delta - 1$. Then a step may update i=i+1.

Then a decision step may then determine whether i>M. If the answer is yes, the algorithm is complete and w has been determined. If the answer is no, a loop may take the algorithm back to defining a remainder as r=rem(i−1,4).

An auxiliary or second (or subsequent) auxiliary hard decision point may be located using a test point, or variable dependent on the constellation size. A test point or variable dependent on the constellation size may be stored in a look-up table. As such, an auxiliary or second (or subsequent) auxiliary hard decision point may be determined with the aid of a look-up table.

Determining a value for the log likelihood ratio using the closest complementary constellation point and the hard decision point may be done according to the following formula:

$$LLR(b_i) \approx \frac{\min_{b:b_i=0} |y - x_b|^2 - \min_{b:b_i=1} |y - x_b|^2}{2N_O}$$

wherein LLR is the log likelihood ratio; $b_i$ is the bit number, i, of a transmitted codeword b; y is the received signal; and $x_b$ is a constellation point.

According to an embodiment is a method for determining a value for a log likelihood ratio for demapping modulated signals. The method may comprise:
  receiving a modulated signal which is to be demodulated using a constellation diagram comprising a plurality of constellation points which are identified by Binary reflected Gray-labelled codes;
  identifying, for a bit of the Gray-labelled codes, a closest complementary constellation point to the signal when considering the signal as a point on a representation of one-dimension of the constellation diagram;
  identifying a hard decision point,
    wherein the hard decision point is the closest constellation point to the signal when considering the signal as a point on a representation of one-dimension of a constellation diagram; and
    a complementary constellation point is a constellation point which has a different value for the bit compared to the hard decision point; and
  determining a value for a log likelihood ratio using the hard decision point and the closest complementary constellation point.

The method may comprise representing the signal as a point on a plot representing one-dimension of a constellation diagram comprising a plurality of constellation points which are identified by Binary reflected Gray-labelled codes;

The method may comprise demodulating the signal using the log likelihood ratio.

In an embodiment, a closest complementary constellation point may identified for every bit of the Gray-labelled codes.

Identifying a closest complementary constellation point for every bit of the Gray-labelled codes may comprise:
  defining a first key boundary for a first bit;
    wherein a key boundary defines a value on a representation of one-dimension of the constellation diagram
  comparing the received signal to the first key boundary;
  defining a first image boundary;
    wherein an image boundary defines a value on a representation of one-dimension of the constellation diagram and wherein the image boundary is located on the same side of the key boundary as the signal, between two constellation points that have different values for the bit;

checking if a constellation point exists on the other side of the first image boundary to the signal; and
when a constellation point does not exist on the other side of the first image boundary to the signal:
setting the complementary constellation point closest to and on the other side of the first key boundary to the signal, referred to as the first key point, as the closest complementary constellation point for the first bit.
sequentially defining a respective key boundary for each further bit;
wherein each respective key boundary is located on the same side of the key boundary for the previous bit as the signal, between two constellation points that have different values for the respective bit;
comparing the received signal to each respective key boundary;
defining a respective image boundary for each further bit;
wherein an image boundary defines a value on a representation of one-dimension of the constellation diagram and wherein the image boundary is located on the same side of the respective key boundary as the signal, between two constellation points that have different values for the bit;
checking if a constellation point exists on the other side of the respective image boundary to the signal; and
when a constellation point does not exist on the other side of the respective image boundary to the signal:
setting the complementary constellation point closest to and on the other side of the key boundary to the signal, referred to as the respective key point, as the closest complementary constellation point for the respective bit.

A closest complementary constellation point may be identified for every bit of the Gray-labelled codes; and
wherein identifying a closest complementary constellation point for every bit of the Gray-labelled codes may comprise:
defining a first key boundary for a first bit;
wherein a key boundary defines a value on a representation of one-dimension of the constellation diagram
comparing the received signal to the first key boundary;
setting the complementary constellation point closest to and on the other side of the first key boundary to the signal, referred to as a key point, as the closest complementary constellation point for the first bit;
sequentially defining a respective key boundary for each further bit;
wherein each respective key boundary is located on the same side of the key boundary for the previous bit as the signal, between two constellation points that have different values for the respective bit;
comparing the received signal to each respective key boundary; and
setting the complementary constellation point closest to and on the other side of the respective key boundary to the signal, referred to as a respective key point, as the closest complementary constellation point for the respective bit.

The method may comprise:
identifying, for the bit of the Gray-labelled codes, a closest complementary constellation point to the signal and a second closest complementary constellation point to the signal;
identifying a hard decision point and an auxiliary hard decision point, wherein an auxiliary hard decision point is the second closest constellation point with the same value for the bit as the hard decision point to the signal; and
determining a value for a log likelihood ratio using the hard decision point, an auxiliary hard decision point, the closest complementary constellation point and the second closest complementary constellation point.

Further according to an embodiment is a computer readable carrier medium carrying computer executable instructions which, when executed on a processor, cause the processor to carry out a method according to an embodiment.

Further according to an embodiment is a non-transitory computer readable medium containing program instructions for a computer to perform a method as describe anywhere herein.

According to an embodiment, low-complexity soft demapping for non-uniform constellations is considered, although the embodiments may be used for uniform constellations. Driven by the fact that the original sum-log expression in the log-likelihood ratio (LLR) may be better approximated by considering only the two closest points to the received noise-contaminated signal, an algorithm is denoted by $Max_2$-log MAP. Compared to the well-known Max-log MAP soft demapper, the proposed algorithm has the same complexity order while providing superior performance. The simplicity of the proposed algorithm relies on the rectangular shape of the underlying QAM (i.e., the independence between In-phase and quadrature components) as well as the inherited symmetry of the binary reflected Gray labelling. The proposed algorithm subsumes the Max-log MAP as a special case.

For clarity, in the present disclosure Log MAP denotes the optimal soft demodulator which evaluates the exact LLR (log of sum of exponentials). Max-log MAP and Max-log provide an alternative method to the Log MAP, where instead of evaluating the prohibitively complex exact LLR, the dominant term in the numerator as well as the denominator are only computed. Brute-force Max-log MAP is the Max-log MAP where the closest constellation point the first complementary points are located through an exhaustive search involving all the constellation points. This is contrary to the proposed approach which is intended to limit the number of candidate points at each step, hence reducing the complexity.

FIG. 1 compares the Shannon 2-D unconstrained capacity to regular rectangular shaped QAM constellations and Gaussian-shaped QAM constellations. As can be seen, using Gaussian-shaped QAM constellations can result in a higher capacity.

A near log MAP soft demapper for non-uniform Gray labelled QAM constellations with logarithmic complexity is proposed.

Embodiments are compatible with uniform and non-uniform spaced constellations. PAM may be used for rectangular QAM, although embodiments are not limited as such.

According to an embodiment, rectangular QAM (i.e., independent In-phase/Quadrature components), hence PAM constellations need only to be considered. Although a Gaussian fitted non-uniform PAM constellation will be considered as a specific example, it is to be understood that the present disclosure is in no way limited to the Gaussian fitted non-uniform PAM.

Figure 2:
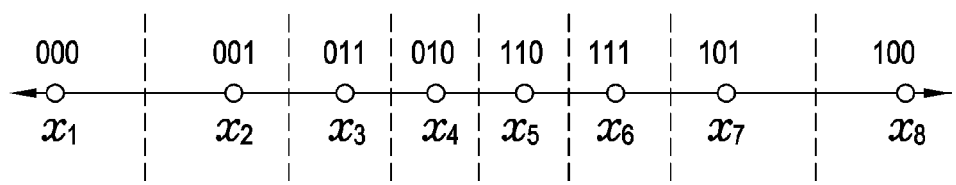
FIG. 2 schematically illustrates a 1D consideration of Gray-labelled constellation points with Gaussian spacing.

The Gaussian fitting approach of the distances profile for PAM constellations is outlined below. Assuming that the codewords with 2m bits are uniformly distributed, the Gaussian-shaped In-phase points $x_k$ (resp. Quadrature) are obtained as $$\frac{1}{\sqrt{2\pi}} \int_{-\infty}^{x_k} e^{-\frac{t^2}{2}} dt = \frac{2k-1}{2\sqrt{M}}, \quad k = 1, \ldots, M, \quad (1)$$

Where $M=2^m$ denotes the size of the PAM constellation. An example for m=3 is depicted in FIG. 2. In a typical scenario, these non-uniform constellations are used in conjunction with an error correcting code (e.g., LDPC or Turbo code). From a practical point of view, it is crucial to study reduced complexity soft demappers for non-uniform constellations. Towards this purpose, assume without loss of generality an AWGN channel the system model is then given by $$y = x_b + n, \quad (2)$$

where y denotes the noise contaminated signal, $x_b$ denotes the transmitted symbol corresponding to a codeword $6=(b_1, b_2, \ldots, b_m)$, and n notes the AWGN sample. Note, that here it is assumes that the received signal has undergone the equalization step (e.g., linear equalizers such as ZF or MMSE), and hence the different streams may be treated independently. Moreover, assuming perfect CSI at the receiver side, the fading coefficients only scales the underlying constellation and hence are ignored in the sequel.

The original log likelihood ratio (LLR) of the i-th bit is given by $$LLR(b_i) = \ln \frac{\mathbb{P}(b_i = 1 \mid y)}{\mathbb{P}(b_i = 0 \mid y)} = \ln \frac{\sum_{b:b_i=1}^{\square} e^{-\frac{|y-x_b|^2}{2N_o}}}{\sum_{b:b_i=0}^{\square} e^{-\frac{|y-x_b|^2}{2N_o}}} \quad (3)$$

where $N_o$ denotes the noise variance.

The above may be simplified thanks to well-known Max-log approximation as follows $$LLR(b_i) \approx \frac{\min_{b:b_i=0} |y - x_b|^2 - \min_{b:b_i=1} |y - x_b|^2}{2N_o}. \quad (4)$$

The brute force Max-log MAP demapper consists of exhaustively minimizing the Euclidean distance over both constellations (i.e., the constellations corresponding to b:$b_i$=1 denoted by $\chi_i^1$, and b:$b_i$=0 denoted by $\chi_i^0$). Hence, the LLR evaluation involves M times the evaluation of the Euclidean metric per dimension, and M−2 comparisons per bit per dimension, giving rise to an overall computational complexity of the order of 2M Euclidean distance calculations in addition to 2(M−2) $\log_2 M$ Euclidean distance comparisons.

In an embodiment, the max-log MAP performance has been increased by considering the first n (with n>1) terms (assuming descending order—i.e. going from the minimum distance to the maximum distance) in the numerator as well as the denominator. Embodiments described herein are for n=1 and n=2. Algorithms with n>2 will required further steps not described herein.

In an embodiment, the special case of n=2 has been considered, (n=1, and M/2 being the Max-log and log MAP, respectively).

Figure 3:
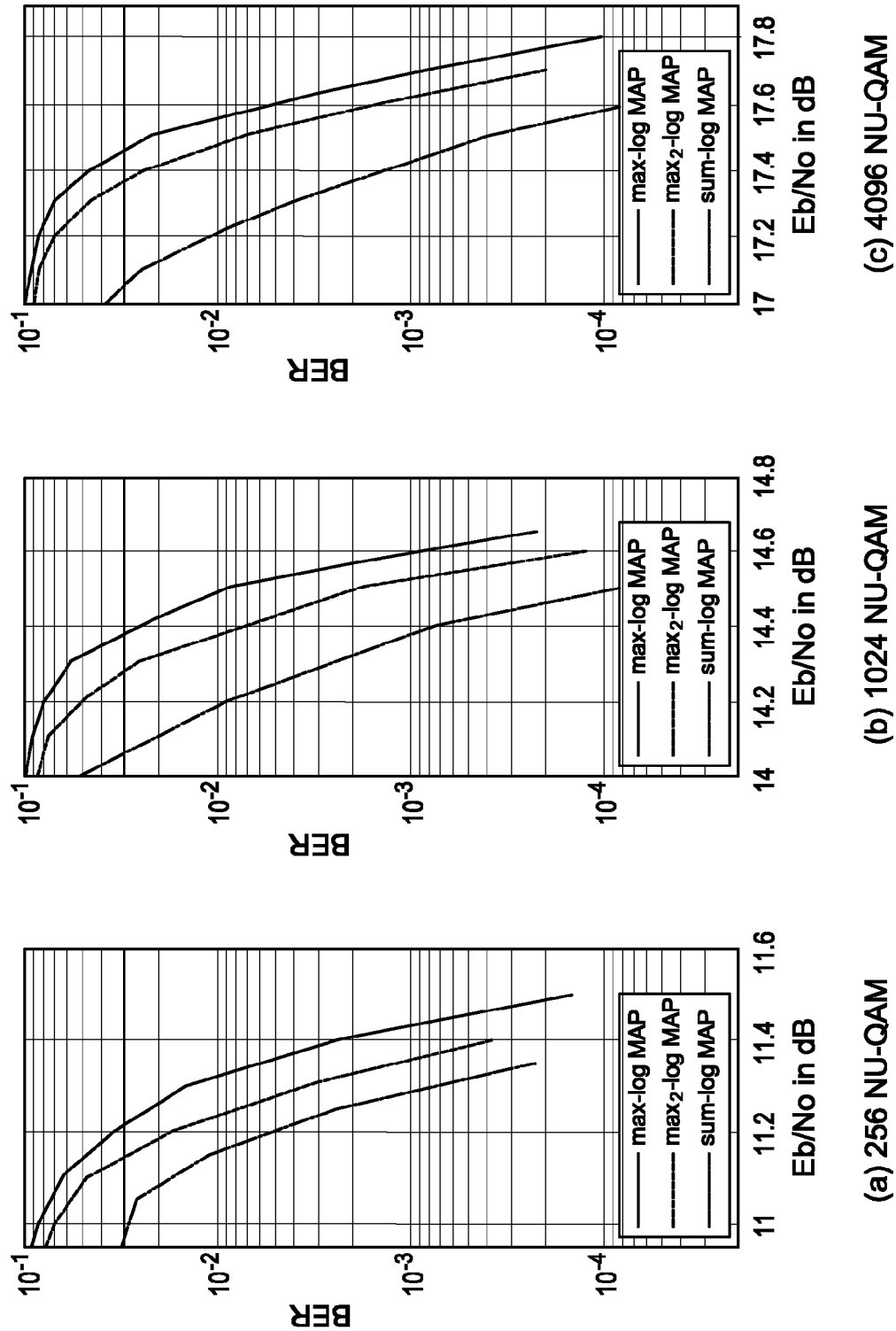
FIG. 3 illustrates the bit error rate of different maximum a posteriori probability (MAP) estimates, including a $Max_2$-log MAP according to an embodiment.

The performance gain with respect to the Max-log MAP via numerical simulations for various modulation orders and rate-1/2 LDPC with block size 64800 is illustrated in FIG. 3 in which Eb/No in dB (denoting the signal-to-noise ratio expressed as the energy per bit over the complex noise variance) is plotted along the x axis, the bit error rate is plotted on the Y axis and in each graph the case of n=2 (henceforth referred to as $Max_2$-log MAP) is shown to have a lower bit error rate than the Max-log MAP. The lowest plot in the graphs of FIG. 3 is the log MAP.

According to an embodiment is a reduced complexity algorithm that enables to implement the $Max_2$-log MAP for non-equally spaced QAM constellations (assuming binary reflected Gray labelling) with logarithmic complexity rather than the linear complexity of its brute force counterpart. Note however, that embodiments are equally as applicable to equally spaced QAM constellations.

An embodiment may subsume the Max-log MAP demapper upon limiting n to one.

In what follows, the $Max_2$-log MAP algorithm is outlined. As a matter of fact, the proposed algorithm subsumes the Max-log MAP, hence a first embodiment presenting the Max-log MAP for non-equally spaced PAMs is illustrated first. A second embodiment then extends the approach towards the $Max_2$-log MAP.

With regard to the reduced-complexity Max-log MAP demapper, using an iterative search to locate the hard decision point, defined as the constellation point closest to the received signal point can lead to evaluating the Max-log MAP at a slightly additional computational cost compared to traditional embodiments. Assuming a non-uniform PAM with M points, let $\{x_k: k=1, \ldots, M\}$ denote the In-phase constellation points in ascending order. The k-th limiting boundary, referred to herein as the key boundary, may be the arithmetic mean of $x_k$ and $x_{k+1}$, where k=1, ..., M−1, see the vertical dashed lines in FIG. 2.

Recall that the objective herein is to locate the closest points to the received signal from the set of constellations $\chi_i^1, \chi_i^0$, i=1, ..., m. For each i, one of the required points is the hard decision point (denoted herein by $x^{ML}$). Assume without loss of generality that the hard decision point corresponds to the set $X \triangleq \{\chi_i^{b_i}: i=1, \ldots, m\}$. Hence, at each step one needs only to locate the closest point from the complementary constellation $\chi^c \triangleq \{\chi_i^{b_i^c}: i=1, \ldots, m\}$ (the superscript c stands for the Boolean complement) which will be denoted henceforth by The progress of the series of comparisons of the iterative search may be tracked through a signature vector σ, wherein $\sigma_i$ is set to one if the received signal is greater than the current key boundary, otherwise $\sigma_i$ is set to zero.

An embodiment may start by comparing the received signal to the $k_1$-th limiting key boundary. To start with, $$k_1 = \frac{M}{2}.$$

Figure 4A:
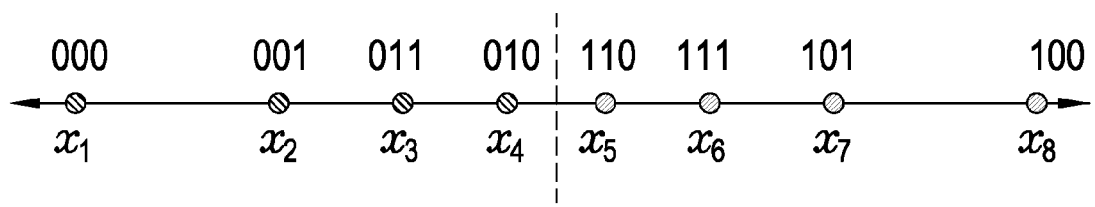
FIGS. 4a to 4c illustrate possible boundaries between Gray-labelled constellation points.

Thanks to Gray labelling, this median boundary separates the constellations $\chi_1^1$ and $\chi_1^0$—see FIG. 4a.

Hence based on the result of this comparison one can determine $\bar{x}_1$. That is $\bar{x}_1 = x_{k_1 + \sigma_1^c}$.

Next, the received signal is compared to the $k_2$-th key boundary with $$k_2 = \frac{M}{2} + (-1)^{\sigma_1^c} \frac{M}{4}.$$

Figure 4B:
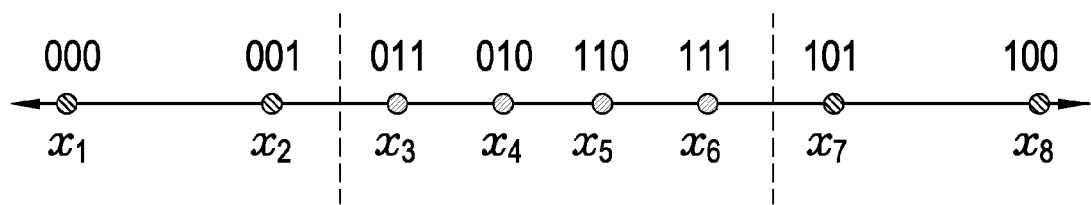
Figure 4C:
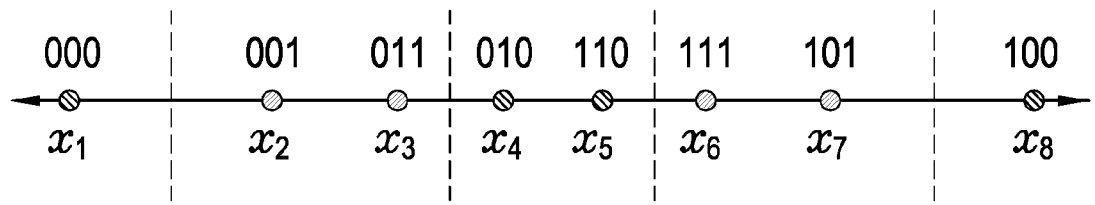

Similarly, it can be easily verified that the $k_2$-th key boundary separates $\chi_2^1$ and $\chi_2^0$ (see FIG. 4b). Next, one has that $\bar{x}_2 = x_{k_2+o_2^c}$. The process continues until the hard decision point is located. The last step consists of tracing back the position of the hard decision point (i.e., determining the set $\chi$). In fact, the position of the hard decision point is directly given by the individual bits of the Gray-encoded signature vector. For instance, if M=16, and $\sigma=[1\ 1]$, the Gray encoded signature vector is given by $[1\ 0]$, that is $x^{ML} \in \chi_1^1, \chi_2^0$, which implies that $\bar{x}_1 \in \chi_1^0$ and $\bar{x}_2 \in \chi_2^1$.

It is worth noting that due to the non-equal spacing between consecutive constellation points, an additional test (using an image boundary) may be required when evaluating $\bar{x}_i$, as illustrated below. This test would not be required for equal spacing.

Figure 5:
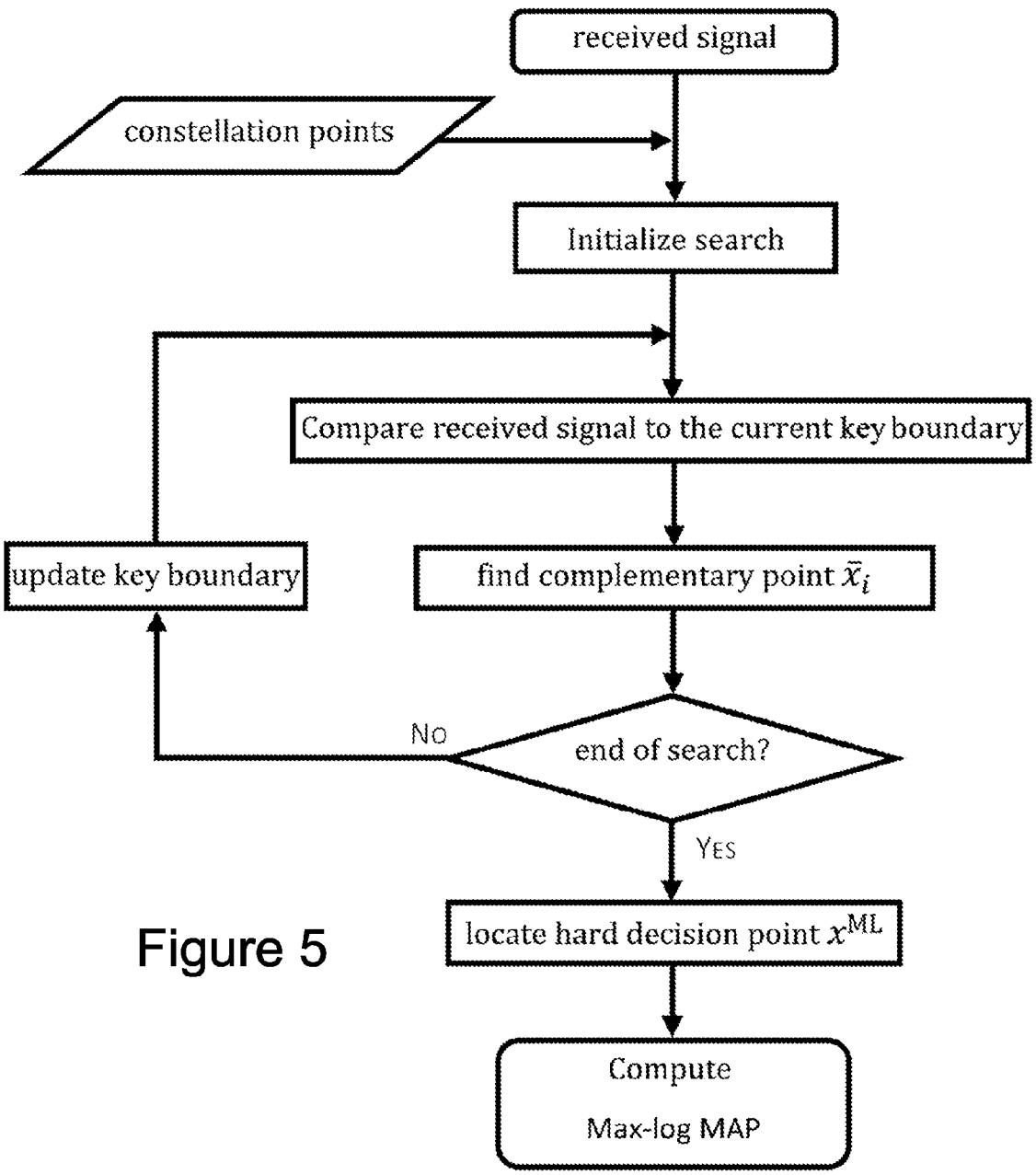
FIG. 5 is a flow chart which schematically illustrates an embodiment.
Figure 6:
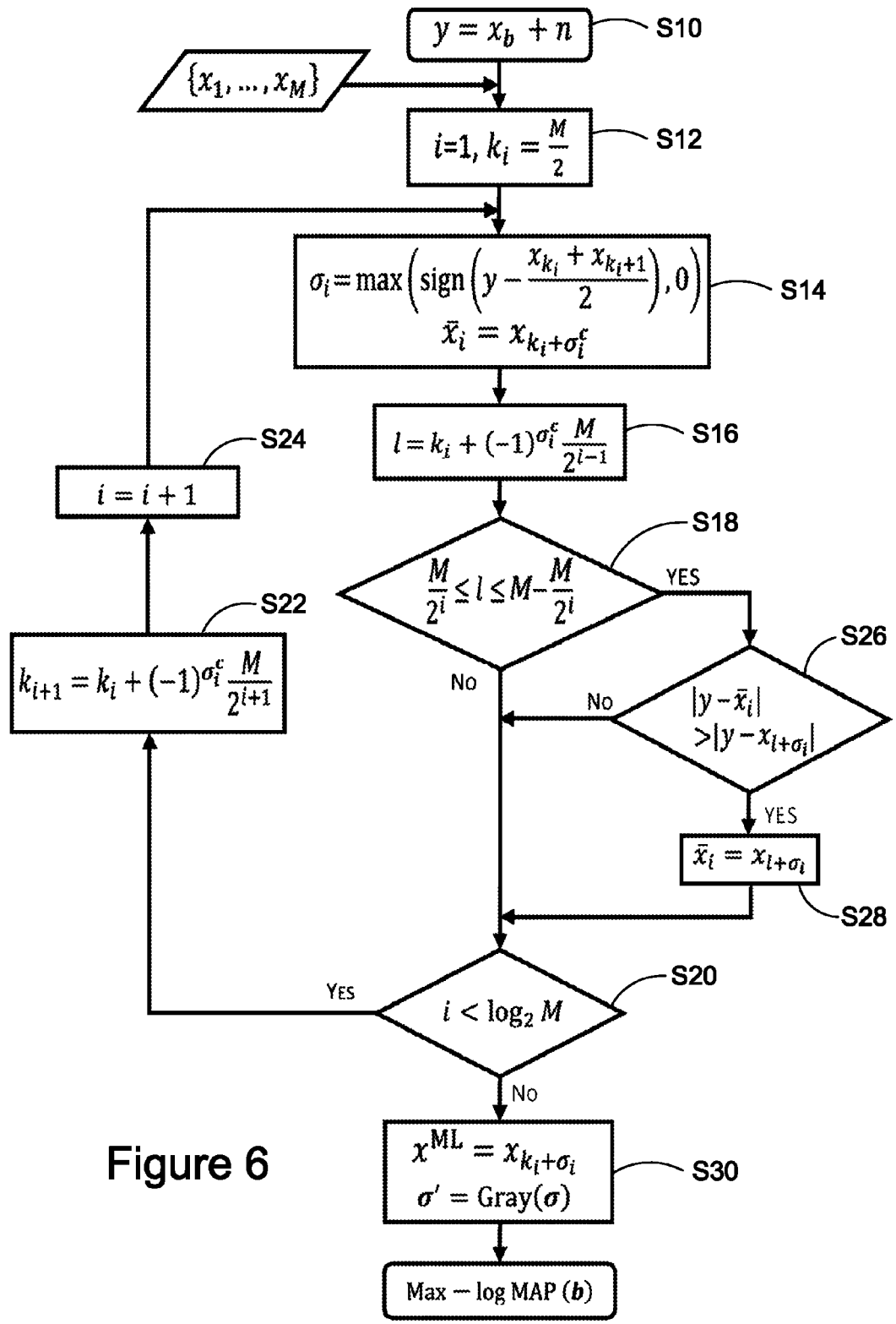
FIG. 6 is a flow chart which schematically illustrates a first embodiment of a Max-log MAP demapper according to FIG. 5.

An exemplar schematic diagram of a method according to an embodiment is provided in FIG. 5 while an exemplar detailed flowchart is depicted in FIG. 6.

With regard to the reduced-complexity Max$_2$-log MAP demapper, the aim is to improve the original Max-log demapper by using the largest two terms to better approximate the exact LLR. The closest point after $\bar{x}_i$ (denoted by $\bar{\bar{x}}_i$ and referred to as the second closest complementary constellation point) is determined is a similar fashion. Note, however, that as a result of unequal spacing between the constellation points, an additional check may be carried out. This additional check is done by defining an image boundary and an associated image point.

Figure 8:
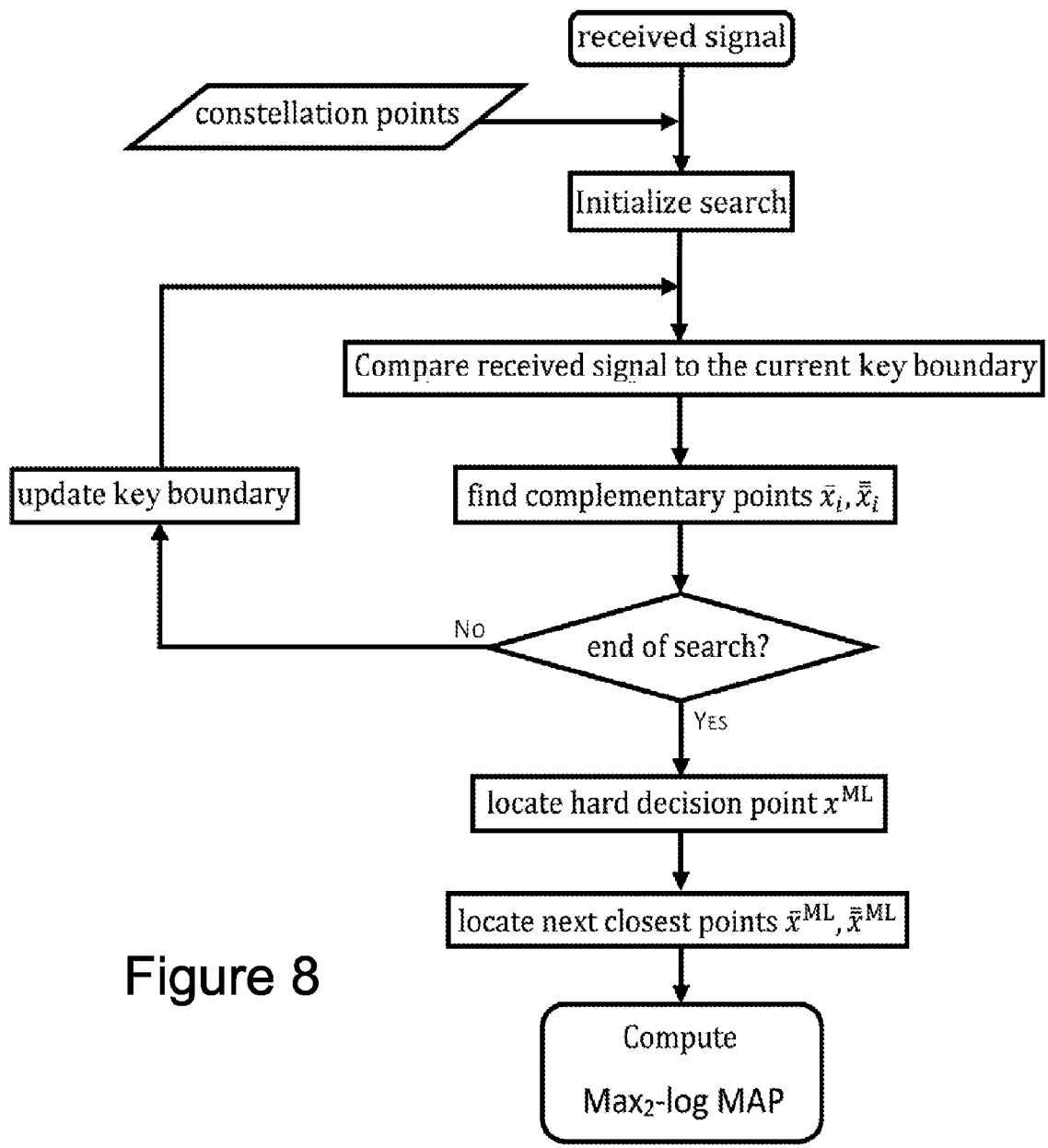
FIG. 8 is a flow chart which schematically illustrates a further embodiment.

An exemplar schematic diagram of the Max$_2$-log MAP demapper according to an embodiment is summarized in FIG. 8. An exemplar detailed flow chart is provided in FIG. 9a. FIGS. 9b and 9c comprise a more detailed exemplar algorithm for specific steps in that of FIG. 9a.

Embodiments according to the embodiment depicted in FIG. 6 may have differences in terms of complexity compared to existing methods. On the one hand, according to the flow chart of FIG. 6, the received signal needs to be compared with the current boundary $\log_2 M$ times. If image points exist (see below for more information on image points), a maximum additional $\log_2 M$ Euclidean distance comparisons are needed. At the end of the algorithm, the Euclidean distance needs to be evaluated $\log_2 M+1$ times. If image points exist, a maximum of an additional 2 $\log_2 M$ Euclidean distances evaluations are needed. Therefore, the computational complexity of the Max-log MAP algorithm according to the algorithm of FIG. 6 is lower bounded by $\log_2 M+1$ Euclidean distances evaluation, $\log_2 M$ boundary comparisons, and is upper bounded by 3 $\log_2 M+1$ Euclidean distances evaluation, 2 $\log_2 M$ comparisons.

As such, the Max-log MAP demapper of FIG. 6's complexity grows logarithmically with the size of the constellation M.

Figure 13:
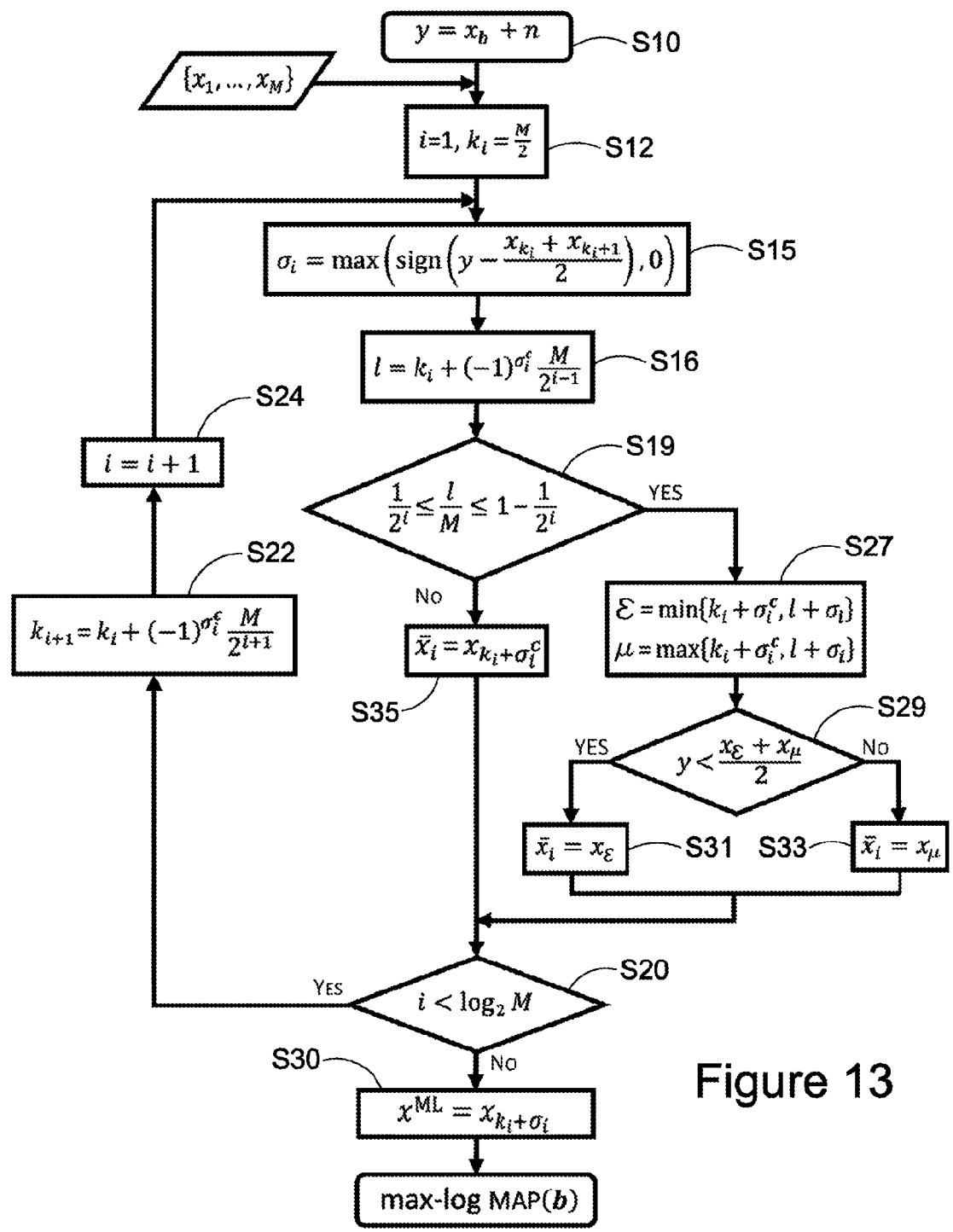
FIG. 13 is an alternative embodiment of a Max-log MAP demapper to FIG. 6, which illustrates the embodiment of FIG. 5.

With regard to the embodiment according to FIG. 13, the received signal is compared with the a boundary $\log_2 M$ times. The existence check of the image point involves $\log_2 M$ comparisons and if the image point exists, an additional $\log_2 M$ comparisons are needed. The Euclidean distance needs to be evaluated $\log_2 M+1$ times at the end of the algorithm. As such, the worst-case computational complexity of the max-log MAP algorithm according to an embodiment of FIG. 13 is given by $\log_2 M+1$ Euclidean distances evaluation, 3 $\log_2 M$ boundary comparisons. The max-log MAP demapper's complexity therefore grows logarithmically with the size of the constellation M.

It is worth noting that the computational cost of the brute force Max-log MAP adds up to M Euclidean distances evaluations and (M−2) $\log_2 M$ comparisons.

For uniform QAM constellations, the image point check may be omitted, in this case the computational complexity of the proposed algorithm is identical to an existing pragmatic algorithm.

Figure 9A:
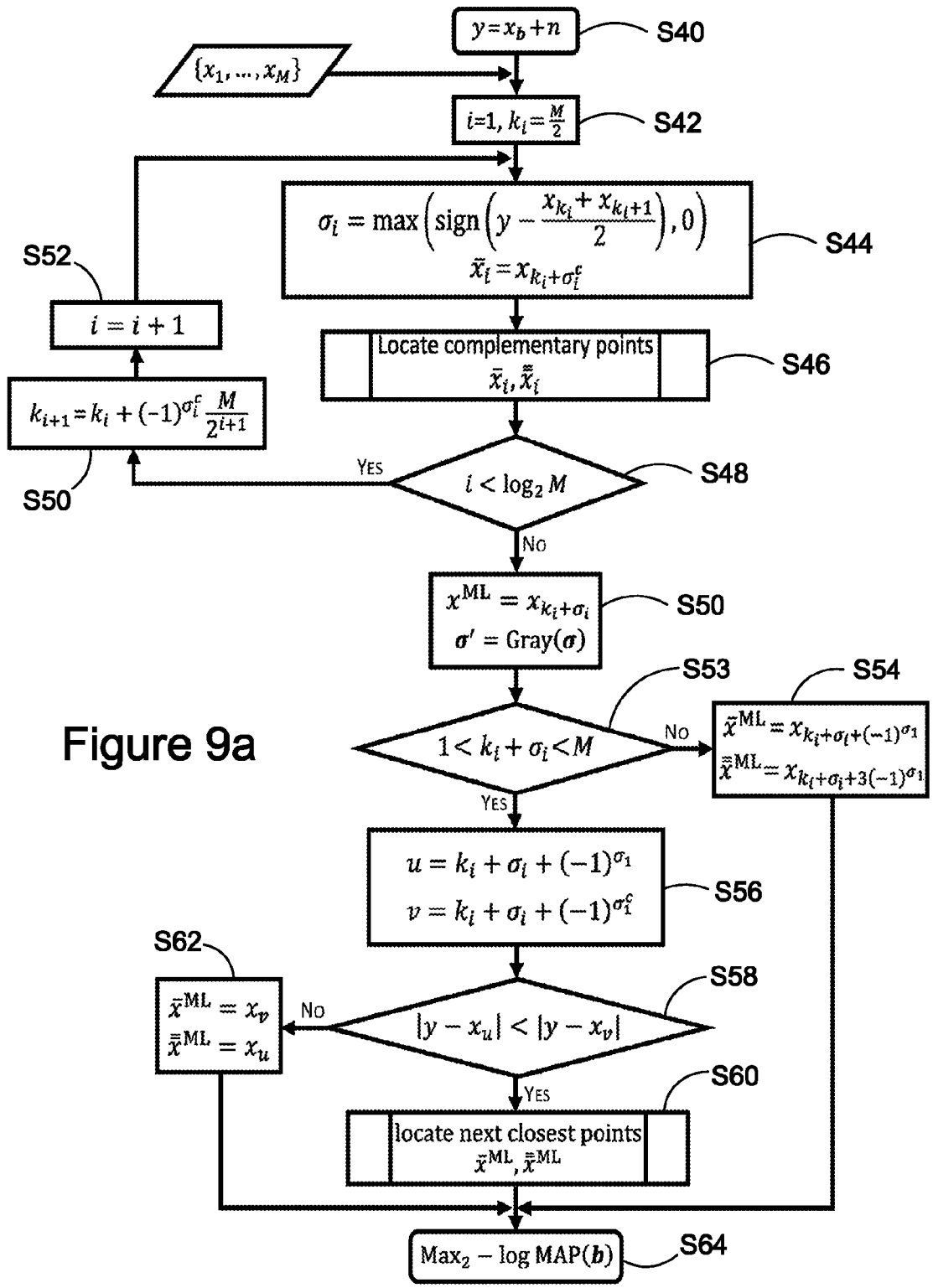
FIGS. 9a to 9c are flow charts which schematically illustrate a first embodiment of a $Max_2$-log MAP demapper according to the embodiment of FIG. 8.
Figure 9B:
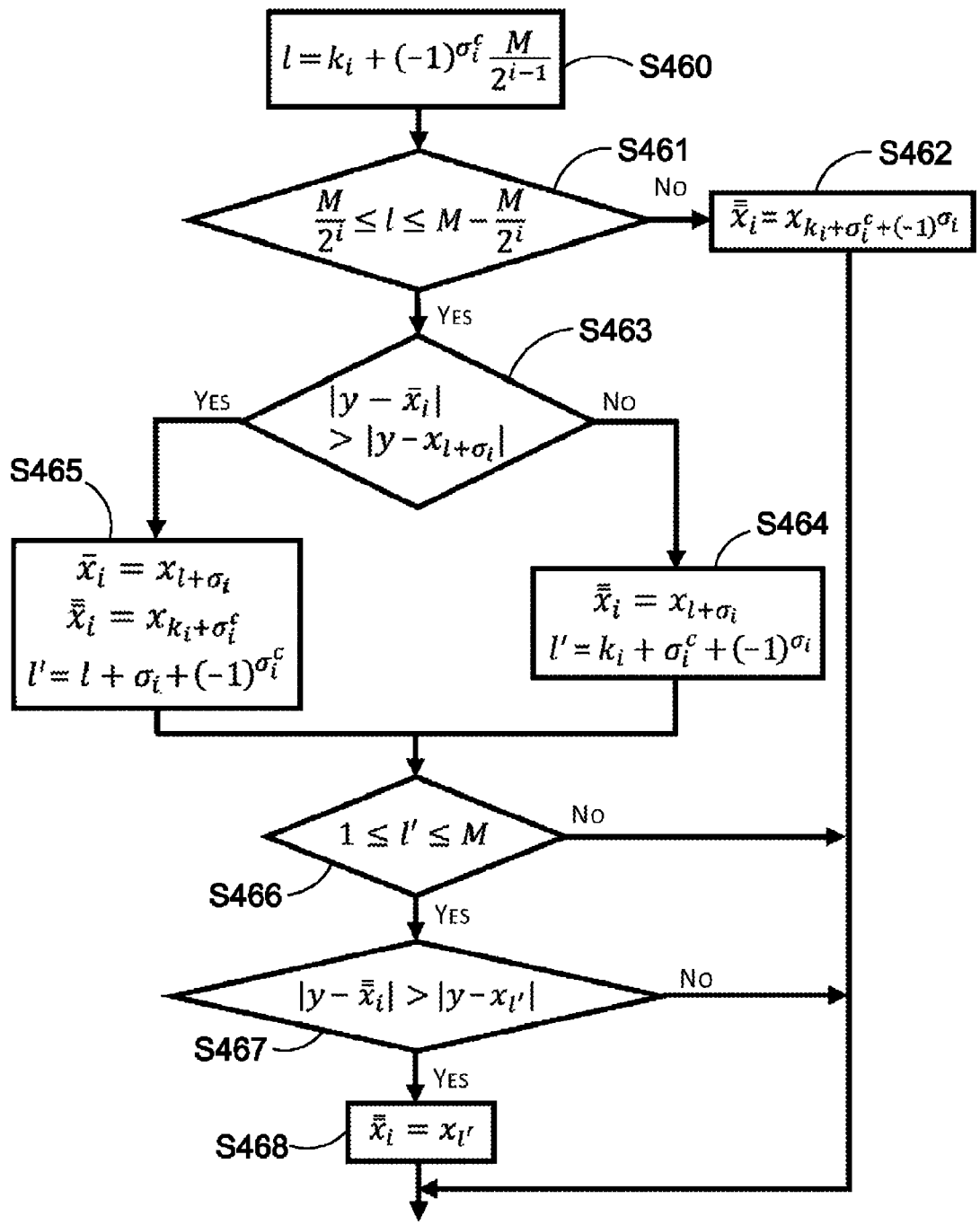
Figure 9C:
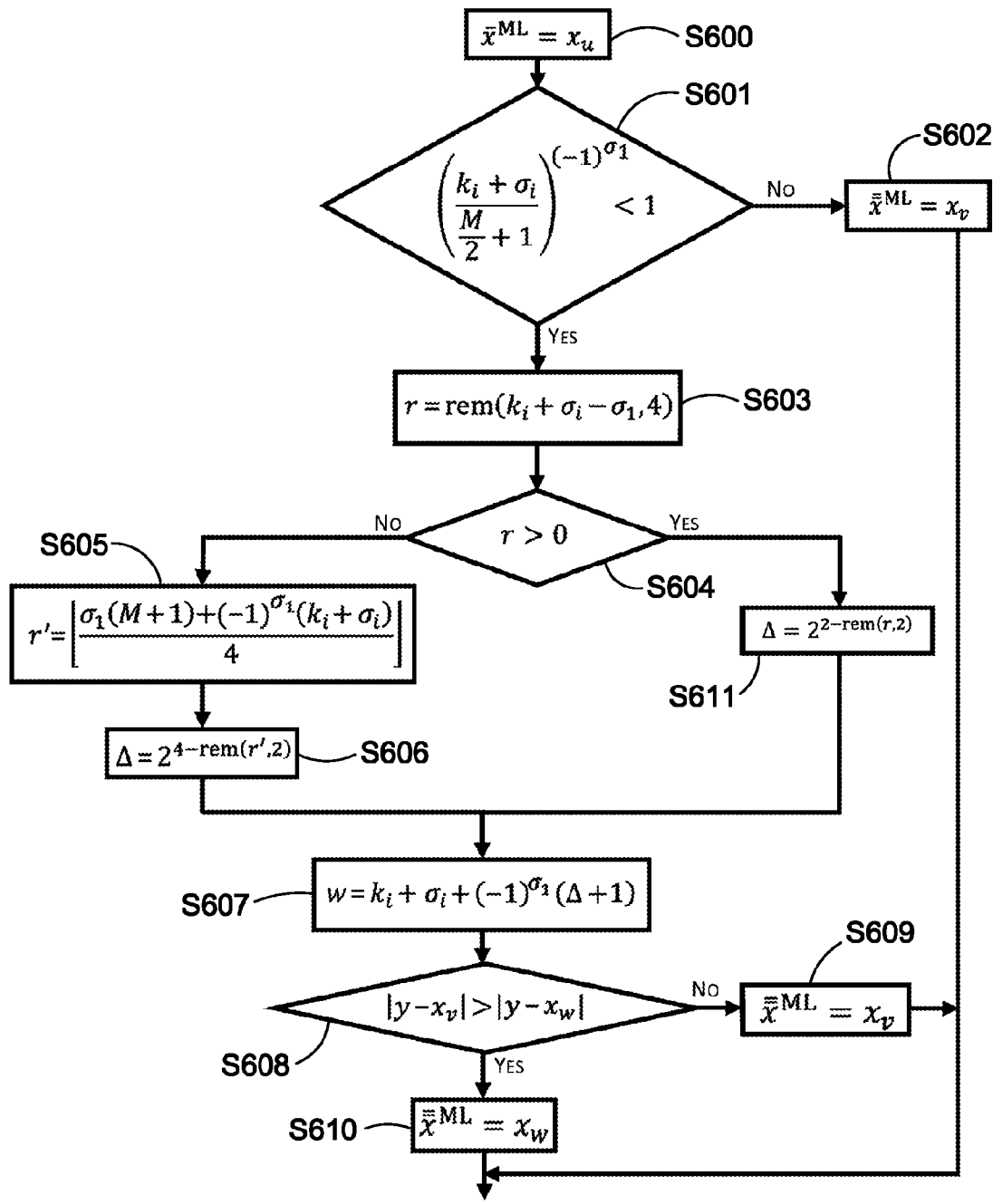

On the other hand, complexity analysis for the Max$_2$-log MAP of the embodiment of FIGS. 9a to 9c is as follows. The received signal needs to be compared with the current boundary $\log_2 M$ times. If image points exist, a maximum of an additional 2 $\log_2 M+2$ Euclidean distance comparisons are needed (see FIG. 9b). At the end of the algorithm, the Euclidean distance needs to be evaluated 2 $\log_2 M+3$ times, although if image points exist and need to be analysed, a maximum of an additional 4 $\log_2 M+4$ (see FIG. 9c) Euclidean distance evaluations are needed. Hence, the algorithm computational complexity is lower bounded by $\log_2 M$ boundary comparisons, 2 $\log_2 M+3$ Euclidean distances evaluation, and is upper bounded by 3 $\log_2 M+2$ comparisons, and 6 $\log_2 M+7$ Euclidean distances evaluations.

The equivalent brute force soft demapper would require M Euclidean distances evaluations and between (M−2) $\log_2 M$ and 2(M−2) $\log_2 M$ comparisons.

The complexity analysis for the Max$_2$-log MAP of the embodiment of FIGS. 14 to 16 (see below) is as follows. The received signal needs to be compared with the current boundary $\log_2 M$ times, the existence check of the image point involves $\log_2 M$ comparisons and in case the image points exists, additional 3 $\log_2 M$ Euclidean distance comparisons are needed. Four more comparisons are needed to determine $\bar{x}^{ML}$ and $\bar{\bar{x}}^{ML}$.

At the end of the algorithm, the Euclidean distance needs to be evaluated 3 $\log_2 M+3$ times. Hence, the algorithm worst-case computational complexity is given by 2 $\log_2 M+3$ Euclidean distances evaluation, 5 $\log_2 M+4$ boundary comparisons, and $\log_2 M+2$ Jacobian logarithms. The equivalent brute force soft demapper's worst-case complexity involves M Euclidean distances evaluations, 2(M−2) $\log_2$ M comparisons and $\log_2$ M+2 Jacobian logarithms.

The proposed algorithm provides a significant saving in computational cost compared to the brute force soft demapper, hence favoured in practical scenarios especially for high order modulations while providing near log MAP performance.

A numerical example using the Max-log MAP algorithm of FIG. 6 follows.

This embodiment is provided with reference to FIGS. 7a to 7d and the flow charts of FIGS. 5 and 6. Note, FIGS. 7a to 7d are not exactly to scale, but are accurate enough to provide an indication of the embodiment.

Let the number of bits, m=6. Note that when rectangular QAM with independent Gray labelling for in-phase and quadrature components is considered, as in the present embodiment; due to the independent nature of the real and imaginary components, the first three values of the constellation points are independent of the location on the real axis and so do not need to be calculated for the below example. In practice, the values for the real and imaginary axes can be calculated independently using the same method. As such, m can be considered to be 3, and the size of the constellation for the below example, therefore, M=8. The real Gaussian-shaped PAM constellation points are given by {±0.1573; ±0.4888; ±0.8871; ±1.5341}. These are labelled, $x_1$-$x_8$ in FIGS. 7a to 7d. Constellation points $x_1$ to $x_8$ are Gray encoded 000, 001, 011, 010, 110, 111, 101, 100 respectively, see FIG. 7a.

Assume the noise-contaminated received signal point y is equal to 0.7724, marked on FIGS. 7a to 7d with a black dot.

An embodiment may initially set i to 1 and the key boundary, therefore, $$k_1 = \frac{M}{2} = 4, S12.$$

As a key boundary $k_i$ is always located halfway between the constellation points $x_i$ and $x_{i+1}$, $k_1$ is located at 0 on the real axis.

The received signal is compared to the $k_1$-th key boundary. As the signal is greater than the key boundary, $\sigma_1=1$ and the key point, which is the closest complementary constellation point is given by $\bar{x}_1=x_{k_1+\sigma_1^c}=x_{4+0}=x_4=-0.1573$, S14. This point is shown in a dashed box in FIG. 7b.

A check is now undertaken to make sure that $x_4$ is the actual closest complementary constellation point, as this may not always be the case due to the non-equal spacing between consecutive constellation points. This is done by considering a first image boundary, l, which may also separate complementary constellation points from the received signal. An image boundary can therefore be used for a similar purpose as a key boundary, and separates points that have different values for the respective bit. An image point may be located next to the image boundary. The image boundary, l, is calculated as $$l = k_i + (-1)^{\sigma_i^c} \frac{M}{2^{i-1}}, S16.$$

In this case, $l_1=12$ and as such, there can be no image point because the image boundary is beyond the outer reaches of the constellation points, which only go up to 8. This can be checked, using the following inequality:

$$\frac{M}{2^i} \le l \le M - \frac{M}{2^i}, S18.$$

It should be noted that for the first step, i.e. after the first key boundary has been defined, the check for whether an image point exists can be omitted in some embodiments, since it can be demonstrated that for the first step $$l = \frac{M}{2} \pm M,$$

which will always yield a point outside the specified range.

As no image point exists for this iteration, a decision is made as to whether $i<\log_2 M$, S20. If this is not the case, all the required number of comparisons to a boundary have been made. Here, however, $i<\log_2 M$ and so a further iteration is done.

The $k_2$-th key boundary is now set using $$k_{i+1} = k_i + (-1)^{\sigma_i^c} \frac{M}{2^{i+1}}, S22.$$

Here, the $k_2=6$, which is given by 0.6880.

Then, i is set to i+1, S24.

Figure 7A:
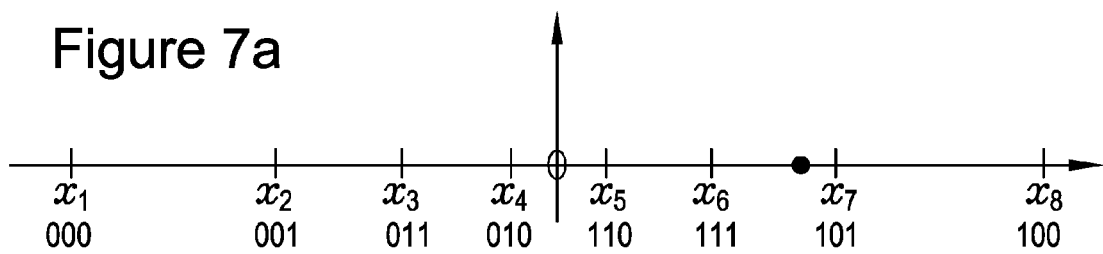
FIGS. 7a to 7d schematically illustrate a method according to the embodiment of FIG. 5.
Figure 7B:
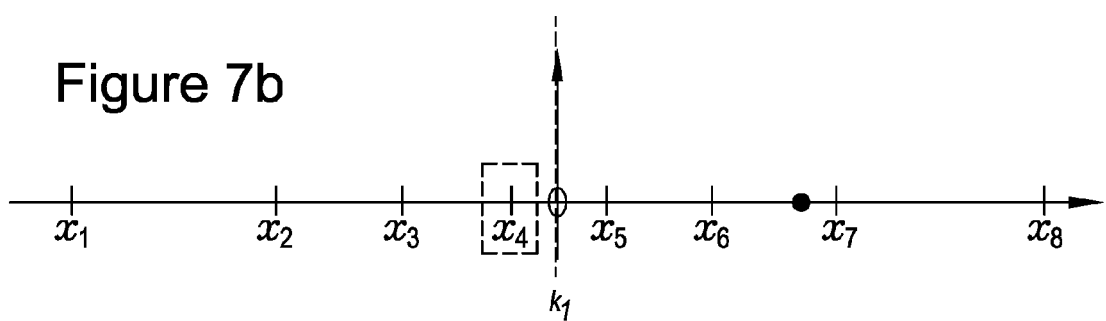
Figure 7C:
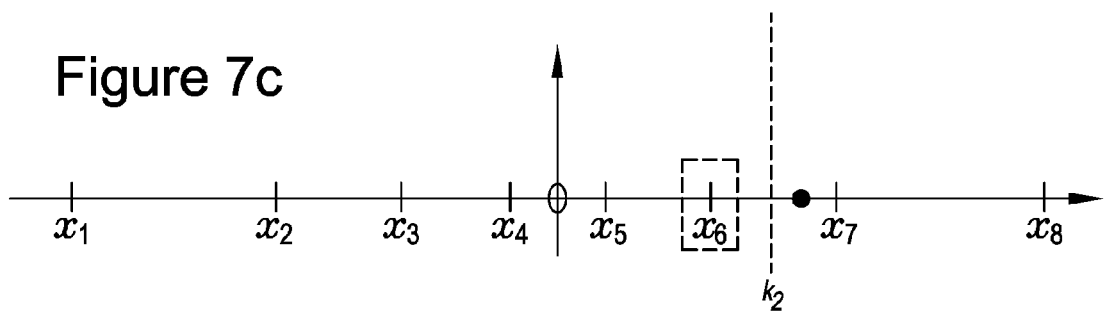

Next the received signal is compared to the $k_2$-th key boundary, S14, as above. As the signal is still greater than the key boundary, $\sigma_2=1$ and $\bar{x}_2=x_{k_2+\sigma_2^c}=x_6=0.4888$, S14. This is illustrated in FIG. 7c.

Steps S16 and S18 are again conducted to confirm that the above-identified complementary constellation point is the actual closest complementary constellation point. First, an image boundary, $l_2$, is calculated as 10. As before, an image point does not exist because $l_2$ does not meet the requirements of S18. The above-identified complementary constellation point is therefore the actual closest complementary constellation point.

As i=2 and $\log_2 8 = 3$, the answer to decision S20 is again yes and so the $k_3$-th key boundary is set, S22. $k_3=7$, which is given by 1.2106. S24 sets i=3. The received signal is compared to the $k_3$-th key boundary. Now, the signal is less than the key boundary value and so one obtains $\sigma_3=0$ and $\bar{x}_3=x_{k_3+\sigma_3^c}=x_8=1.5341$, S14.

In this case, when checking for an image point, $l_3=5$, S16. This satisfies the inequality of S18 and so an image point exists. It must therefore be explicitly checked as to whether the distance between the received point and the complementary constellation point $x_8$ is greater than the distance between the received point and the image point on the other side of the image boundary, $l_3$. This is done in S26 by checking whether $|y-\bar{x}_i|>|y-x_{l+\sigma_i}|$. If the answer to S26 is no, then the key point, which was previously identified as the closest complementary constellation point (i.e. that currently set as $\bar{x}_3$) is the actual closest complementary constellation point. If the answer to S20 is yes, then the actual closest complementary constellation point is in fact the image point, $x_{l+\sigma_i}$ and so the image point is set as the closest complementary constellation point, $\bar{x}_i = x_{l+\sigma_i}$, S28.

Figure 7D:
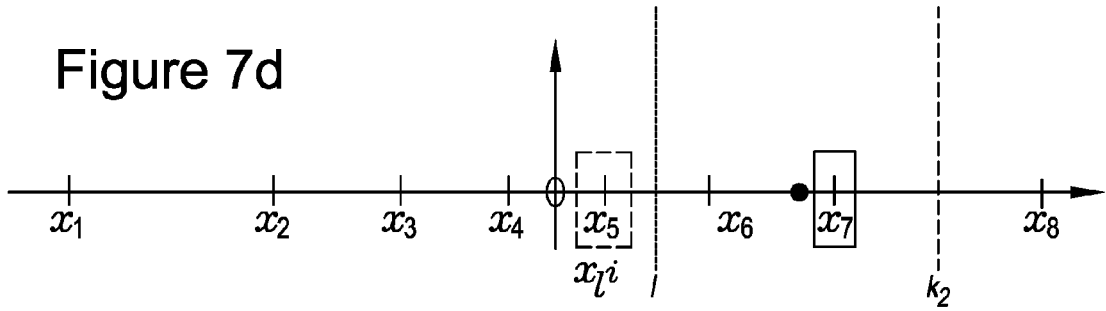

In the present example, the image point $x_{l+\sigma_3}=x_5$ is nearer to the received signal than the initial estimate $\bar{x}_3$. Therefore, $\hat{x}_3$ is updated to $x_5$, S28. This is illustrated in FIG. 7d.

The hard-decision point is now determined as $x^{ML}=x_{k_3+\sigma_3}=x_7=0.8871$, S30. This point is in the thin solid rectangle in FIG. 7d.

The signature vector $\sigma=[1\ 1\ 0]$. Gray encoding this signature vector gives $[1\ 0\ 1]$, which in turn indicates that $x^{ML} \in \{\chi_1^1, \chi_2^0, \chi_3^1\}$ (i.e. the hard-decision point has a 1 as its first bit, a 0 as its second bit and a 1 as its third bit)—note, however, that the first three bits are ignored in the gray coded constellation points due to the independent of the real and imaginary axes (see above). The Gray encoded signature vector also tells us that $\bar{x}_1 \in \chi_1^0$, $\bar{x}_2 \in \chi_2^1$ and $\bar{x}_3 \in \chi_3^0$ The closest points from $\chi^1$ and $\chi^0$ (i.e. the closest points to the signal point on each side of each key boundary $k_1$ to $k_3$, specifically $\bar{x}_1, \bar{x}_2, \bar{x}_3$ and $x^{ML}$) have now been identified. As such, the Euclidean distance between the received signal y and $x^{ML}=x_7$; $\bar{x}_1=x_4$; $\bar{x}_2=x_6$; and $\bar{x}_3=x_5$ is calculated, allowing the approximation for the LLR from equation (4) to be determined as below.

$$LLR(b_i) \approx \frac{\min_{b:b_i=0} |y-x_b|^2 - \min_{b:b_i=1} |y-x_b|^2}{2N_0}$$

-continued $$LLR(b_1) \approx \frac{|y-\bar{x}_1|^2 - |y-x^{ML}|^2}{2N_0} =$$

$$\frac{|y-x_4|^2 - |y-x_7|^2}{2N_0} = \frac{0.8512}{2N_0}$$

$$LLR(b_2) \approx \frac{|y-x^{ML}|^2 - |y-\bar{x}^2|^2}{2N_0} = \frac{|y-x_7|^2 - |y-x_6|^2}{2N_0} = \frac{-0.0673}{2N_0}$$

$$LLR(b_3) \approx \frac{|y-\bar{x}_3|^2 - |y-x^{ML}|^2}{2N_0} = \frac{|y-x_5|^2 - |y-x_7|^2}{2N_0} = \frac{0.3652}{2N_0}$$

With regard to FIG. 13, an alternative embodiment of the Max-log MAP demapper is depicted. This embodiment is a variant to that depicted in FIG. 6. The figure corresponds to the algorithm of FIG. 5. In general, the algorithm is the same as that described with reference to FIG. 6. Like references refer to like operations. As such, only the differences will be described here.

Instead of initially setting the closest complementary constellation point as part of S14, the algorithm updates the signature vector in S15, but does not set any point as the closest complementary constellation point at this time.

A slightly reformulated check is used to check whether an image point $$S19 - \frac{1}{2^i} \le \frac{l}{M} \le 1 - \frac{1}{2^i}.$$

If S19 is not true, the complementary constellation point ($\bar{x}_i$) closest to and on the other side of the key boundary to the signal is set (S35) as the closest complementary constellation point using:

$$\bar{x}_i = x_{k_i + \sigma_i^c}$$

Where σ is a signature vector (see below), wherein $\sigma_i$ is the i-th entry in the vector; and the superscript c stands for the Boolean complement. The algorithm them proceeds in a similar fashion to that of FIG. 6.

If S19 is true, a first comparison point is set as $x_\varepsilon$ where $\varepsilon = \min(k_i + \sigma_i^c, l + \sigma_i)$ and a second comparison point is set as $x_\mu$, where $\mu = \max(k_i + \sigma_i^c, l + \sigma_i)$, S27.

It is then checked, in step S29, if the received signal is less than the arithmetic mean of the two comparison points. If the answer to that is yes, the first comparison point is set as the closest complementary constellation point, $\bar{x}_i = x_\varepsilon$, S31. If the answer to that is no, the second comparison point is set as the closest complementary constellation point, $\bar{x}_i = x_\mu$, S33.

The algorithm of FIG. 13 then proceeds in a similar manner to that of FIG. 6.

Using the second embodiment of the Max-log MAP algorithm (according to FIG. 13) yields the same numerical results as the first embodiment of the Max-log MAP demapper (i.e. that according to FIG. 6), albeit with steps in which the midpoint of the key point and the image point are calculated when determining $\bar{x}_3$. This will now briefly be explained.

Let the number of bits, m=6. Note that when rectangular QAM with independent Gray labelling for in-phase and quadrature components is considered, as in the present embodiment; due to the independent nature of the real and imaginary components, the first three values of the constellation points are independent of the location on the real axis and so do not need to be calculated for the below example. In practice, the values for the real and imaginary axes can be calculated independently using the same method. As such, m can be considered to be 3, and the size of the constellation for the below example, therefore, M=8. The real Gaussian-shaped PAM constellation points are given by {±0.1573; ±0.4888; ±0.8871; ±1.5341}. These are labelled, $x_1$-$x_8$ in FIGS. 7a to 7d. Constellation points $x_1$ to $x_8$ are Gray encoded 000, 001, 011, 010, 110, 111, 101, 100 respectively, see FIG. 7a.

Assume the noise-contaminated received signal point y is equal to 0.7724.

An embodiment may initially set i to 1 and the key boundary, therefore, $$k_1 = \frac{M}{2} = 4, S12.$$

As a key boundary $k_i$ is always located halfway between the constellation points $x_i$ and $x_{i+1}$, $k_1$ is located at 0 on the real axis.

The received signal is compared to the $k_1$-th key boundary. As the signal is greater than the key boundary, $\sigma_1 = 1$, S15.

$$l = k_i + (-1)^{\sigma_i^c} \frac{M}{2^{i-1}}, S16.$$

In this case, $l_1 = 12$ and as such, there can be no image point because the image boundary is beyond the outer reaches of the constellation points, which only go up to 8. This is checked by checking if $$\frac{1}{2^i} \le \frac{l}{M} \le 1 - \frac{1}{2^i}, S19.$$

This is not the case, so the key point, which is the closest complementary constellation point is given by $\bar{x}_1 = x_{k_1 + \sigma_1^c} = x_{4+0} = x_4 = -0.1573$, S35.

A check is now made as to whether i<$\log_2 M$, S20. If this is not the case, all the required number of comparisons to a boundary have been made. Here, however, i<$\log_2 M$ and so a further iteration is done.

The $k_2$-th key boundary is now set using $$k_{i+1} = k_1 + (-1)^{\sigma_i^c} \frac{M}{2^{i+1}}, S22.$$

Here, the $k_2 = 6$, which is given by 0.6880.

Then, i is set to i+1, S24.

Next the received signal is compared to the $k_2$-th key boundary. As the signal is still greater than the key boundary, $\sigma_2 = 1$ S15.

Steps S16 and S19 are again conducted to confirm that the above-identified complementary constellation point is the actual closest complementary constellation point. First, an image boundary, $l_2$, is calculated as 10. As before, an image point does not exist because $l_2$ does not meet the requirements of S19.

Next, $\bar{x}_2 = x_{k_2 + \sigma_2^c} = x_6 = 0.4888$, S35.

As i=2 and $\log_2 8 = 3$, the answer to decision S20 is again yes and so the $k_3$-th key boundary is set, S22. $k_3 = 7$, which is given by 1.2106. S24 sets i=3. The received signal is compared to the $k_3$-th key boundary. Now, the signal is less than the key boundary value and so one obtains $\sigma_3=0$ In this case, when checking for an image point, $l_3=5$, S16. This satisfies the inequality of S19 and so an image point exists.

It must therefore be explicitly checked as to whether the distance between the received point and the complementary constellation point $x_8$ is greater than the distance between the received point and the image point on the other side of the image boundary, $l_3$.

A first comparison point is set as $x_\varepsilon=x_5$ where $\varepsilon=\min (k_i+\sigma_i^c, l+\sigma_i)=5$ and a second comparison point is set as $x_\mu=x_8$ where $=\max (k_i+\sigma_i^c, l+\sigma_i)=8$, S27.

It is then checked, in step S29, if the received signal is less than the arithmetic mean of the two comparison points. The answer to that is yes and so the first comparison point is set as the closest complementary constellation point, $\bar{x}_i = x_\varepsilon$, S31.

The hard-decision point is now determined as $x^{ML} = x_{k_3+\sigma_3} = x_7 = 0.8871, 830$.

The signature vector $\sigma=[1\ 1\ 0]$. Gray encoding this signature vector gives $[1\ 0\ 1]$, which in turn indicates that $x^{ML} \in \{\chi_1^1, \chi_2^0, \chi_3^1\}$ (i.e. the hard-decision point has a 1 as its first bit, a 0 as its second bit and a 1 as its third bit)—note, however, that the first three bits are ignored in the gray coded constellation points due to the independent of the real and imaginary axes (see above). The Gray encoded signature vector also tells us that $\bar{x}_1 \in \chi_1^0$, $\bar{x}_2 \in \chi_2^1$ and $\bar{x}_3 \in \chi_3^0$.

The closest points from $\chi^1$ and $\chi^0$ (i.e. the closest points to the signal point on each side of each key boundary $k_1$ to $k_3$, specifically $\bar{x}_1$, $\bar{x}_2$, $\bar{x}_3$ and $x^{ML}$) have now been identified. As such, the Euclidean distance between the received signal y and $x^{ML}=x_7$; $\bar{x}_1=x_4$; $\bar{x}_2=x_6$; and $\bar{x}_3=x_5$ is calculated, allowing the approximation for the LLR from equation (4) to be determined as below.

$$LLR(b_i) \approx \frac{\min_{b:b_i=0} |y-x_b|^2 - \min_{b:b_i=1} |y-x_b|^2}{2N_0}$$

$$LLR(b_1) \approx \frac{|y-\bar{x}_1|^2 - |y-x^{ML}|^2}{2N_0} =$$

$$\frac{|y-x_4|^2 - |y-x_7|^2}{2N_0} = \frac{0.8512}{2N_0}$$

$$LLR(b_2) \approx \frac{|y-x^{ML}|^2 - |y-\bar{x}^2|^2}{2N_0} = \frac{|y-x_7|^2 - |y-x_6|^2}{2N_0} = \frac{-0.0673}{2N_0}$$

$$LLR(b_3) \approx \frac{|y-\bar{x}_3|^2 - |y-x^{ML}|^2}{2N_0} = \frac{|y-x_5|^2 - |y-x_7|^2}{2N_0} = \frac{0.3652}{2N_0}$$

An exemplar embodiment of the Max$_2$-log MAP algorithm of FIGS. 9*a*-*c* follows. A numerical example according to this embodiment is subsequently described.

The flow charts of FIGS. 9*a*, 9*b* and 9*c* illustrate a method in accordance with this embodiment.

The key boundary $k_1$ and signature vector entry $\sigma_1$ are calculated as described in the above embodiment of the Max-Log MAP, S42 and S44. An initial closest complementary constellation point, $\bar{x}_i$, is identified as the key point, S44.

The two closest complementary points, $\bar{x}_i$, $\bar{\bar{x}}_i$ for each bit are now identified. These two points are referred to herein as the closest complementary constellation point, and the second closest complementary constellation point, $\bar{\bar{x}}_i$. The process with regard to identifying the two closest complementary points, S46, will be now described in more detail with reference to FIG. 9*b*, which depicts the step of identifying the remaining complementary constellation points, S46.

First, it is checked whether an image point exists by defining an image boundary, l, S460, in the same manner as described with reference to the Max-Log MAP embodiment above and checking whether an image point exists, S461, again as described with reference to the Max-Log MAP embodiment above. If an image point does not exist, the second closest complementary constellation point, $\bar{\bar{x}}_i$, must be in the same portion of the real (or imaginary) axis of the constellation diagram as the identified closest complementary constellation point—i.e. the key point—(which is now determined to be the actual closest complementary constellation point) and one constellation point further from the relevant key boundary, S462.

If step S461 determines that an image point exists, it is checked whether the distance between the received signal point and the key point, i.e. the currently-identified closest complementary constellation point (i.e. that currently set as $\bar{x}_i$) is greater than the distance between the received point and the image point, S463.

If the answer to S463 is no, the currently-identified complementary constellation point (i.e. that currently set as $\bar{x}_i$) is the actual closest complementary constellation point. The image point is then set as the second closest complementary constellation point, $\bar{\bar{x}}_i = x_{l+\sigma_i}$, and a second image boundary, l', is set as $l'=k_i+\sigma_i^c+(-1)^{\sigma_i}$, S464. S466 checks if $1 \leq l' \leq M$ and S467 then decides if the distance between the signal point and the second closest complementary constellation point is greater than the distance between the signal point and the second image point, $x_{l'}$, $|y-\bar{\bar{x}}_i| > |y-x_{l'}|$. If the answer to either of these checks if no, no further changes are made to the current identity of $\bar{x}_i$ and $\bar{\bar{x}}_i$. If, however, both these inequalities (S466 and S467) are true, then the second image point, $x_{l'}$, is set as the second closest complementary constellation point, $\bar{\bar{x}}_i$, S468.

If, however, the answer to decision S463 is yes, and so the distance between the received signal point and the key point, i.e. the currently-identified closest complementary constellation point (i.e. that currently set as $\bar{x}_i$) is greater than the distance between the received point and the image point, then the image point is the actual closest complementary constellation point, $\bar{x}_i = x_{l+\sigma_i}$. The point that has just been replaced as the closest complementary constellation point is now assumed to be the second closest complementary constellation point and so $\bar{\bar{x}}_i = x_{k_i+\sigma_i^c}$. A second image boundary is then set as $l'=l+\sigma_i+(-1)^{\sigma_i^c}$, S465. Decision step S466 then checks if $1 \leq l' \leq M$ and S467 then decides if, as above, $|y-\bar{\bar{x}}_i| > |y-x_{l'}|$. If the answer to either of these checks if no, no further changes are made to the current identity of $\bar{x}_i$ and $\bar{\bar{x}}_i$. If, however, both these inequalities (S466 and S467) are true, the second image point, $x_{l'}$, is set as the second closest complementary constellation point, $\bar{\bar{x}}_i$, S468.

The above checks, involving a second image boundary and second image point, are required due to the unequal spacing between constellation points.

As discussed above, it is to be understood that when comparing and deciding which of two points is closer to the received signal (e.g. in S467), the midpoint between the two points-to-be-compared may be found and compared to the received signal in order to ascertain which is closest, as described above.

As with the Max-log MAP embodiment above, a loop is implemented to define the $k_{i+1}$-th key boundary, S50, and incrementally increase l, S52, until the following inequality is no longer true: i<log$_2$ M, S48. The steps following the decision step S48 if i<log$_2$ M is no longer true will be discussed further below.

Referring back to FIG. 9a, once the closest ($\bar{x}_i$) and second closest ($\bar{\bar{x}}_i$) complementary constellation points have been located for each bit (S46) and i≥log$_2$ M (S48), the hard decision point x$^{ML}$, can be identified (x$^{ML}$=x$_{k_i+\sigma_i}$) and the signature vector can be Gray encoded, S50.

It is now necessary to find the two closest constellation points which are not the complementary constellation points (i.e. constellation points which have the same value for a respective bit as the constellation point closest to the received signal). These are defined as the hard decision point x$^{ML}$ and auxiliary hard decision points, $\bar{x}^{ML}$, $\bar{\bar{x}}^{ML}$.

In order to find the closest (non-complementary) point after x$^{ML}$, (an auxiliary hard decision point) one has to compare the distance between the received signal and the left and right siblings of x$^{ML}$, the closer point is then stored as $\bar{x}^{ML}$. Thanks to Gray labelling, (x$^{ML}$, $\bar{x}^{ML}$) are the closest two points to the received signal except at one position where the first auxiliary hard decision point, $\bar{x}^{ML}$, is no longer sibling to x$^{ML}$ and another point needs to be evaluated (the second auxiliary hard decision point—denoted by $\bar{\bar{x}}^{ML}$). If the constellation points were regularly spaced, $\bar{\bar{x}}^{ML}$ would have been equal to the next point according to the Schnorr-Euchner enumeration (i.e., if $\bar{x}^{ML}$ was the left sibling, then $\bar{\bar{x}}^{ML}$ is the right sibling and vice versa). In the present case, i.e. where the constellation points are not evenly spaced, an additional check may be needed to determine $\bar{\bar{x}}^{ML}$.

Referring now to FIG. 9a, first, a check is made as to whether the received signal point is at either extreme of the axis—i.e. is the signal point either less than the lowest, or greater than the largest possible key boundary, k$_i$, S53. If the signal point is either less than the lowest, or greater than the largest possible key boundary, 1<k$_i$+σ$_i$<M will not be true.

If the answer to S53 is no, S54 sets $\bar{x}^{ML}$=x$_{k_i+\sigma_i+(-1)^{\sigma_1}}$ and $\bar{\bar{x}}^{ML}$=x$_{k_i+\sigma_i+3(-1)^{\sigma_1}}$. Using the method described below, $\bar{x}^{ML}$ and $\bar{\bar{x}}^{ML}$ can be used to calculate the Max$_2$-log MAP(b).

If the answer to S53 is yes, the signal point is not at either extreme of the axis. S56 then defines two new entities as u=k$_i$+σ$_i$+(−1)$^{\sigma_1}$ and v=k$_i$+σ$_i$+(−1)$^{\sigma_1^c}$—which in turn define a first (x$_u$) and second (x$_v$) test point. This sets the first and second test points, x$_u$ and x$_v$, as the constellation points either side of the hard decision point, with x$_u$ closest to the centre of the axis.

It is then checked if the distance between the signal point and the first test point x$_u$ is smaller than the equivalent distance between the signal point and the second test point, x$_v$, S58. If the answer to S58 is no, and so |y−x$_u$|≥|y−x$_v$|, step S62 sets $\bar{x}^{ML}$=x$_v$ and $\bar{\bar{x}}^{ML}$=x$_u$. The Max$_2$-log MAP(b) can then be calculated as described below, S64.

If the answer to S58 is yes, and so |y−x$_u$|<|y−x$_v$|, a further series of steps may be required to locate the first and second auxiliary hard decision points $\bar{x}^{ML}$, $\bar{\bar{x}}^{ML}$, S60. These further checks are required due to the separation between consecutive constellation points increasing as one gets further from the origin.

FIG. 9c illustrates the process of S60. First, x$_u$ is set as $\bar{x}^{ML}$, S600. Next a decision step, S601, determines if $$\left(\frac{k_i+\sigma_i}{\frac{M}{2}+1}\right)^{(-1)^{\sigma_1}} < 1.$$

If not, x$_v$ is set as $\bar{\bar{x}}^{ML}$, S602, and the Max$_2$-log MAP(b) can be calculated as discussed below.

If the outcome of S601 is yes, and so $$\left(\frac{k_i+\sigma_i}{\frac{M}{2}+1}\right)^{(-1)^{\sigma_1}} < 1,$$

the remainder, r, of (k$_i$+σ$_i$−σ$_1$)÷4 is calculated S603.

If this remainder, r, is greater than 0 (see step S604), step S611 defines Δ=2$^{2-rem(r,2)}$. If the remainder, r, is not greater than 0 (see step S604), step S605 defines $$r' = \left\lfloor \frac{\sigma_1(M+1)+(-1)^{\sigma_1}(k_i+\sigma_i)}{4} \right\rfloor$$

and then S606 defines Δ=2$^{4-rem(r',2)}$.

After either S606 or S611 have been undertaken, S607 defines w=k$_i$+σ$_i$+(−1)$^{\sigma_1}$(Δ+1). A decision step, S608, then determines whether |y−x$_v$|>|y−x$_w$|. If so, x$_w$ is set as $\bar{\bar{x}}^{ML}$. If |y−x$_v$|>|y−x$_w$| is not true, x$_v$ is set as $\bar{\bar{x}}^{ML}$, S609.

The method of S60 can be undertaken offline with the value of x$_w$ retrieved from a stored lookup table.

Referring back to FIG. 9a, the Max$_2$-log MAP(b) can then be calculated S64, as outlined below.

A numerical example of the Max$_2$-log MAP embodiment according to FIGS. 9a-c will now be described with reference to FIGS. 10a-d and 11a-c.

Referring now to the specific embodiment as illustrates in FIGS. 10a-d and 11a-c, the same number and spacing of constellation points and the same received signal point is used is used as in the above numerical example.

Figure 10A:
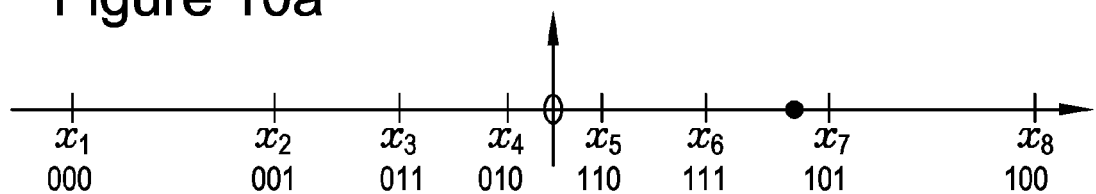
FIGS. 10a to 10d schematically illustrate a first part of a method according to the embodiment of FIG. 8.
Figure 10B:
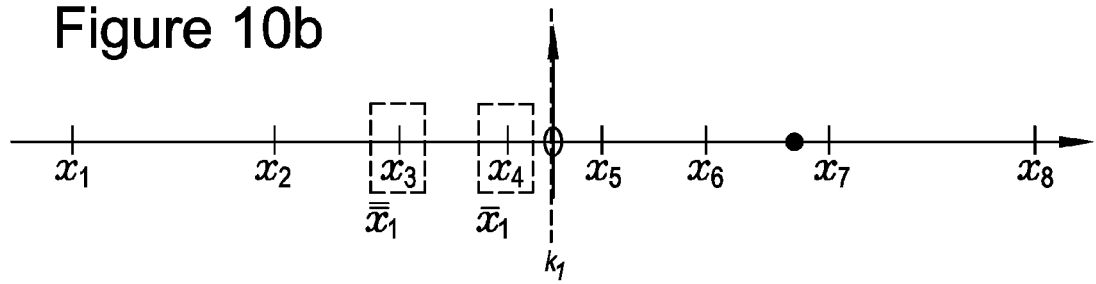
Figure 10C:
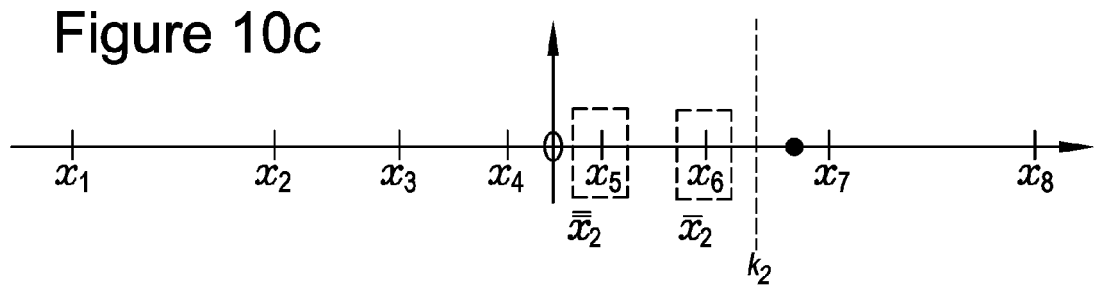

The key boundary k$_1$ and signature vector entry σ$_1$ are calculated as described above with reference to the first embodiment, FIG. 10b, S42 and S44. An initial closest complementary constellation point, $\bar{x}_i$, is identified as the key point, S44.

A check is conducted to see whether an image point exists as with the first embodiment S46, S460 and S461 (see the flow chart of figure AD). As no image point exists for the first two bits (see above), the second closest complementary constellation points must be those that are in the same portion of the real (or imaginary) axis as the identified closest complementary constellation point (which is now determined to be the actual closest complementary constellation point) and one constellation point further from the key boundaries k$_1$ and k$_2$. As such, $\bar{x}_1$ and $\bar{x}_2$ are obtained directly as $\bar{x}_i$=x$_{k_i+\sigma_i+(-1)^{\sigma_i}}$, hence $\bar{x}_1$=x$_3$ and $\bar{x}_2$=x$_5$, see FIGS. 10b and 10c.

Figure 10D:
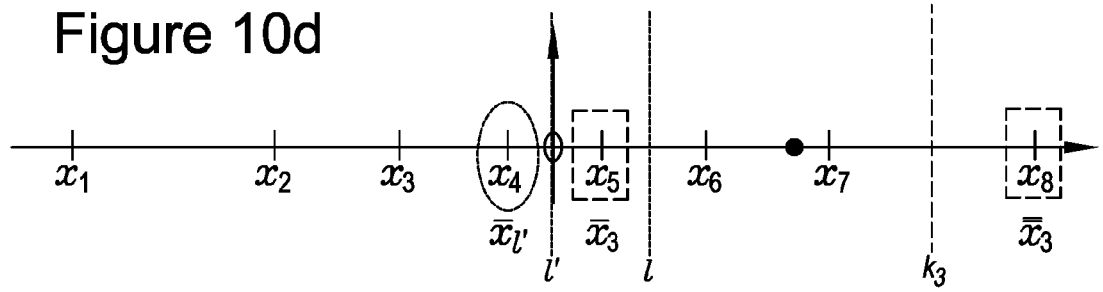

For the third bit of the embodiment, depicted in FIG. 10d, the image point, x$_{l+\sigma_3}$=x$_5$, is closer to the received signal point than the key point (i.e. the originally identified closest complementary constellation point). As such, x$_5$ is the actual closest complementary constellation point and is set as such, $\bar{x}_3$=x$_5$ (replacing x$_8$), and x$_8$ is initially set as the second closest complementary constellation point, $\bar{\bar{x}}_3$, S465. Now a second image boundary is set, l'=l+σ$_3$+(−1)$^{\sigma_3^c}$÷4. Decision step S466 is true, but decision step S467 is not true, i.e. |y−$\bar{\bar{x}}_3$|>|y−x$_{l'}$| is not true, as |y−x$_8$|≤|y−x$_4$|. The point x$_8$ is therefore the actual second closest complementary constellation point, $\bar{\bar{x}}_3$, (as shown in FIG. 10d) and is retained.

As such, the closest and second closest complementary constellation points are $\bar{x}_1$=x$_4$, $\bar{\bar{x}}_1$=x$_3$; $\bar{x}_2$=x$_6$, $\bar{\bar{x}}_2$=x$_5$; $\bar{x}_3$=x$_5$, $\bar{\bar{x}}_3$=x$_8$.

Figure 11A:
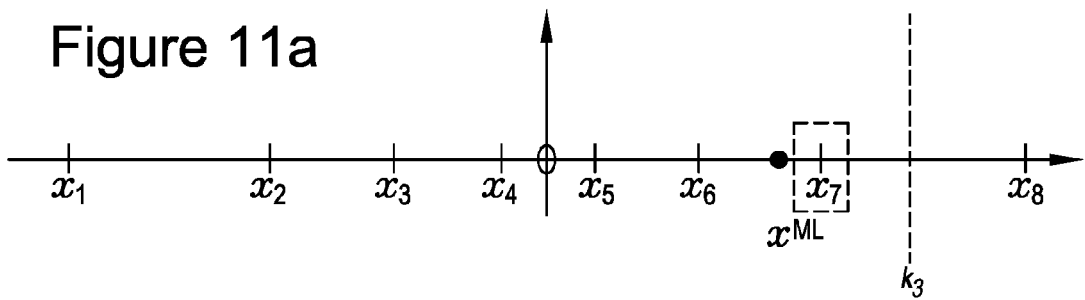
FIGS. 11a to 11c schematically illustrate a second part of a method according to the embodiment of FIG. 8.
Figure 11B:
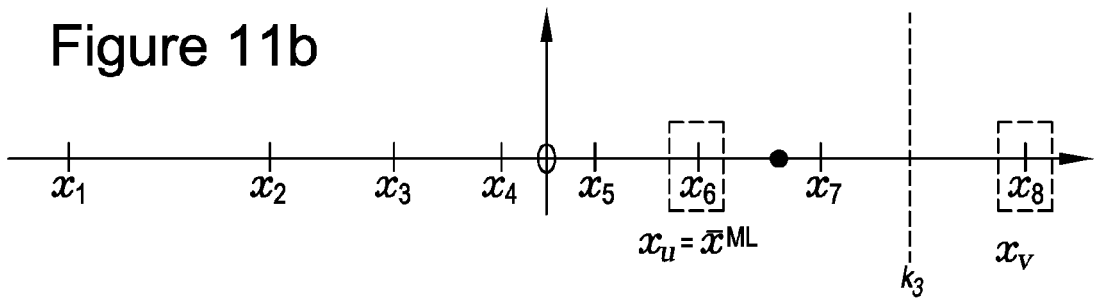
Figure 11C:
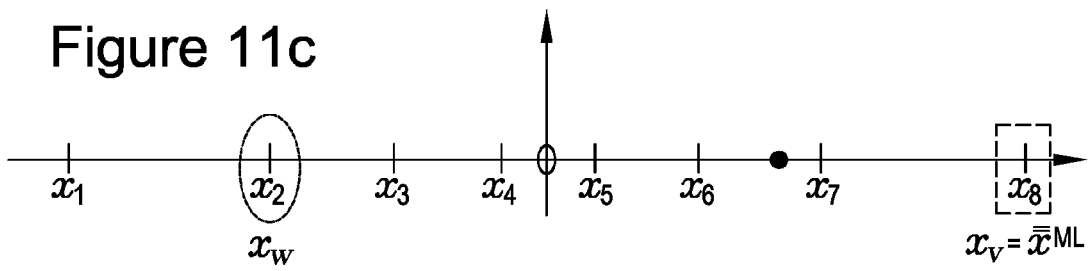

Continuing with the algorithm illustrated in FIGS. 9a to 9c, and with reference to FIGS. 11a to 11c, the hard decision point $x^{ML}$, can be identified ($x^{ML}=x_{k_i+\sigma_i}$) and the signature vector can be Gray encoded, S50. This procedure is similar to that of the previous embodiment and gives $x^{ML}=x_7$ and Gray(σ)=[1 0 1].

Continuing with the method of FIG. 9a, for S53: $k_i+\sigma_i=k_3+\sigma_3=7$ and 1<7<8, S53, $u=k_3+\sigma_3+(-1)^{\sigma_1}$; $v=k_3+\sigma_3+(-1)^{\sigma_1^c}$; therefore u=6; v=8.

The distances between the signal point and the first and second test points $x_u$ and $x_v$ are compared, S58, and $x_u$ is closer. Therefore the answer to S58 is yes. The first auxiliary hard decision point $\bar{x}^{ML}=x_u=x_6$, S600.

$$\left(\frac{k_i+\sigma_i}{\frac{M}{2}+1}\right)^{(-1)^{\sigma_1}} = \left(\frac{6+1}{\frac{8}{2}+1}\right)^{(-1)^1} < 1,$$

which is true, S601. Then the remainder, r, is calculated of $(k_i+\sigma_i-\sigma_1) \div 4 = 6 \div 4$; r=2, S603. r>0, S604, therefore step S611 defines $\Delta=2^{2-rem(r,2)}=2^{2-rem(2+2)}=4$. Step S607 defines $w=k_i+\sigma_i+(-1)^{\sigma_1}(0+1)=6+1+(-1)\times(4+1)=2$. It can be verified that $x_w=x_2$ is the left neighbour to the hard decision point for the second bit. However, $x_v=x_8$ is closer to the signal point than $x_w=x_2$. Therefore the second auxiliary hard decision point, $\bar{\bar{x}}^{ML}=x_v=x_8$, S609.

It can then be determined that $\bar{x}^{ML}$ is the second closest constellation point for $\chi_1^1$, $\chi_3^1$, while $\bar{\bar{x}}^{ML}$ is the second closest constellation point for $\chi_2^0$. This is because, in the present case, the Gray label associated with $\bar{x}^{ML}$ which in the current example is given by [111] differs with the hard-decision point's label [101] in the second bit.

Having located the two closest points from $\chi^1$ and $\chi^0$, the Max$_2$-log MAP(b) can be evaluated using the following: $\bar{x}_1=x_4$, $\bar{\bar{x}}_1=x_3$; $\bar{x}_2=x_6$, $\bar{\bar{x}}_2=x_5$; $\bar{x}_3=x_5$, $\bar{\bar{x}}_3=x_8$; $x^{ML}=x_7$, $\bar{x}^{ML}=x_6$, $\bar{\bar{x}}^{ML}=x_8$, and, given that the LLR when using two terms in the approximation $$LLR(b_i) \approx \ln\left(e^{\frac{-|y-x^{ML}|^2}{2N_0}} + e^{\frac{-|y-x'^{ML}|^2}{2N_0}}\right) - \ln\left(e^{\frac{-|y-\bar{x}_i|^2}{2N_0}} + e^{\frac{-|y-\bar{\bar{x}}_i|^2}{2N_0}}\right)$$

Where $x'^{ML}$ is the auxiliary hard decision point for the respective bit (i.e. one of $\bar{x}^{ML}$, $\bar{\bar{x}}^{ML}$). The LLRs for the respective bits can be calculated according to the following.

$$LLR(b_1) \approx \ln\left(e^{\frac{-|y-x_e|^2}{2N_0}} + e^{\frac{-|y-x_e|^2}{2N_0}}\right) - \ln\left(e^{\frac{-|y-x_e|^2}{2N_0}} + e^{\frac{-|y-x_e|^2}{2N_0}}\right)$$

$$LLR(b_2) \approx \ln\left(e^{\frac{-|y-x_e|^2}{2N_0}} + e^{\frac{-|y-x_e|^2}{2N_0}}\right) - \ln\left(e^{\frac{-|y-x_e|^2}{2N_0}} + e^{\frac{-|y-x_e|^2}{2N_0}}\right)$$

$$LLR(b_3) \approx \ln\left(e^{\frac{-|y-x_e|^2}{2N_0}} + e^{\frac{-|y-x_e|^2}{2N_0}}\right) - \ln\left(e^{\frac{-|y-x_e|^2}{2N_0}} + e^{\frac{-|y-x_e|^2}{2N_0}}\right).$$

A further embodiment of the Max$_2$-log MAP demapper according to the present disclosure will now be discussed with reference to FIGS. 14 to 18. Where elements of the figures are not discussed in detail they are the same as with the above-embodiment (i.e. that according to FIGS. 9a-c).

Figure 14:
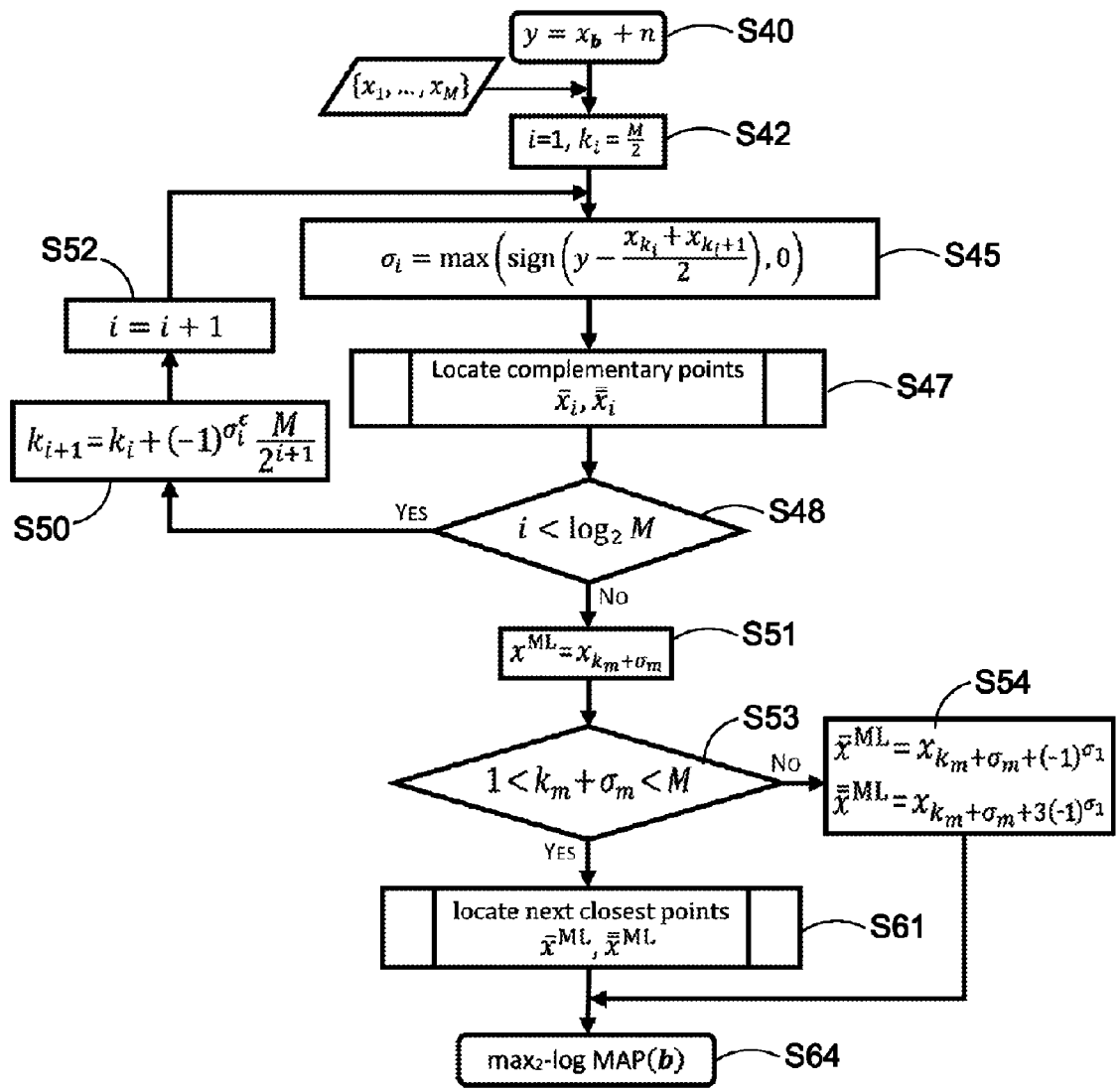
FIG. 14 is an alternative embodiment of a $Max_2$-log MAP demapper to that of FIG. 9a, which schematically illustrates the embodiment of FIG. 8.

Turning now to FIG. 14, a flow chart illustrating an algorithm according to an embodiment is illustrated. The algorithm is a variant to that shown in FIG. 9a. Where the steps are identical to those in FIG. 9a, the same reference numeral has been used, as above. Only the differences between the algorithm of FIG. 9a and FIG. 14 will be discussed below.

The closest complementary constellation point is not set at the same time as the signature vector entry is set in S45, unlike in S44 of FIG. 9a.

The algorithm used to locate the complementary points S47 is different to that of FIGS. 9a and 9b, and will be described in more detail with reference to FIG. 15.

Once the complementary constellation points have been identified for every bit, the hard decision point is set, S51, and a check is made as to whether the received signal point is at either extreme of the axis—i.e. is the signal point either less than the lowest, or greater than the largest possible key boundary, S53. If the answer to S53 is no (i.e. the hard decision point is at an extreme of the axis), the same algorithm continues in a similar manner to that of FIG. 9a.

If the hard decision point is not at an extreme of the axis, the auxiliary hard decision points are identified S61 as will be discussed with reference to FIG. 16.

Figure 15:
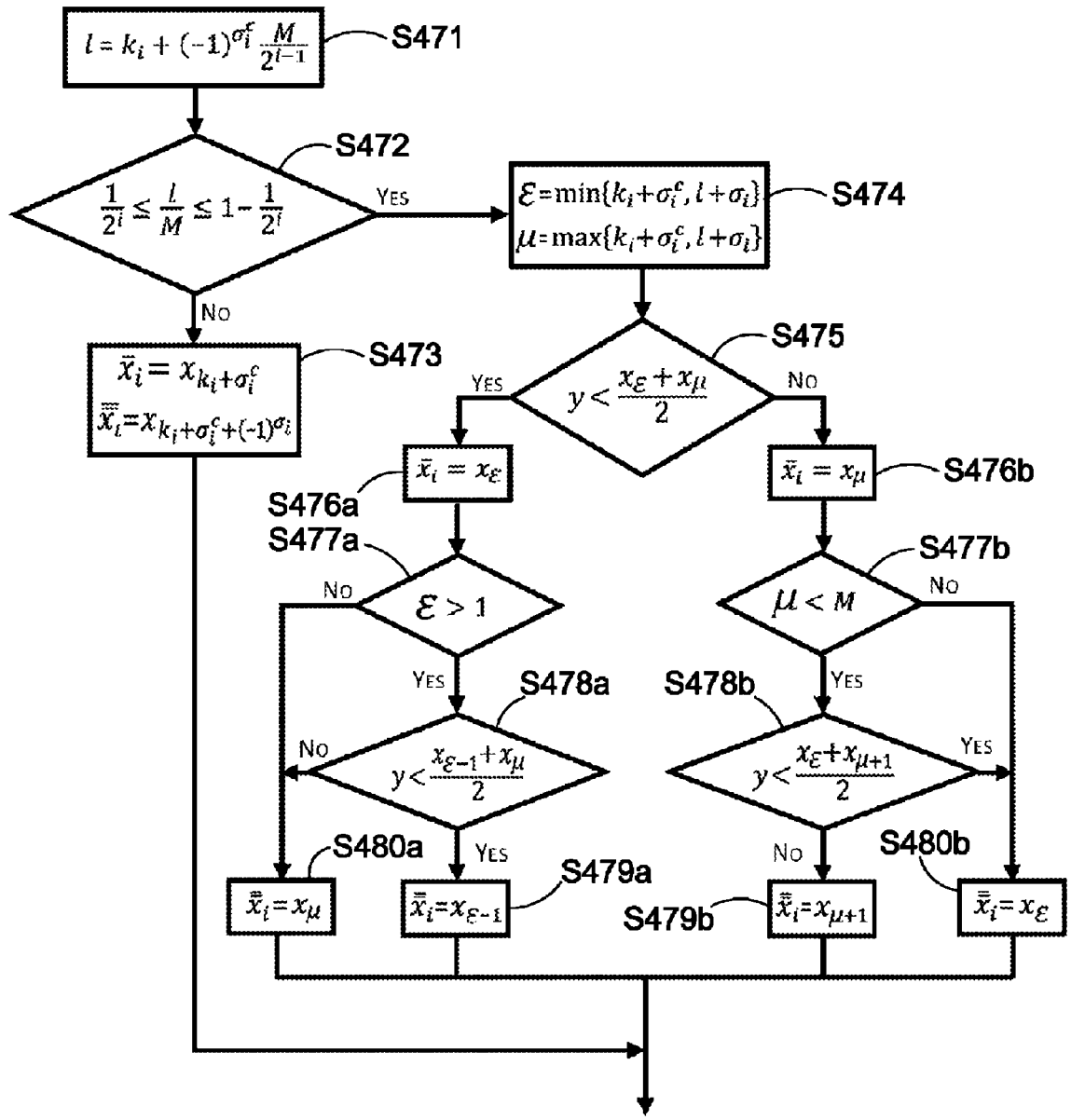
FIG. 15 is a flow chart which illustrates a part of the algorithm of FIG. 14.

FIG. 15 illustrates an algorithm for locating the closest complementary constellation points. FIG. 15 illustrates an algorithm for locating the closest complementary constellation points as illustrated at S47 in FIG. 14.

An image boundary is defined, S471, as described elsewhere herein. A check is then made to see if an image point exists, S472, again according to a method described herein. If the image point does not exist (i.e. it is located outside of the constellation), the complementary constellation point on the other side of the key boundary to the received signal is set as the closest complementary constellation point according to $\bar{x}_i=x_{k_i+\sigma_i^c}$ and its neighbouring complementary constellation point is set as the second closest complementary constellation point according to $\bar{\bar{x}}_i=x_{k_i+\sigma_i^c+(-1)^{\sigma_i}}$.

If the answer to S472 is yes and an image point does exist, a first comparison point is set as $x_\varepsilon$ where $\varepsilon=\min(k_i+\sigma_i^c, 1+\sigma_i)$ and a second comparison point is set as $x_\mu$ where $\mu=\max(k_i+\sigma_i^c, 1+\sigma_i)$, S474, where $k_i+\sigma_i^c$ is the complementary constellation point closest to and on the other side of the key boundary, and $1+\sigma_i$ is the image point.

It is then checked, in step S475, if the received signal is less than the arithmetic mean of the two comparison points. If the answer to that is yes the received signal is closest to the first comparison point and it is therefore set as the closest complementary constellation point, $\bar{x}_i=x_\varepsilon$, S476a. If the answer to that is no the received signal is closest to the second comparison point and the second comparison point is set as the closest complementary constellation point, $\bar{x}_i=x_\mu$, S476b.

If the first comparison point is set as the closest complementary constellation point S476a, it is determined if the first comparison point is at an extreme of the constellation (i.e. there is no neighbouring constellation point on one of its sides), S477a, by checking if ε>1. If the answer to this is no, and therefore the first comparison point is at an extreme of the constellation, the second comparison point is set as the second closest complementary constellation point $\bar{\bar{x}}_i=x_\mu$, S480a.

If the answer to S477a, ε>1, is yes, it is determined if the received signal is less than the arithmetic mean of the constellation point which is a neighbour to the first comparison point on the other side to the second comparison point, $x_{\varepsilon-1}$, and the second comparison point, $$y < \frac{x_{\varepsilon-1}+x_\mu}{2}, S478a.$$

This checks if the received signal is closest to the second comparison point or the first comparison point's neighbour. If the answer to this is yes (i.e. the first comparison point's neighbour is closer to the received signal than the second comparison point), the first comparison point's neighbour is set as the second closest complementary constellation point, S479a, $\bar{x}_f = x_{\varepsilon-1}$. If the answer to this is no (i.e. the second comparison point is closer to the received signal than the first comparison point's neighbour), the second comparison point is set as the second closest complementary constellation point, $\bar{x}_f = x_\mu$, S480a.

Likewise, if the second comparison point is set as the closest complementary constellation point S476b, it is determined if the second comparison point is at an extreme of the constellation (i.e. there is no neighbouring constellation point on one of its sides), S477a, by checking if μ<M. If the answer to this is no, and therefore the second comparison point is at an extreme of the constellation, the first comparison point is set as the second closest complementary constellation point $\bar{x}_f = x_\varepsilon$ S480b.

If the answer to S477b, μ<M, is yes, it is determined if the received signal is less than the arithmetic mean of the constellation point which is a neighbour to the second comparison point on the other side to the first comparison point, $x_{\mu-1}$, and the second comparison point, $$y < \frac{x_\varepsilon + x_{\mu+1}}{2}, S478b.$$

This checks if the received signal is closest to the first comparison point or the second comparison point's neighbour. If the answer to this is no (i.e. the second comparison point's neighbour is closer to the received signal than the first comparison point), the second comparison point's neighbour is set as the second closest complementary constellation point, S479b, $\bar{x}_f = x_{\mu+1}$. If the answer to this is yes (i.e. the first comparison point is closer to the received signal than the second comparison point's neighbour), the first comparison point is set as the second closest complementary constellation point, $\bar{x}_f = x_\varepsilon$ S480a.

Figure 16:
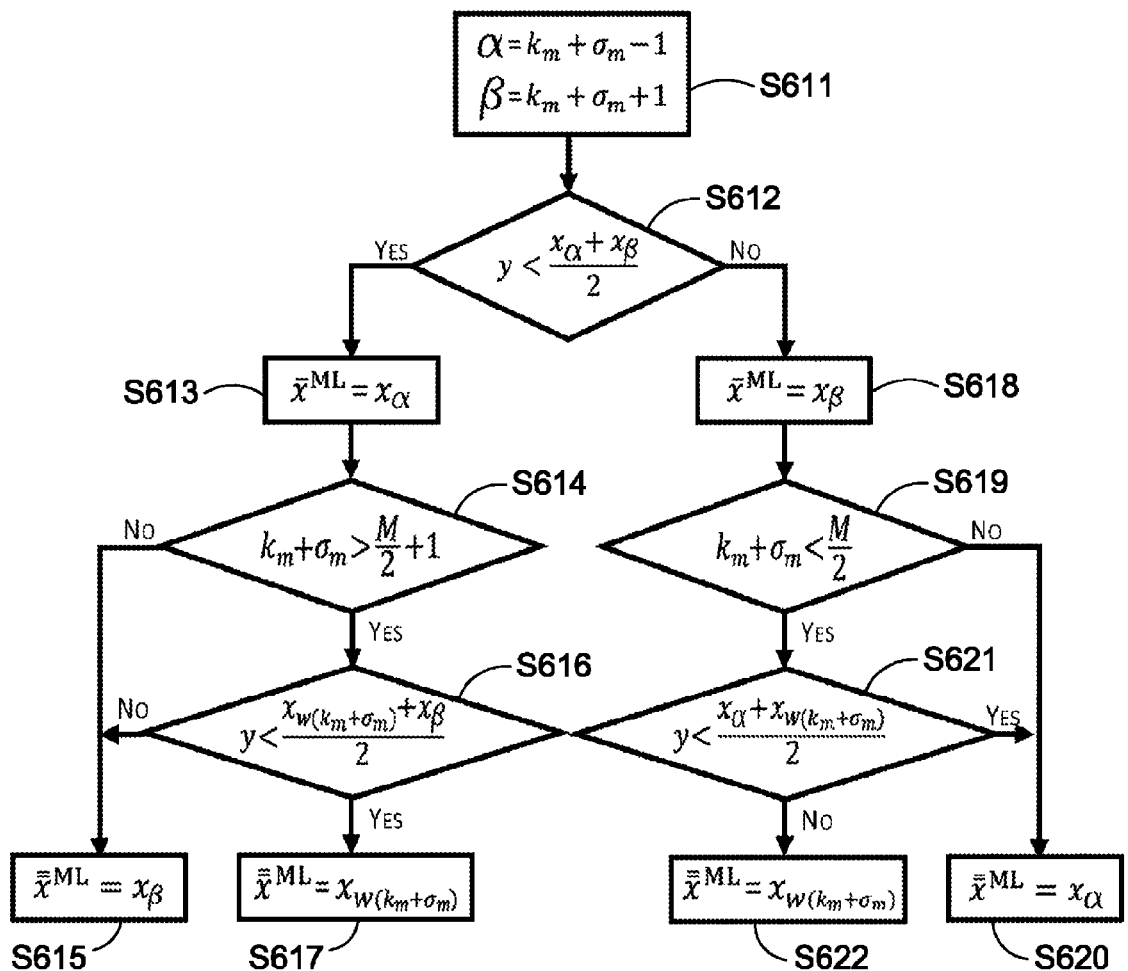
FIG. 16 is a flow chart which illustrates a further part of the algorithm of FIG. 14.

FIG. 16 illustrates an algorithm for locating the first and second auxiliary hard decision point as used in the algorithm of FIG. 14. The algorithm of FIG. 16 can, however, be used with any embodiment.

At S611, two test points are defined as $x_\alpha$ and $x_b$ where $\alpha = k_m + \sigma_m - 1$ and $\beta = k_m + \sigma_m + 1$. Next, it is determined if the received signal is closer to $x_\alpha$ than $x_b$, S612. If the answer to S612 is yes, S613 sets the first auxiliary hard decision point as $x_\alpha$, $\bar{x}^{ML} = x_\alpha$. A decision step S614 then determines if $$k_m + \sigma_m > \frac{M}{2} + 1.$$

If the answer to this is no, $x_b$ is set as the second auxiliary hard decision point, $\bar{x}^{ML} = x_\beta$ S615.

If the answer to S614 is yes, S616 checks $$\text{whether } < \frac{x_{w(k_m+\sigma_m)} + x_\beta}{2}.$$

Figure 17:
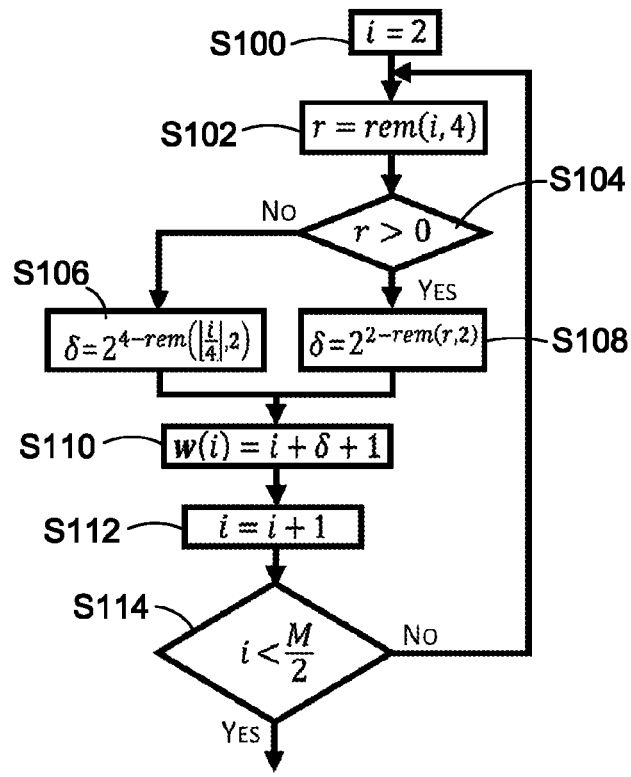
FIGS. 17 and 18 are flow charts which illustrate methods for offline calculation of a variable for use in determining auxiliary hard decision points according to an embodiment.
Figure 18:
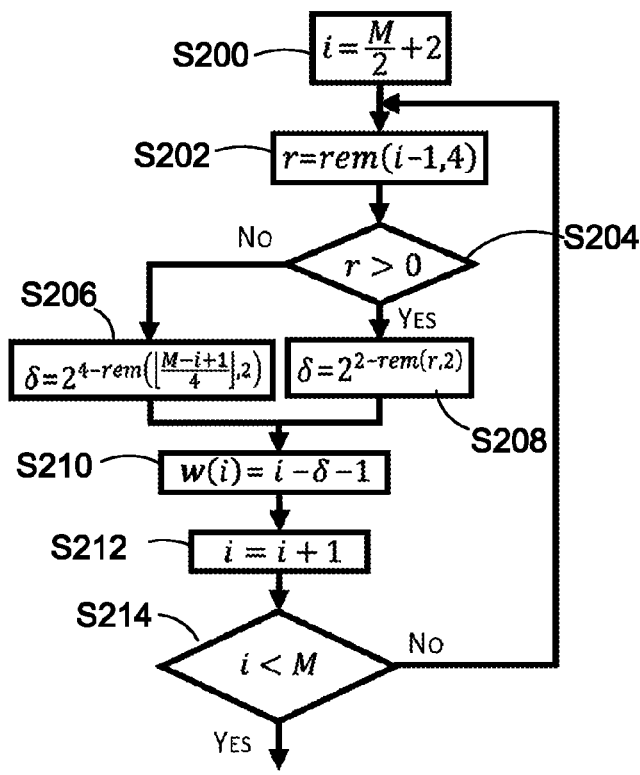

Note that w is determined offline in accordance with the algorithms depicted in FIGS. 17 and 18. If the answer to S616 is no, $x_b$ is set as the second auxiliary hard decision point, $\bar{x}^{ML} = x_\beta$ S615. If the answer to S616 is yes, the second auxiliary hard decision point is set as follows: $\bar{x}^{ML} = x_{w(k_m+\sigma_m)}$ S617.

If the answer to S612 is no, S618 sets the first auxiliary hard decision point as $x_b$, $\bar{x}^{ML} = x_\beta$. A decision step S619 then determines if $$k_m + \sigma_m < \frac{M}{2}.$$

If the answer to this is no, $x_\alpha$ is set as the second auxiliary hard decision point, $\bar{x}^{ML} = x_\alpha$ S620.

If the answer to S619 is yes, S621 checks if $$y < \frac{x_\alpha + x_{w(k_m+\sigma_m)}}{2}.$$

If the answer to S621 is yes, $x_\alpha$ is set as the second auxiliary hard decision point, $\bar{x}^{ML} = x_\alpha$ S620. If the answer to S621 is no, the second auxiliary hard decision point is set as follows: $\bar{x}^{ML} = x_{w(k_m+\sigma_m)}$ S622.

FIG. 17 depicts an algorithm for calculating w. This algorithm may be used with any embodiment where the auxiliary hard decision points may be determined offline. First i=2, S100. Then r=rem(i, 4), S102. Next, a decision is made as to whether r>0, S104. If the answer to S104 is no, $$\delta = 2^{4-rem(\lfloor \frac{i}{4} \rfloor, 2)}, S106.$$

If the answer to S104 is yes, $\delta = 2^{2-rem(r,2)}$, S108.

Next, after either S106 or S108, w(i)=i+δ+1, S110 and subsequently i=i+1, S112. Then a decision step determines whether $$i > \frac{M}{2}, S114.$$

it me answer is yes, the algorithm is complete. If the answer is no, a loop takes the algorithm back to S102.

FIG. 18 depicts an algorithm for calculating w. This algorithm may be used with any embodiment where the auxiliary hard decision points may be determined offline. First $$i = \frac{M}{2} + 2, S200.$$

Then r=rem(i−1,4), S202. Next, a decision is made as to whether r>0, S204. If the answer to S204 is no, $$\delta = 2^{4-rem(\lfloor \frac{M-i+1}{4} \rfloor, 2)},$$

S206. If the answer to S204 is yes, $\delta = 2^{2-rem(r,2)}$, S208.

Next, after either S206 or S208, w(i)=i−δ−1, S210 and subsequently i=i+1, S112. Then a decision step determines whether i>M, S214. If the answer is yes, the algorithm is complete and w has been determined. If the answer is no, a loop takes the algorithm back to S202.

A numerical example will now be provided for the Max$_2$-log MAP demapper according to the embodiment of FIGS. 14 to 16.

For the first two bits, there are no image points, and hence $\bar{x}_1$ and $\bar{x}_2$ are obtained directly as $\bar{x}_i = x_{k_j + \sigma_j^c + (-1)^{\sigma_j}}$ S473, hence $\bar{x}_1 = x_3$ and $\bar{x}_2 = x_5$. For the third bit, an image point exists S472, and the received signal is less than the median of the key point and the image point S474, S475. The image point is therefore set as closest complementary constellation point S476a. The image point is not at an extreme of the constellation S477a, so the received signal is compared to the median of $x_{\epsilon-1} = x_4$ and $x_\mu = x_8$ S478a, which is given by 0.6884 and hence $\bar{x}_3 = x_\mu = x_8$.

At the end of the binary search, the algorithm determines the hard decision point as $x^{ML} = x_{k_3 + \sigma_3} = x_7 = 0.8871$. $k_m + \sigma_m = 7$ and so the answer to S53 is yes. Now looking at FIG. 16, $\alpha = 6$ and $\beta = 8$. The left sibling (i.e., $x_6$) is closer to the received signal than the right sibling (i.e., $x_8$) (i.e. the received signal is less than the median of these two constellation points S612), then $\bar{x}^{ML}$ is set to $x_6$ S613.

In order to locate $\bar{x}^{ML}$, the algorithm proceeds as follows. Note, however that the vector w is supposed to be stored in advance using an algorithm, for example, as shown in FIGS. 17 and 18. It is shown here how it is computed for this specific example.

One has $k_m + \sigma_m = 7$. The answer to S614 is therefore yes.

The value of w now needs to be calculated. Since this is being done for a specific example, the algorithm of FIGS. 17/18 are not done iteratively.

In this specific example, this is done with reference to FIG. 18, since we are operating in the right half of the constellation. r=2, and hence $\delta$=4 and w(7)=7−4−1=2. The value for w(7) can be acquired from a lookup table populated a priory using offline calculations. The algorithm compares then the received signal to the median of $x_2$ and $x_8$ which is given by 0.5227 and hence $\bar{x}^{ML}$ is set to $x_8$.

Finally, it can then be determined that $\bar{x}^{ML}$ is the second closer point for $\chi_1^1, \chi_3^1$, while $\bar{x}^{ML}$ is the second closer point for $\chi_2^0$. Having located the two closest points from $\chi^1$ and $\chi^0$, the algorithm evaluates the max$_2$-log MAP.

A further description of a Max$_2$-log MAP demapper according to an embodiment will now be provided. In the following description, different notation to that used above may be used. The described embodiment, however, is within the scope of the present disclosure.

Constellations with uniformly spaced, equiprobable points are known to fall short of achieving Shannon capacity over AWGN channel. For one dimensional signalling, this loss (known as shaping loss) approaches 1.53 dB for high signal-to-noise ratio and large constellation size M. The shaping loss can be recovered by different means, one of which is through geometric shaping which allows unequal spacing between neighbouring points. However, the provided performance improvement comes at the expense of a higher demodulation complexity with respect to uniform constellations. Embodiments described herein relate to near optimum low-complexity soft demapping of nonuniform pulse amplitude modulation (NU-PAM). The computational cost of embodiments grows logarithmically with M in contrast to its counterpart brute-force demapper whose complexity grows linearly with M. The complexity savings become significant as the size of the constellations grows, which is typically the case for upcoming wireless communications and video broadcasting standards.

Constellations with uniformly spaced, equiprobable points are known to fall short of achieving Shannon capacity over AWGN channel. In fact, for real valued AWGN channel (i.e., the underlying constellation is PAM), this incurred loss (known as shaping loss) approaches $$\frac{1}{2}\log_2\left(\frac{\pi e}{6}\right)$$

bits per channel use in me high SNR regime as the size of constellation M increases. The shaping loss can be recovered by different means. For instance, a shaping code may be employed to alter the equiprobable nature of the underlying constellation, which can be done by encoding the incoming bits according to Huffman scheme, thus mapping codewords of different lengths to each constellation point. This prefix code may be designed to approach the optimal Maxwell-Boltzman distribution. However, the resulting variable-rate transmission imposes some practical issues such as buffering management. Another approach consists of restricting the boundary region of the constellation points to be a hypersphere. As the bounding hypersphere dimensions N approaches infinity, the optimum shaping gain is achieved. Again, the spherical bounding region imposes practical issues, such as the induced high complexity modulation/demodulation. It has also been demonstrated that constellations with equiprobable points are capable of achieving Shannon capacity over AWGN channels in the asymptotic regime (as M becomes very large) by allowing unequal spacing between neighbouring points (known as geometric shaping). It has been proved that if the constellation points are adjusted in a way such that the modulator outputs exhibits a Gaussian distribution, the resulting constellation is capable of approaching the AWGN capacity as M→∞.

An instance of Gaussian-fitted constellations $\{x_k: k=1, \ldots, M\}$ is obtained by $$\frac{1}{\sqrt{2\pi}} \int_{-\infty}^{x_k} e^{-\frac{t^2}{2}} dt = \frac{2k-1}{2M}, k = 1 \ldots M.$$

It is worth noting that in the above formula, the constellation points are assumed equally probable. This Gaussian fitting can be applied independently over the in-phase and quadrature constellation with the resulting nonuniform quadrature amplitude (NU-QAM) being simply the Cartesian product of the underlying nonuniform pulse amplitude modulation (NUPAM) constellations.

In a typical scenario, these nonuniform constellations are used in conjunction with an error-correcting code (e.g., LDPC or Turbo code). Embodiments described herein disclose a near-optimum reduced complexity soft demapper. For this purpose, assume without loss of generality a real AWGN channel, y the system model is then given by $$y = x_b + w,$$

where y denotes the noise contaminated signal, $x_b$ denotes the transmitted symbol corresponding to a binary label $b=(b_1, b_2, \ldots, b_m)$, and w denotes the AWGN sample. The log likelihood ratio (LLR) is then given by $$LLR(b_i) = \ln\frac{\mathbb{P}(b_i = 1 | y)}{\mathbb{P}(b_i = 0 | y)} = \ln\frac{\sum_{b: b_i=1} e^{-\frac{|y-x_b|^2}{2N_0}}}{\sum_{b: b_i=0} e^{-\frac{|y-x_b|^2}{2N_0}}}, \quad (1)$$

where $N_0$ denotes the noise variance. The above may be simplified thanks to the max-log approximation as shown below $$LLR(b_i) \approx \frac{\min\limits_{b:b_i=0} |y-x_b|^2 - \min\limits_{b:b_i=1} |y-x_b|^2}{2N_0}. \quad (2)$$

Due to practical considerations, the exact LLR is better implemented by recursively applying the Jacobian logarithm given by $$\log(e^x+e^y)=\max\{x,y\}+f_c(|x-y|),$$

where $f_c(|x-l|)=\log(1+e^{-|x-y|})$. Several attempts to well approximate the exact LLR while keeping the demodulation complexity at an affordable level relied on approximating the correction function by a piecewise-constant function or a piecewise-linear function. Those approaches consist of storing the parameters of the approximated correction function in a lookup table, and based on the interval in which falls the argument, the approximate correction function is calculated. The major drawback of those approaches is their inherent recursive nature which still results in a relatively high demodulation complexity.

The LLR function can also be approximated for each bit by a piecewise linear function. Therefore, by performing a simple binary search, the algorithm determines in which region falls the received signal and the linearised LLR parameters (i.e., slope and y-intercept) are directly retrieved or each bit. It is worth noting that the parameters of the piecewise-linear LLR need to be evaluated for each SNR. A low-complexity max-log MAP demapper with computational complexity that grows logarithmically with M has also been proposed. However the algorithm assumes uniform constellations.

Intuitively, a better approximation of the original LLR may be obtained by considering the first two dominant terms in the numerator as well as the denominator. It is proposed that a new low-complexity algorithm to locate the two closest points to the received signal from the set of points $\chi_i^1$ (resp. $\chi_i^0$) corresponding to (b: $b_i$=1) (resp. b: $b_i$=0) with i=1, . . . , m. Reference will be made to the proposed algorithm by max$_2$-log MAP.

Assume that the hard decision point (denoted by $z_1$) has a Gray binary label b. Hence, for the i-th bit, $z_1 \in \chi_i^{b_i}$. The next closest point to the received signal from within $\chi_i^{b_i}$ is denoted $z_2(i)$. The two closest points to the received signal from the complementary constellation $\chi_i^{b_i^c}$ (the superscript c stands for the Boolean complement) are denoted by $z'_1(i)$ and $z'_2(i)$ respectively. The main idea behind the proposed algorithm is that once the hard decision estimate has been found, the rest of the points (i.e. $z'_1$, $z'_2$ and $z_2$) can be determined through a limited number of comparisons and Euclidean metric evaluations as will be shown shortly.

The present approach is better explained through a numerical example then generalized. An embodiment may start by locating the hard decision point $z_1$. In case of uniform PAM constellations, $z_1$ could be obtained in a straightforward manner, however due to the non-equal spacing between neighbouring points, a binary search is employed.

Let $\{x_k: k=1 \ldots M\}$ denote the NU-PAM constellation points where the n-th key boundary is simply the arithmetic mean of $x_n$ and $x_{n+1}$, where n=1 . . . M−1. The progress of the series of comparisons throughout the binary search is tracked via a signature vector σ where at the i-th step $\sigma_i$ is set to one if the received signal is greater than the current boundary, otherwise $\sigma_i$ is set to zero.

Let M=8, the NU-PAM constellation is then given by {±0.1573:±0.4888:±0.8871:±1.5341}. Assume the received signal y is equal to 0.7724. Hence, the Algorithm (Part (A) of which is presented in table 2 and part (B) of which is presented in table 3) starts by comparing the received signal to the $n_1$-th key boundary with $n_1$=4 which is simply the median of the NU-PAM constellation (i.e. 0) and hence $\sigma_1$=1. It is worth noting that thanks to binary reflective Gray labelling, this key boundary also separates the constellations $\chi_1^1$ and $\chi_1^0$, therefore one has $z'_1(1)=x_{n_1+\sigma_1^c}=x_4=-0.1573$ and $z'_2(1)=x_{n_1+\sigma_1^c+(-1)^{\sigma_1^c}}=x_3$ (cf. FIG. 12(a)). Next the received signal is compared to the $n_2$-th key boundary with $n_2$=6 which is given by 0.6880 and hence $\sigma_2$=1. Again, it can be easily verified that the $n_2$-th key boundary separates $\chi_2^1$ and $\chi_2^0$ and therefore one has $z'_1(2)=x_{n_2+\sigma_2^c}=x_6=0.4888$ and $z'_2(2)=x_{n_2+\sigma_2^c+(-1)^{\sigma_2^c}}=x_5$ (cf. FIG. 12(b)). The received signal is then compared to the $n_3$-th key boundary with $n_3$=7 which is given by 1.2106 and hence one has $\sigma_3$=0. As can be verified from FIG. 12(c), the key boundary also separates $\chi_3^1$ and $\chi_3^0$, however due to non-equal spacing between neighbouring points an additional test may be needed to locate $z'_1(3)$ and $z'_2(3)$.

In fact one may need to determine whether the received signal is closer to $x_{n_3+\sigma_3^c}=x_8$ or closer to an image point, $x_{l+\sigma_3}$ with $$l = n_3 + (-1)^{\sigma_3^c} \frac{M}{4}$$

Figure 12A:
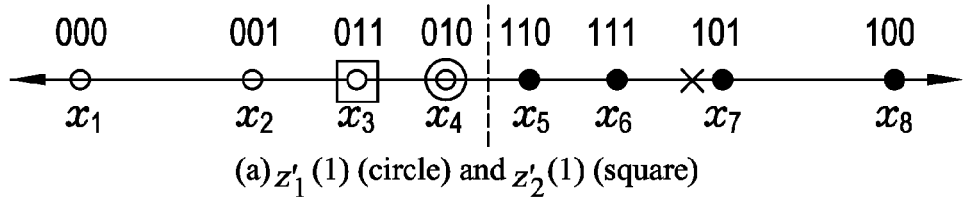
FIGS. 12a to 12f schematically illustrate a method in accordance with an embodiment.
Figure 12B:
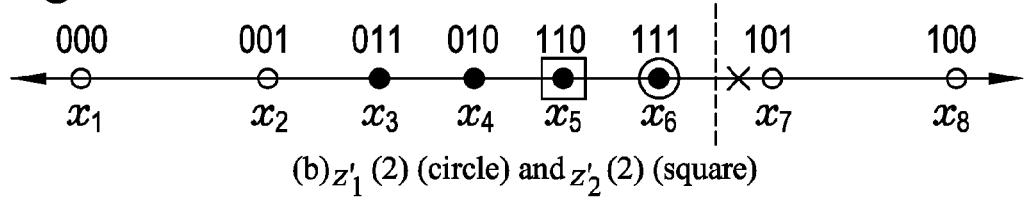
Figure 12C:
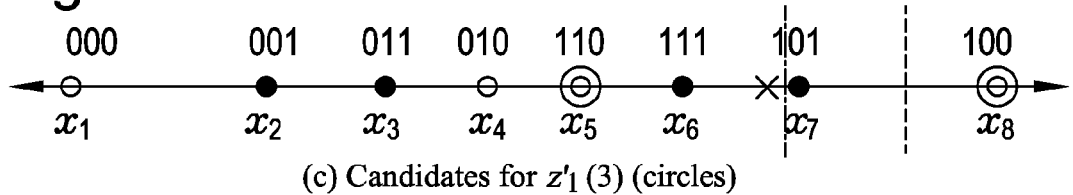
Figure 12D:
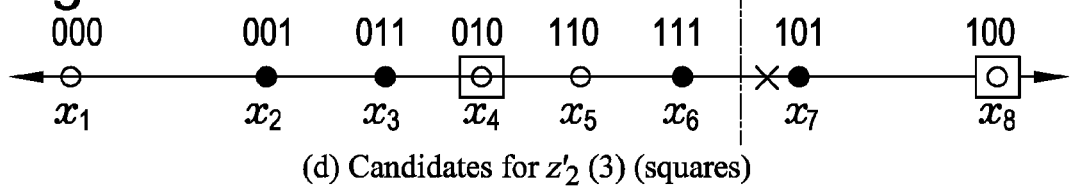
Figure 12E:
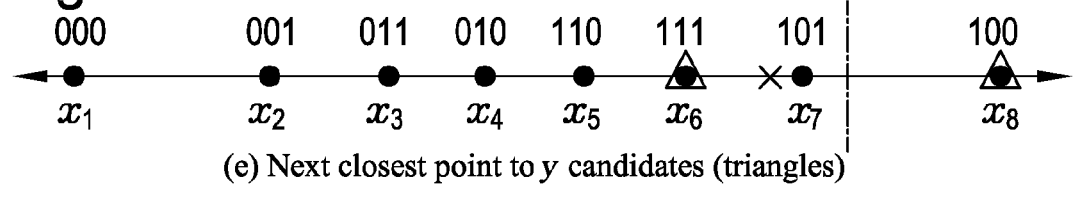
Figure 12F:
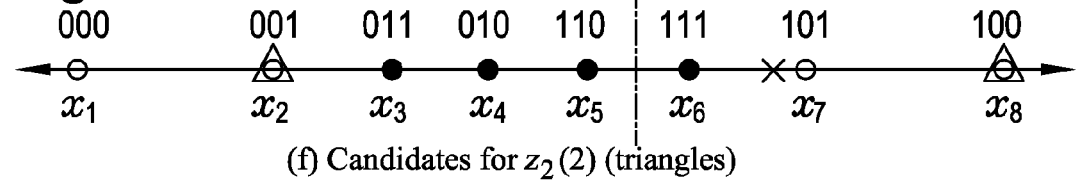

(cf. FIG. 12(c)). One has $l=n_3+2(-1)^{\sigma_3^c}=5$ and the point $x_{l+\sigma_3}=x_5$ is found nearer to the received signal than $x_{n_3+\sigma_3^c}=x_8$, which implies setting $z'_1(3)$ to $x_5$. The received signal is then compared to the midpoint of $$x_{l+\sigma_3+(-1)^{\sigma_3^0}} = x_4$$

and $x_{n_3+\sigma_3^c}$ (cf. FIG. 12(d)) which is given by 0.6884 (dash-dotted), hence implying that $z'_2(3)=x_8$. The hard-decision point is now determined; $z_1=x_{n_3+\sigma_3}=x_7=0.8871$. The corresponding Gray label is given by [101] which indicates that $z_1 \in \{\chi_1^1, \chi_2^0, \chi_3^1\}$, while $z'_1, z'_2 \in \{\chi_1^0, \chi_2^1, \chi_3^0\}$. Generally, this process continues until the hard decision point is located, where at the i-th step the key boundary is updated as $$n_i = n_{i-1} + (-1)^{\sigma_{i-1}^c} \frac{M}{2^i}.$$

The general procedure is summarized in Algorithm part (A).

Finally, the algorithm proceeds to evaluate $z_2$. The received signal is then compared to the midpoint of the hard decision point's left (i.e., $x_6$) and right (i.e., $x_8$) neighbours (a first and second test point) (cf. FIG. 12(e)) which is given by 1.0115 (dash-dotted). Thanks to Gray labelling, $z_1$ differs with its siblings at exactly one position and hence based on the above mentioned test, $z_2(i)$ is determined for all i except the bit where it differs from $z_1$ (say the j-th bit). The algorithm decides $x_6$ is closer to the hard decision estimate with j=2 resulting in $z_2(1)=z_2(3)=x_6$.

Next $z_2(j)$ is determined as follows. Assume that the left sibling $z_1^l$ is closer to the received signal, then the received signal is compared to the midpoint of the right sibling $z_1^r$ and the left sibling from $\chi_j^{b_j}$ denoted by $\tilde{x}$ (which can be determined offline for binary reflective Gray coding, for example by using the process of S60 and FIG. 9c), then the nearest point is stored as $z_2(j)$. In the present case, $\tilde{x}=x_2$ (cf. FIG. 12(f)) and the received signal is found to be larger than the midpoint of $\tilde{x}$ and $x_8$ given by 0.3235 (dash-dotted) implying $z_2(2)=x_8$. The general procedure is summarized in Algorithm part (B).

Complexity Analysis: For a M-PAM constellation, the received signal is compared to the boundary $\log_2 M$ times in addition to $2 \log_2 M$ times if the additional tests are required (cf. Algorithm part (A)). Next, the received signal is compared to boundary twice (cf. Algorithm. (B)) which adds up to $3 \log_2 M+2$ boundary comparisons. Finally, the Euclidean distance is evaluated $3+2 \log_2 M$ times in addition to $2+\log_2 M$ Jacobian logarithms. The brute-force counterpart would require to evaluate the Euclidean distance M times in addition $(2M-4) \log_2 M$ comparisons in addition to $2+\log_2 M$ Jacobian logarithms. This shows that the complexity order of the proposed algorithm grows logarithmically with the size of the PAM constellation contrary to the brute-force algorithm whose complexity order grows linearly, thus favouring embodiments according to the present disclosure especially for large size constellations. Table 1 summarizes the complexity of the different demappers. The max-log MAP is obtained by eliminating the additional steps of the proposed algorithm.

TABLE I

Worst-case complexity summary

| Demapper | log MAP | $\max_2$ - log MAP | max-log MAP |
|---|---|---|---|
| Comparisons | 0 | $3 \log_2 M + 2$ | $2 \log_2 M$ |
| Euclidean metrics | M | $3 + 2 \log_2 M$ | $1 + \log_2 M$ |
| Jacobian logarithms | $(M - 2) \log_2 M$ | $2 + \log_2 M$ | 0 |

BER performance of the proposed algorithm along with the original log MAP and max-log MAP demappers is provided in FIG. 3. For the data of FIG. 3, a rate-1/2 LDPC is employed with block length of 64800 without interleaving over an AWGN channel. As can be verified from FIG. 13, the described embodiment achieves a gain of roughly 0.07, 0.14 and 0.2 over the max-log MAP demapper at BER $10^{-3}$ for 256; 1024 and 4096 NU-CLAM, respectively.

The computational cost per dimension of the different demappers can be directly obtained from Table I. For instance, for 1024 NU-QAM, the underlying NU-PAM is of size M=32. Hence, the log MAP demappers requires 32 Euclidean metric evaluations and 150 Jacobian logarithms. The proposed embodiment requires 17 comparisons, 13 Euclidean metric evaluations and 7 Jacobian logarithms. The max-log MAP requires 10 comparisons and 6 Euclidean metric evaluations.

TABLE 2

Algorithm part (A):

input: y, $\{x_k: k = 1, \ldots, M\}$
output: $z_1'$, $z_2'$, $z_1$
/*binary search routine*/

$n \leftarrow \frac{M}{2}$; /*initial boundary*/

TABLE 2-continued

Algorithm part (A):

for i ← 1 to m do
  $\sigma_i \leftarrow \max\left\{\text{sign}\left(y - \frac{x_n + x_{n+1}}{2}\right), 0\right\}$; /*signature*/
  $l \leftarrow n + (-1)^{\sigma_i^c} \frac{M}{2^{i-1}}$; /*image index*/
  if $\frac{M}{2^i} \leq l \leq M\left(1 - \frac{1}{2^i}\right)$ then/*if image exists*/
    $|u \leftarrow \min\{n + \sigma_i^c, 1 + \sigma_i\}$;
    $|v \leftarrow \max\{n + \sigma_i^c, 1 + \sigma_i\}$;
    if $y < \frac{x_u + x_v}{2}$ then
      $|z_1'(i) \leftarrow x_u$;
      if $y \leq \frac{x_u - 1 + x_v}{2}$ then
        $|z_2'(i) \leftarrow x_{u-1}$
      else
        $|z_2'(i) \leftarrow x_c$
      end
    else
      $|z_1'(i) \leftarrow x_v$;
      if $y \leq \frac{x_u + x_{v+1}}{2}$ then
        $|z_2'(i) \leftarrow x_u$
      else
        $|z_2'(i) \leftarrow x_{v+1}$
      end
    end
  else /*if no image exists*/
    $|z_1'(i) \leftarrow x_{n+\sigma_i^c}$;
    $|z_2'(i) \leftarrow x_{n+\sigma_i^c+(-1)_i^{\sigma}}$;
  end
  if i < m then
    $n \leftarrow n + (-1)^{\sigma_i^c} \frac{M}{2^{i+1}}$; /*update boundary*/
  end
end
$k^{ML} \leftarrow n + \sigma_m$; /*hard decision index*/
$z_1 \leftarrow x_k^{ML}$; /*set hard decision point*/

TABLE 3

Algorithm part (B):

input: y, $k^{ML}$, $\{x_k: k = 1, \ldots, M\}$
output: $z_2$
if $1 < k^{ML} < M$ then
  $|u \leftarrow k^{ML} - 1$; /*left neighbour index*/
  $|v \leftarrow k^{ML} + 1$; /*right neighbour index*/
  if $y \leq \frac{u + v}{2}$ then
    |get j; /*position where $z_1$ and $x_u$ differs*/
    |get $\tilde{x}$; /*left neighbour $\in \chi_j^{b_j}$ */
    $|z_2(i) \leftarrow x_u \forall i \neq j$;
    if $y \leq \frac{x + x_v}{2}$ then
      $|z_2(j) \leftarrow \tilde{x}$
    else
      $|z_2(j) \leftarrow x_v$
    end
  else
    |get j; /*position where $z_1$ and $x_v$ differs*/
    |get $\tilde{x}$; /*right neighbour $\in \chi_j^{b_j}$ */
    $|z_2(i) \leftarrow x_v \forall i \neq j$;
    if $y \leq \frac{x_u + x}{2}$ then
      $|z_2(i) \leftarrow x_u$
    else
      $|z_2(i) \leftarrow \tilde{x}$
    end
end TABLE 3-continued Algorithm part (B):

```
else /*ML estimate is leftmost or rightmost point*/
    |z_2 (i) ← x_k^{ML} + (-1)_i^σ, i = 1, . . . , m - 1;
    |z_2 (m) ← x_k^{ML} + 3(-1)_i^σ;
end
```

While certain embodiments have been described, these embodiments have been presented by way of example only, and are not intended to limit the scope of the inventions. Indeed the novel methods, devices and apparatuses described herein may be embodied in a variety of other forms; furthermore, various omissions, substitutions and changes in the form of methods and apparatuses described herein may be made without departing from the spirit of the inventions. The accompanying claims and their equivalents are intended to cover such forms or modifications as would fall within the scope and spirit of the inventions.

The invention claimed is:

1. A device for use in demodulating modulated signals by determining a value for a log likelihood ratio; wherein the device comprises:
   a storage device configured to store executable instructions; and
   a processor configured to execute the instructions stored on the storage device, the processor configured to, when executing the instructions:
      receive a modulated signal which is to be demodulated using a constellation diagram comprising a plurality of constellation points which are identified by binary reflected Gray-labelled codes;
      identify, for a bit of the Gray-labelled codes, a closest complementary constellation point to the signal when considering the signal as a point on a representation of one-dimension of the constellation diagram;
      identify a hard decision point, the hard decision point being the closest constellation point to the signal when considering the signal as a point on a representation of one-dimension of a constellation diagram, and a complementary constellation point being a constellation point which has a different value for the bit compared to the hard decision point; and
      determine a value for a log likelihood ratio using the hard decision point and the closest complementary constellation point,
      wherein identifying a closest complementary constellation point comprises:
         defining a key boundary, the key boundary defining a value on a representation of one-dimension of the constellation diagram;
         comparing the received signal to the key boundary;
         defining an image boundary, the image boundary defining a value on a representation of one-dimension of the constellation diagram, the image boundary being located on the same side of the key boundary as the signal, between two constellation points that have different values for the bit;
         checking if a constellation point exists on the other side of the image boundary to the signal; and
         when a constellation point does not exist on the other side of the image boundary to the signal:
            setting the complementary constellation point closest to and on the other side of the key boundary to the signal, referred to as the key point, as the closest complementary constellation point.

2. The device according to claim 1, wherein a closest complementary constellation point is identified for every bit of the Gray-labelled codes.

3. The device according to claim 2, wherein identifying a closest complementary constellation point for every bit of the Gray-labelled codes comprises:
   defining a first key boundary for a first bit;
      wherein a key boundary defines a value on a representation of one-dimension of the constellation diagram;
   comparing the received signal to the first key boundary;
   defining a first image boundary;
      wherein an image boundary defines a value on a representation of one-dimension of the constellation diagram and wherein the image boundary is located on the same side of the key boundary as the signal, between two constellation points that have different values for the bit;
   checking if a constellation point exists on the other side of the first image boundary to the signal; and
   when a constellation point does not exist on the other side of the first image boundary to the signal:
      setting the complementary constellation point closest to and on the other side of the key boundary to the signal, referred to as the first key point, as the closest complementary constellation point for the first bit;
   sequentially defining a respective key boundary for each further bit;
      wherein each respective key boundary is located on the same side of the key boundary for the previous bit as the signal, between two constellation points that have different values for the respective bit;
   comparing the received signal to each respective key boundary;
   defining a respective image boundary for each further bit;
      wherein an image boundary defines a value on a representation of one-dimension of the constellation diagram and wherein the image boundary is located on the same side of the respective key boundary as the signal, between two constellation points that have different values for the bit;
   checking if a constellation point exists on the other side of the respective image boundary to the signal; and
   when a constellation point does not exist on the other side of the respective image boundary to the signal:
      setting the complementary constellation point closest to and on the other side of the key boundary to the signal, referred to as the respective key point, as the closest complementary constellation point for the respective bit.

4. The device according to claim 3, wherein identifying the hard decision point comprises:
   comparing the received signal to the key boundary for the last bit of the Gray-labelled codes; and
   setting the constellation point closest to the key boundary for the last bit of the Gray-labelled codes and on the same side of the key boundary as the signal point, as the hard decision point.

5. The device according to claim 3, wherein the processor is further configured to:
   determine a binary signature vector;
      wherein the entries of the signature vector comprise the results of the comparisons between the received signal with each respective key boundary, respectively; and wherein identifying the hard decision point comprises:
setting the Gray-label equivalent to the binary signature vector as the hard decision point.

6. The device according to claim 1, wherein identifying a closest complementary constellation point further comprises:
when a constellation point exists on the other side of the image boundary to the signal:
setting whichever is closest to the received signal out of the complementary constellation point closest to and on the other side of the image boundary to the signal, referred to as an image point, and the key point, as the closest complementary constellation point.

7. The device according to claim 6, wherein setting whichever is closest to the received signal out of the image point and the key point, as the closest complementary constellation point, comprises:
setting a first comparison point as the minimum of the key point and the image point;
setting a second comparison point as the maximum of the key point and the image point;
determining if the received signal is less than the arithmetic mean of the first and second comparison point; and
setting the first comparison point as the closest complementary constellation point when the received signal is less than the arithmetic mean.

8. The device according to claim 1, wherein the processor is configured to:
identify, for the bit of the Gray-labelled codes, a closest complementary constellation point to the signal and a second closest complementary constellation point to the signal;
identify a hard decision point and an auxiliary hard decision point, wherein an auxiliary hard decision point is the second closest constellation point to the signal that has the same value for the bit as the hard decision point; and
determine a value for a log likelihood ratio using the hard decision point, an auxiliary hard decision point, the closest complementary constellation point and the second closest complementary constellation point.

9. The device according to claim 3, wherein the processor is configured to:
identify, for the bit of the Gray-labelled codes, a closest complementary constellation point to the signal and a second closest complementary constellation point to the signal;
identify a hard decision point and an auxiliary hard decision point, wherein an auxiliary hard decision point is the second closest constellation point to the signal that has the same value for the bit as the hard decision point; and
determine a value for a log likelihood ratio using the hard decision point, an auxiliary hard decision point, the closest complementary constellation point and the second closest complementary constellation point; and
identifying the closest complementary constellation point to the signal and the second closest complementary constellation point to the signal, further comprises:
when no constellation point exists on the other side of the image boundary to the signal:
setting the complementary constellation point next to and on the same side of the key boundary as the closest constellation point, as the second closest complementary constellation point.

10. The device according to claim 6, wherein the processor is configured to:
identify, for the bit of the Gray-labelled codes, a closest complementary constellation point to the signal and a second closest complementary constellation point to the signal;
identify a hard decision point and an auxiliary hard decision point, wherein an auxiliary hard decision point is the second closest constellation point to the signal that has the same value for the bit as the hard decision point; and
determine a value for a log likelihood ratio using the hard decision point, an auxiliary hard decision point, the closest complementary constellation point and the second closest complementary constellation point; and
identifying the closest complementary constellation point to the signal and the second closest complementary constellation point to the signal, further comprises:
when a constellation point exists on the other side of the image boundary to the signal and the image point is closer to the signal than the key point:
setting the image point as the closest complementary constellation point; and
when the image point is at an extreme of the constellation:
setting the key point as the second closest complementary constellation point; and
when a constellation point exists on the other side of the image boundary to the signal and the image point is not closer to the signal than the key point:
setting the key point as the closest complementary constellation point; and
when the key point is at an extreme of the constellation:
setting the image point as the second closest complementary constellation point.

11. The device according to claim 8, wherein identifying a hard decision point and an auxiliary hard decision point comprises:
identifying the hard decision point;
determining whether the hard decision point is at an extreme of an axis of the constellation diagram; and
when the hard decision point is at an extreme of an axis of the constellation diagram:
setting the constellation point next to the hard decision point as a first auxiliary hard decision point; and
setting the constellation point three away from the hard decision point as a second auxiliary hard decision point.

12. The device according to claim 8, wherein identifying a hard decision point and an auxiliary hard decision point comprises:
identifying the hard decision point;
determining, in a representation of one-dimension of the constellation diagram, whether a first test point or a second test point is closer to the signal;
wherein the first and second test points are constellation points on either side of the hard decision point; and
when the first test point is not closer to the signal than the second test point:
setting the second test point as the first auxiliary hard decision point.

13. The device according to claim 8, wherein identifying a hard decision point and an auxiliary hard decision point comprises:

looking up a value from a look-up table;
wherein the values in the look-up table are dependent on the size of the constellation; and
using the value from the look-up table to identify an auxiliary hard decision point.

14. The device according to claim 1, further comprising a decoder for receiving the value for the log likelihood ratio.

15. The device according to claim 14, wherein the decoder comprises an output and the decoder is configured to iteratively update the value for a log likelihood ratio and output a decoded signal.

16. The device according to claim 1, wherein the processor is further configured to demodulate the signal using the determined value for the log likelihood ratio.

17. A method for determining a value for a log likelihood ratio for demapping modulated signals, the method comprising:
receiving a modulated signal which is to be demodulated using a constellation diagram comprising a plurality of constellation points which are identified by binary reflected Gray-labelled codes;
identifying, for a bit of the Gray-labelled codes, a closest complementary constellation point to the signal when considering the signal as a point on a representation of one-dimension of the constellation diagram;
identifying a hard decision point, the hard decision point being the closest constellation point to the signal when considering the signal as a point on a representation of one-dimension of a constellation diagram, and a complementary constellation point being a constellation point which has a different value for the bit compared to the hard decision point; and
determining a value for a log likelihood ratio using the hard decision point and the closest complementary constellation point,
wherein identifying a closest complementary constellation point comprises:
defining a key boundary, the key boundary defining a value on a representation of one-dimension of the constellation diagram;
comparing the received signal to the key boundary;
defining an image boundary; the image boundary defining a value on a representation of one-dimension of the constellation diagram, the image boundary being located on the same side of the key boundary as the signal, between two constellation points that have different values for the bit;
checking if a constellation point exists on the other side of the image boundary to the signal; and
when a constellation point does not exist on the other side of the image boundary to the signal:
setting the complementary constellation point closest to and on the other side of the key boundary to the signal, referred to as the key point, as the closest complementary constellation point.

18. The method according to claim 17, wherein a closest complementary constellation point is identified for every bit of the Gray-labelled codes; and
wherein identifying a closest complementary constellation point for every bit of the Gray-labelled codes comprises:
defining a first key boundary for a first bit;
wherein a key boundary defines a value on a representation of one-dimension of the constellation diagram
comparing the received signal to the first key boundary;
defining a first image boundary;
wherein an image boundary defines a value on a representation of one-dimension of the constellation diagram and wherein the image boundary is located on the same side of the key boundary as the signal, between two constellation points that have different values for the bit;
checking if a constellation point exists on the other side of the first image boundary to the signal; and
when a constellation point does not exist on the other side of the first image boundary to the signal:
setting the complementary constellation point closest to and on the other side of the first key boundary to the signal, referred to as the first key point, as the closest complementary constellation point for the first bit;
sequentially defining a respective key boundary for each further bit;
wherein each respective key boundary is located on the same side of the key boundary for the previous bit as the signal, between two constellation points that have different values for the respective bit;
comparing the received signal to each respective key boundary;
defining a respective image boundary for each further bit;
wherein an image boundary defines a value on a representation of one-dimension of the constellation diagram and wherein the image boundary is located on the same side of the respective key boundary as the signal, between two constellation points that have different values for the bit;
checking if a constellation point exists on the other side of the respective image boundary to the signal; and
when a constellation point does not exist on the other side of the respective image boundary to the signal:
setting the complementary constellation point closest to and on the other side of the key boundary to the signal, referred to as the respective key point, as the closest complementary constellation point for the respective bit.

19. A non-transitory computer readable carrier medium carrying computer executable instructions which, when executed on a processor, cause the processor to carry out a method for determining a value for a log likelihood ratio for demapping modulated signals, the method comprising:
receiving a modulated signal which is to be demodulated using a constellation diagram comprising a plurality of constellation points which are identified by binary reflected Gray-labelled codes;
identifying, for a bit of the Gray-labelled codes, a closest complementary constellation point to the signal when considering the signal as a point on a representation of one-dimension of the constellation diagram;
identifying a hard decision point, the hard decision point being the closest constellation point to the signal when considering the signal as a point on a representation of one-dimension of a constellation diagram, and a complementary constellation point being a constellation point which has a different value for the bit compared to the hard decision point; and
determining a value for a log likelihood ratio using the hard decision point and the closest complementary constellation point,
wherein identifying a closest complementary constellation point comprises:

defining a key boundary, the key boundary defining a value on a representation of one-dimension of the constellation diagram;

comparing the received signal to the key boundary;

defining an image boundary, the image boundary defining a value on a representation of one-dimension of the constellation diagram, the image boundary being located on the same side of the key boundary as the signal, between two constellation points that have different values for the bit;

checking if a constellation point exists on the other side of the image boundary to the signal; and when a constellation point does not exist on the other side of the image boundary to the signal:

setting the complementary constellation point closest to and on the other side of the key boundary to the signal, referred to as the key point, as the closest complementary constellation point.

* * * * *